United States Patent [19]
Maruyama et al.

[11] Patent Number: 5,657,171
[45] Date of Patent: *Aug. 12, 1997

[54] OPTICAL SYSTEM OF OPTICAL INFORMATION RECORDING/ REPRODUCING APPARATUS

[75] Inventors: Koichi Maruyama; Makoto Iwaki, both of Tokyo, Japan

[73] Assignee: Asahi Kogaku Kogyo Kabushiki Kaisha, Tokyo, Japan

[*] Notice: The term of this patent shall not extend beyond the expiration date of Pat. No. 5,321,550.

[21] Appl. No.: 527,975

[22] Filed: Sep. 14, 1995

Related U.S. Application Data

[62] Division of Ser. No. 208,847, Mar. 11, 1994, Pat. No. 5,479,296, which is a division of Ser. No. 5,187, Jan. 14, 1993, Pat. No. 5,321,550, which is a continuation of Ser. No. 477,464, Feb. 9, 1990, abandoned.

[30] Foreign Application Priority Data

| Feb. 9, 1989 | [JP] | Japan | 1-30775 |
| Feb. 28, 1989 | [JP] | Japan | 1-47590 |
| Aug. 3, 1989 | [JP] | Japan | 1-202558 |

[51] Int. Cl.⁶ ........................................ G02B 9/04
[52] U.S. Cl. ............... 359/793; 359/618; 359/796; 369/44.39; 369/112
[58] Field of Search ............... 359/618, 641, 359/629, 754–786, 793, 797, 813, 814; 369/13, 110, 112, 44.23, 44.39, 44.14, 44.17, 44.18, 44.21

[56] References Cited

U.S. PATENT DOCUMENTS

| 4,484,803 | 11/1984 | Arai . |
| 4,557,564 | 12/1985 | Rosemalen . |
| 4,572,623 | 2/1986 | Tanaka et al. . |
| 4,721,373 | 1/1988 | Sugiyama . |
| 4,753,524 | 6/1988 | Sugiyama . |
| 4,791,265 | 12/1988 | Nakamura . |
| 4,909,616 | 3/1990 | Arai . |
| 4,976,526 | 12/1990 | Oshima et al. . |
| 5,321,550 | 6/1994 | Maruyama et al. ............... 359/618 |

FOREIGN PATENT DOCUMENTS

| 123048 | 10/1984 | European Pat. Off. . |
| 3237645 | 5/1983 | Germany . |
| 58-72114 | 4/1983 | Japan . |
| 59-60743 | 4/1984 | Japan . |
| 60-232519 | 11/1985 | Japan . |
| 62-35311 | 2/1987 | Japan . |
| 62-267933 | 11/1987 | Japan . |
| 62-269922 | 11/1987 | Japan . |
| 63-20735 | 1/1988 | Japan . |
| 63-101118 | 1/1988 | Japan . |

OTHER PUBLICATIONS

"Single Lens CD Player Pickup System Using a Bio–aspheric Molded Glass Lens" (Sunohara et al.), I.E.E.E. Transactions on Consumer Electronics, vol. CE–33, No. 4, pp. 520–530, Nov. 1987, New York, NY.

*Primary Examiner*—James Phan
*Attorney, Agent, or Firm*—Greenblum & Bernstein P.L.C.

[57] ABSTRACT

An optical system of an optical information recording/reproducing apparatus including a light source, an objective lens, and a chromatic aberration correcting element is provided and also includes a mechanism for independently actuating the objective lens. A beam splitter for splitting the luminous flux reflected by a medium can also be provided. The chromatic aberration correcting element is formed of a positive lens and a negative lens cemented together and satisfies the relation $|n_p - n_n| \times 10^{-5} < 300$, wherein the refractive index in a central wavelength in use of the positive lens is represented by $n_p$ and the refractive index of the negative lens is represented by $n_n$.

10 Claims, 46 Drawing Sheets

F I G. 28
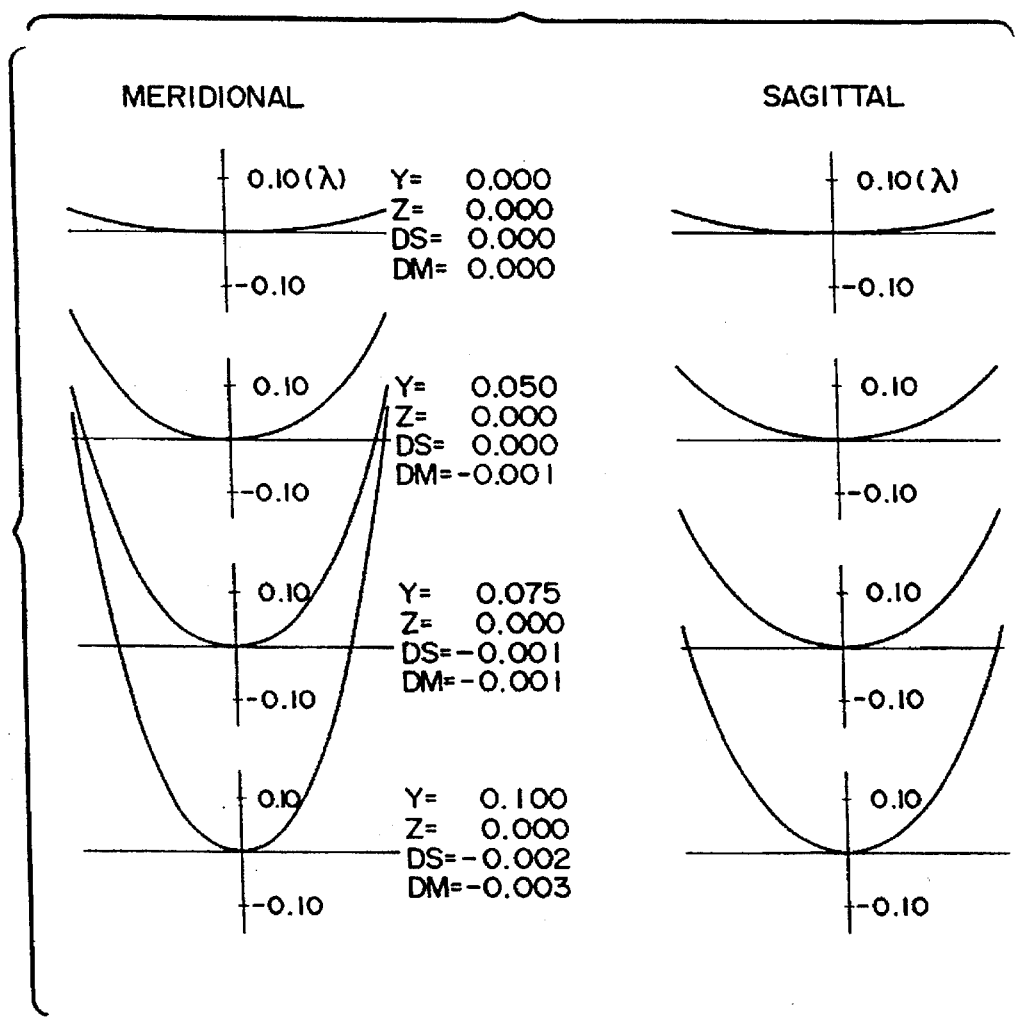

OPTICAL SYSTEM OF OPTICAL INFORMATION RECORDING/REPRODUCING APPARATUS

This application is a division of application Ser. No. 08/208,847, filed Mar. 11, 1994, now U.S. Pat. No. 5,475,296, which is a divisional of application Ser. No. 08/005,187, filed Jan. 14, 1993, now U.S. Pat. No. 5,321,550, which is a continuation of application Ser. No. 07/477,464, filed Feb. 9, 1990, now abandoned.

BACKGROUND OF THE INVENTION

1. Field of the Invention

This invention relates to an optical system of an optical information recording/reproducing apparatus in which a semiconductor laser is used as a light source. The invention further relates an objective optical system and a chromatic aberration correcting element suitable for use in the optical system.

2. Description of the Prior Art

An optical system of an optical information recording/reproducing apparatus such as optical disk apparatus, etc. is generally shown in FIG. 52. Such an optical system includes a light source portion 10 for emitting a generally parallel luminous flux, an objective optical system 20 for converging (focusing) the luminous flux emitted from the light source 10 onto an optical disk OD, a beam splitter 30 for splitting the luminous flux disposed between the light source 10 and the objective optical system 20 and adapted to split the luminous flux reflected by the disk, and a signal detecting optical system 40 for receiving such split luminous flux.

The light source portion 10 has a semiconductor laser 11, a collimator lens 12, and a beam shaping element 13.

The objective optical system 20 includes an objective lens 21, and a mirror 22, which are disposed within a head 50 which is slidable in the radial direction of the optical disk. Also, the objective lens 21 is mounted on an actuator (not shown) disposed within the head 50 and designed such that the objective lens 21 can be finely moved at least in the optical axis direction thereof so that an out-of-focus caused by warping of the disk, etc. can be corrected.

The signal detecting optical system 40 has a beam splitter 41, a tracking signal detecting system 42, and a focusing signal detecting system 43, and is adapted to read information recorded in the disk and error signals of the tracks by light reflected from the optical disk OD.

Incidentally, an emitting light wavelength of the semiconductor laser used as a light source is shifted as a result of changing of output power and/or temperature. Because of the foregoing reason, when the chromatic aberration of the optical system is not yet corrected, the position of a light converging point is varied into a shift of the wavelength.

When the light converging position is not coincident with the recording surface of the disk, there is a high possibility that incorrect writing and reading will be performed.

However, out of focus due to comparatively gradual change of wavelength caused by change of temperature or the like is automatically corrected by the aforementioned focusing servo when the collimator lens is corrected for chromatic aberration and for change of temperature.

However, at the time when data is written, an oscillation wavelength of a semiconductor laser is instantaneously shifted by several nm between a region where the temperature is increased and a region where the temperature is not increased. The out of focus caused by such radical shift cannot be corrected by the above-mentioned focusing servo.

Therefore, especially when writing is performed, correction of the chromatic aberration of the objective optical system is important.

An optical system in which the objective lens itself is corrected in chromatic aberration is disclosed in, for example, Japanese Patent Early Laid-Open Publication No. SHO 63-10118; Japanese Patent Early Laid-Open Publication No. SHO 60-232519; and Japanese Patent Early Laid-Open Publication No. SHO 58-72114.

However, the lens of the Japanese Patent Early Laid-Open Publication No. SHO 63-10118 is of a three component structure including an aspherical lens, while the lenses of the Japanese Patent Early Laid-Open Publication No. SHO 60-232519 and the Japanese Patent Early Laid-Open Publication No. SHO 58-72114 are of four component structures of glass lenses. Accordingly, these lenses are heavy in weight compared with lenses which are not corrected in chromatic aberration, and a load imposed to a movable actuator is large.

As an objective lens for an optical disk apparatus is moved at a high frequency for the purposes of focusing and tracking, it is an important requirement that the objective lens is made compact in size and light in weight in order to reduce the load on the actuator.

Also, Japanese Patent Early Laid-open Publication No. Sho 62-269922 discloses an optical system for correcting the chromatic aberration of an objective lens by excessively correcting the chromatic aberration of a collimator lens. With this construction, it is necessary to excessively correct even a focusing error detecting optical system because otherwise, out of focus is generated or caused by the focusing servo.

However, the correcting amount of the chromatic aberration of the focusing error detecting optical system is proportional to a second raised power of the ratio M, between a focal length of a condenser lens of this optical system and a focal length of the objective lens. Therefore, in an ordinary optical disk apparatus taking a value of about M=10 in view of the size of a light receiving element, it is difficult to design a system such that the condenser lens can sufficiently correct the chromatic aberration.

SUMMARY OF THE INVENTION

This invention has been accomplished in order to solve the above-mentioned problems.

An optical system of an optical information recording/reproducing apparatus according to the present invention comprises a light source portion for emitting a generally parallel luminous flux, an objective optical system for converging the luminous flux emitted from the light source onto a medium, and a beam splitter for splitting the luminous flux reflected by the medium from a light path directed to the light source portion and guiding the same to a light receiving system. The objective optical system includes an objective lens having a positive power that is independently driven at least for focusing and a chromatic aberration correcting element having almost no power that is disposed between the objective lens and the beam splitter in order to correct the chromatic aberration of the objective lens.

Regarding aberration other than chromatic aberration, it is desirable that the objective lens and the chromatic aberration correcting element are corrected independently. The reason is that if the objective optical system is constructed in such a manner that the aberration is offset by the objective lens and the chromatic aberration correcting element, an aberration is generated when a relative position is changed by tracking and/or focusing.

The chromatic aberration correcting element is constructed of a combination of a positive lens with a negative lens having a different Abbe number in order to correct chromatic aberration. In order to increase the corrected amount of the chromatic aberration, it is desirable that these lenses are cemented to each other. The reason is that if a spatial distance exists between the positive lens and the negative lens, a total reflection occurs at the peripheral portion, thereby generating an eclipse, and an aberration fluctuation occurs when a distance error is takes place.

BRIEF DESCRIPTION OF THE DRAWINGS

FIG. 28 are wave aberration diagrams of a single unit of the objective lens shown in FIG. 24.

DETAILED DESCRIPTION OF THE EMBODIMENTS

The embodiment of the present invention will now be described hereinafter with reference to the drawings. The order of the description is as follow.

(1) Example of the construction of a whole optical system of an optical information recording/reproducing apparatus;

(2) Concrete example of an objective lens; and (3) Concrete examples of an objective optical system (Ex.1 to Ex. 12).

(1) The construction of a whole optical system of an optical information recording and reproducing apparatus.

EXAMPLE 1

Figure 1:
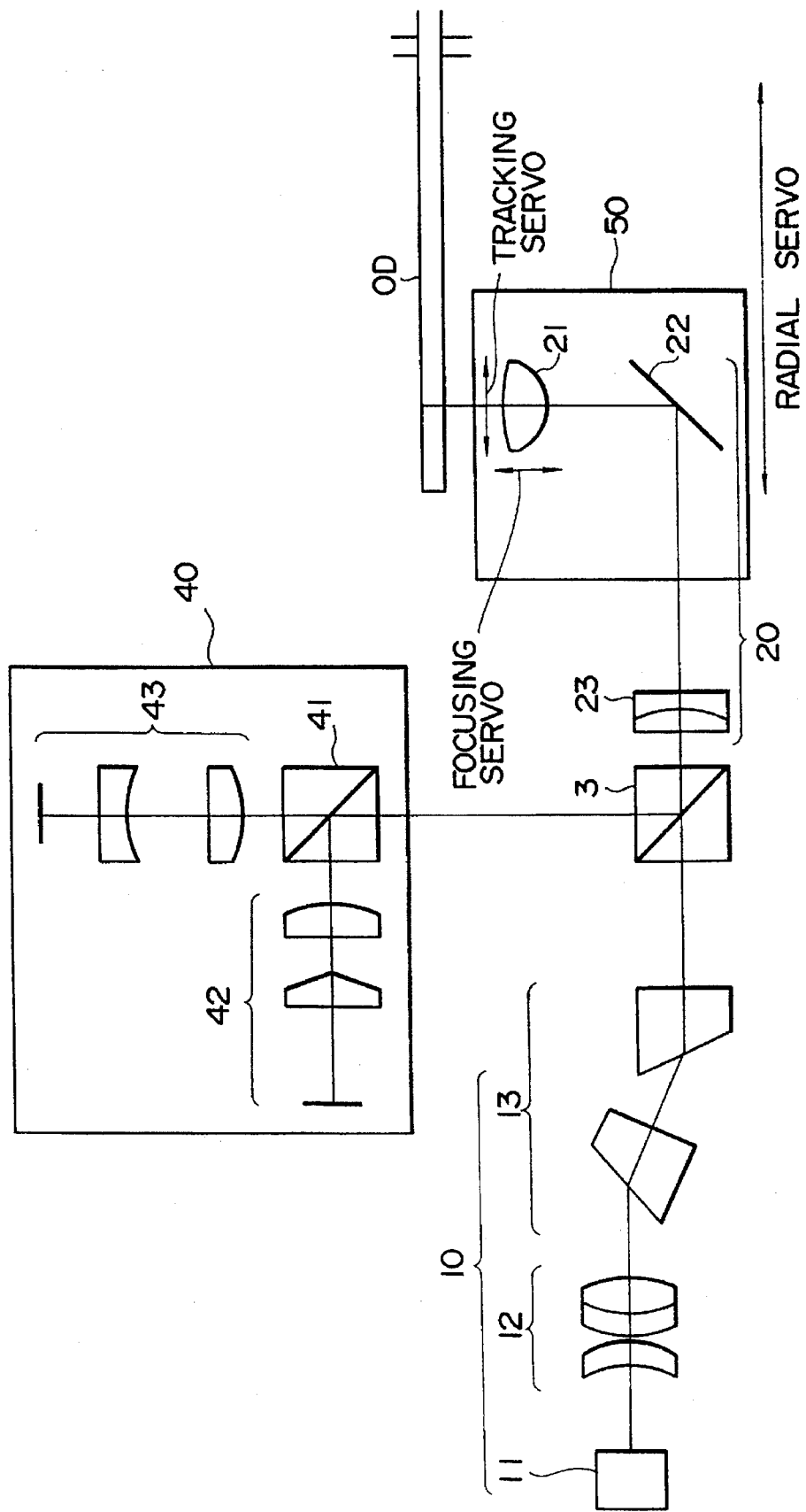
FIG. 1 is a light path diagram showing a first embodiment of an optical information recording/reproducing apparatus according to the present invention.

FIG. 1 shows EXAMPLE 1 of an optical system of an optical information recording/reproducing apparatus.

This optical system includes a light source 10, an objective optical system 20, a beam splitter 30, and a signal detecting optical system 40. The light source 10 comprises a semiconductor laser 11 for generating a divergent luminous flux, a collimator lens 12 for collimating the divergent luminous flux, and a beam shaping optical system 13 for shaping the cross-sectional configuration of the luminous flux, to thereby generate a parallel beam of a circular shape in cross-section.

The objective optical system 20 includes an objective lens 21 for converging beam onto the recording surface of the optical disk OD, a mirror 22, a chromatic aberration correcting element 23 for correcting movement of the light converged position caused by wavelength shift of the semiconductor laser 11. The objective lens 21 and the mirror 22 are disposed within a head 50 which is slidable in the radial direction of the optical disk. The chromatic aberration correcting element comprises a positive lens and a negative lens cemented together and is fixed to the outside of the head 50. The objective lens 21 is mounted on an actuator (not shown) which is disposed within the head 50 and can be finely moved in the optical axis direction thereof and the radial direction of the disk.

The diameter of the luminous flux, which transmits through the chromatic aberration correcting element 23, is preferably set to be larger than the diameter of the objective lens 21. Because, sufficient luminous flux can be made incident onto the objective lens 21 even when the objective lens 21 is independently moved for tracking purposes.

Both the head 50 and the objective lens 21 are actuated to move in the radial direction of the disk. The movement or actuation of the head 50 is a coarse (movement or) actuation (radial servo) crossing the track, while the actuation of the objective lens 21 is a fine (movement or) actuation (tracking servo) having a high frequency.

The signal detecting optical system 4 has a beam splitter 41, a tracking signal detecting system 42, and a focusing signal detecting system 43 and reads the information recorded in the disk as well as respective focus error signals and track error signals of the reflected light from the optical disk OD.

The actuator provided with the objective lens 21 applies a focusing servo in order to correct an out of focus caused by warping of the disk in accordance with the focus error signal and applies a tracking servo so that the spot which is converged by the objective lens 21 is not brought out of the track in accordance with the track error signal.

The tracking servo may employ, besides the actuation of the objective lens 21 as mentioned above, an actuation of the mirror 22 or the entire head 50 at a high frequency.

Figure 2:
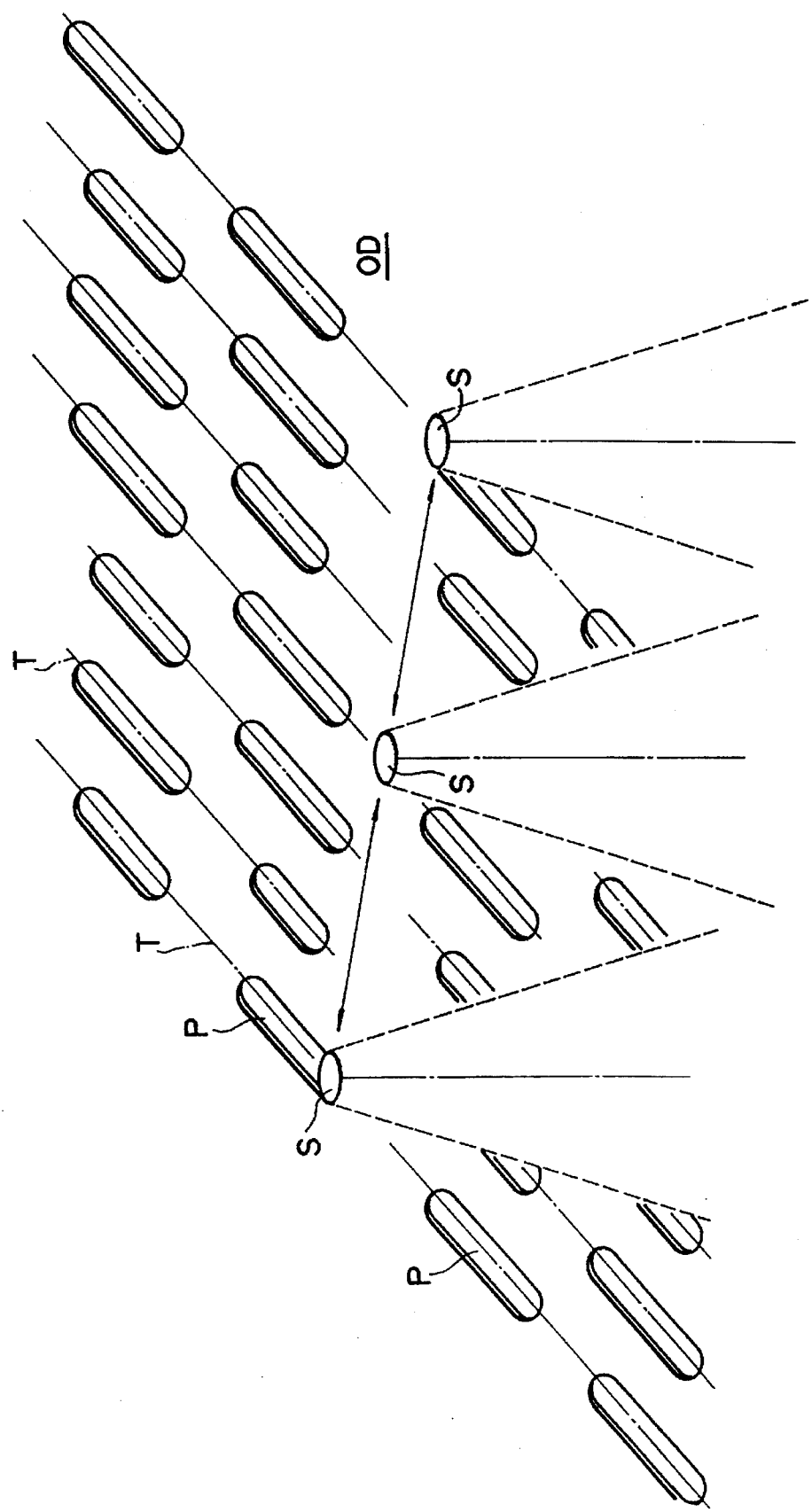
FIG. 2 is a diagram showing the operation of a tracking servo and a radial servo.

FIG. 2 is a diagram for explaining differences between the radial servo and the tracking servo utilizing a reproducing optical disk as an example. A track T shown by one-dotted chain line is formed in a spiral shape on the optical disk OD, and a pit P is formed on the track T. The radial servo is a control mechanism for moving a spot S converged by the objective lens across the track T as shown by the arrow in the drawing. On the other hand, the tracking servo is a control mechanism for moving a spot S, following the trace of the track T within a fine range, so that the spot S is not brought out of the track.

Figure 3:
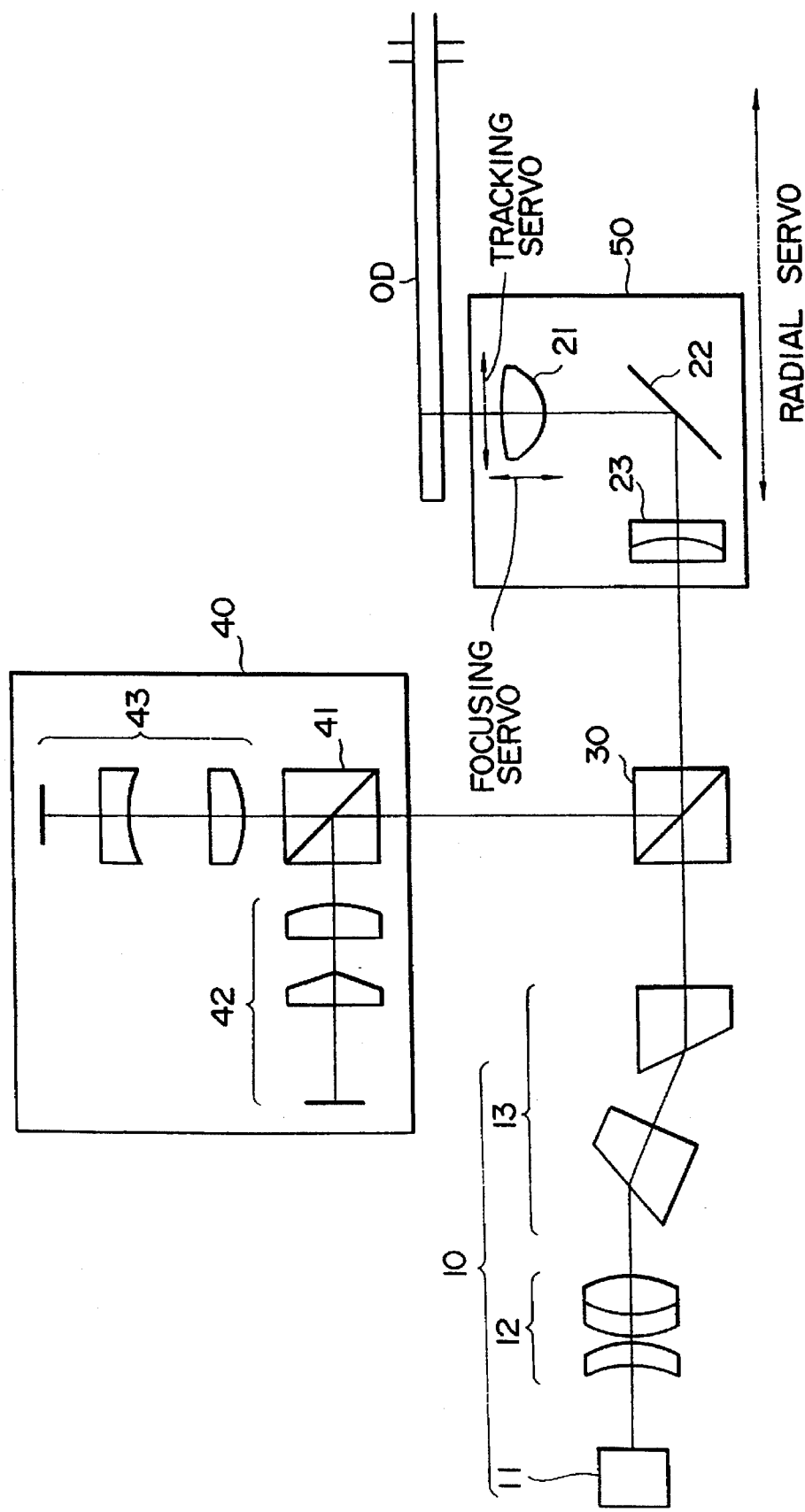
FIG. 3 is a light path diagram showing a second embodiment of an optical system of an optical information recording/reproducing apparatus according to the present invention.

The chromatic aberration correcting element 23, as shown in FIG. 3, may be disposed within the head 50.

When the chromatic aberration correcting element 23 is disposed outside the head, the head can be miniaturized. On the other hand, when the chromatic aberration correcting element is disposed within the head, the effective aperture of the chromatic aberration correcting element can be made smaller than the case where the chromatic aberration correcting element is disposed outside the head because no positional displacement of an incident pupil caused by the radial servo occurs.

EXAMPLE 2

Figure 4:
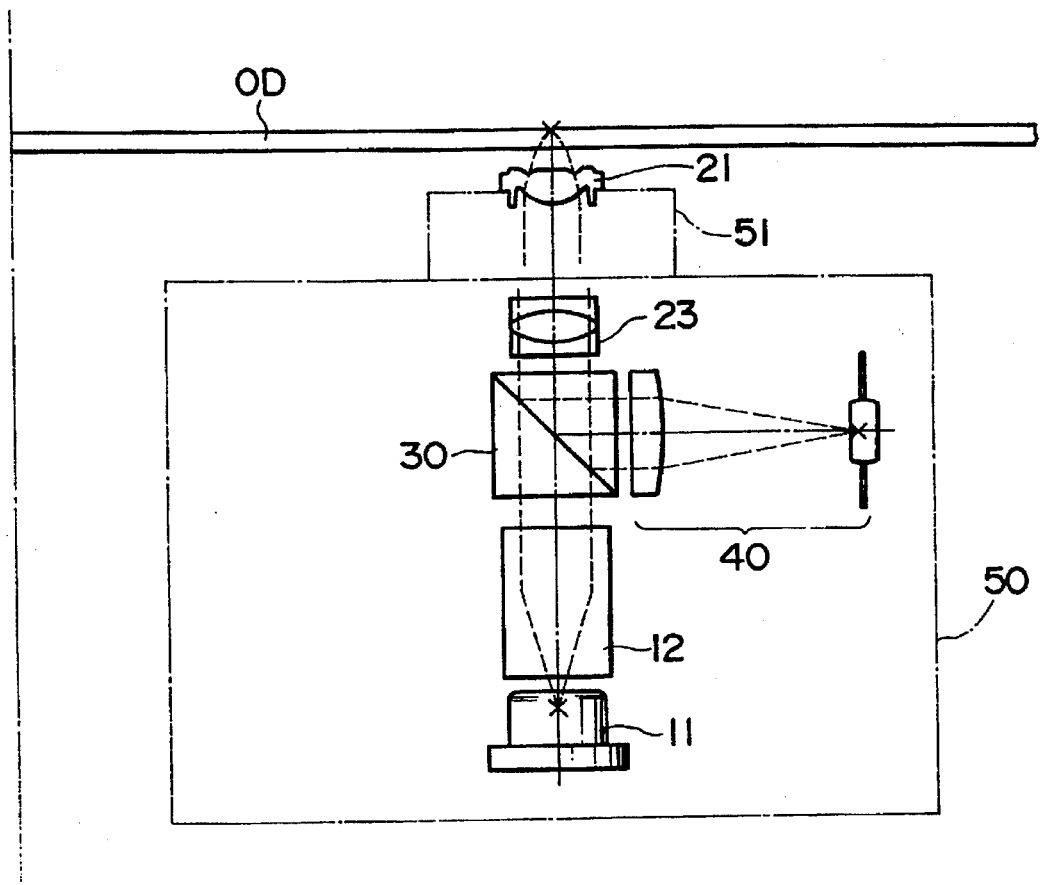
FIG. 4 is a light path diagram showing a third embodiment of an optical system of an optical information recording/reproducing apparatus according to the present invention.

FIG. 4 shows the second embodiment of an optical system of an optical information recording/reproducing apparatus.

This optical system is designed such that the semiconductor laser 11, the collimator lens 12, the beam splitter 30, the objective lens 21, the chromatic aberration correcting element 23, and the signal detecting optical system 40 are all disposed within the head 50, which is slidable in the radial direction of the disk.

The objective lens 21 is disposed on an actuator 51 and is capable of finely moving in the optical axis direction and in the radial direction of the disk.

The chromatic aberration element 23 comprises two negative lenses and one positive lens cemented together.

(2) OBJECTIVE LENS

Figure 5:
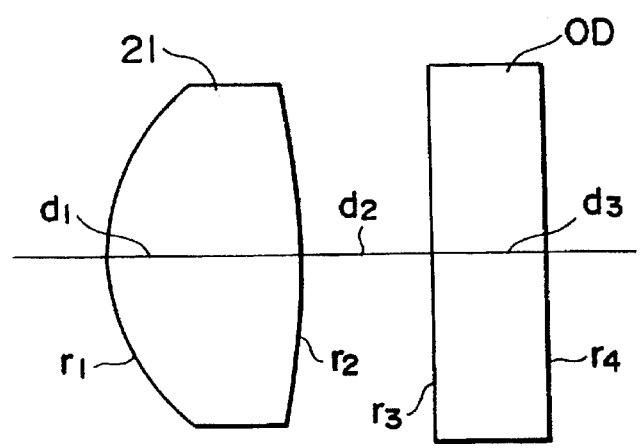
FIG. 5 is a lens diagram showing a concrete example of an objective lens.
Figure 6:
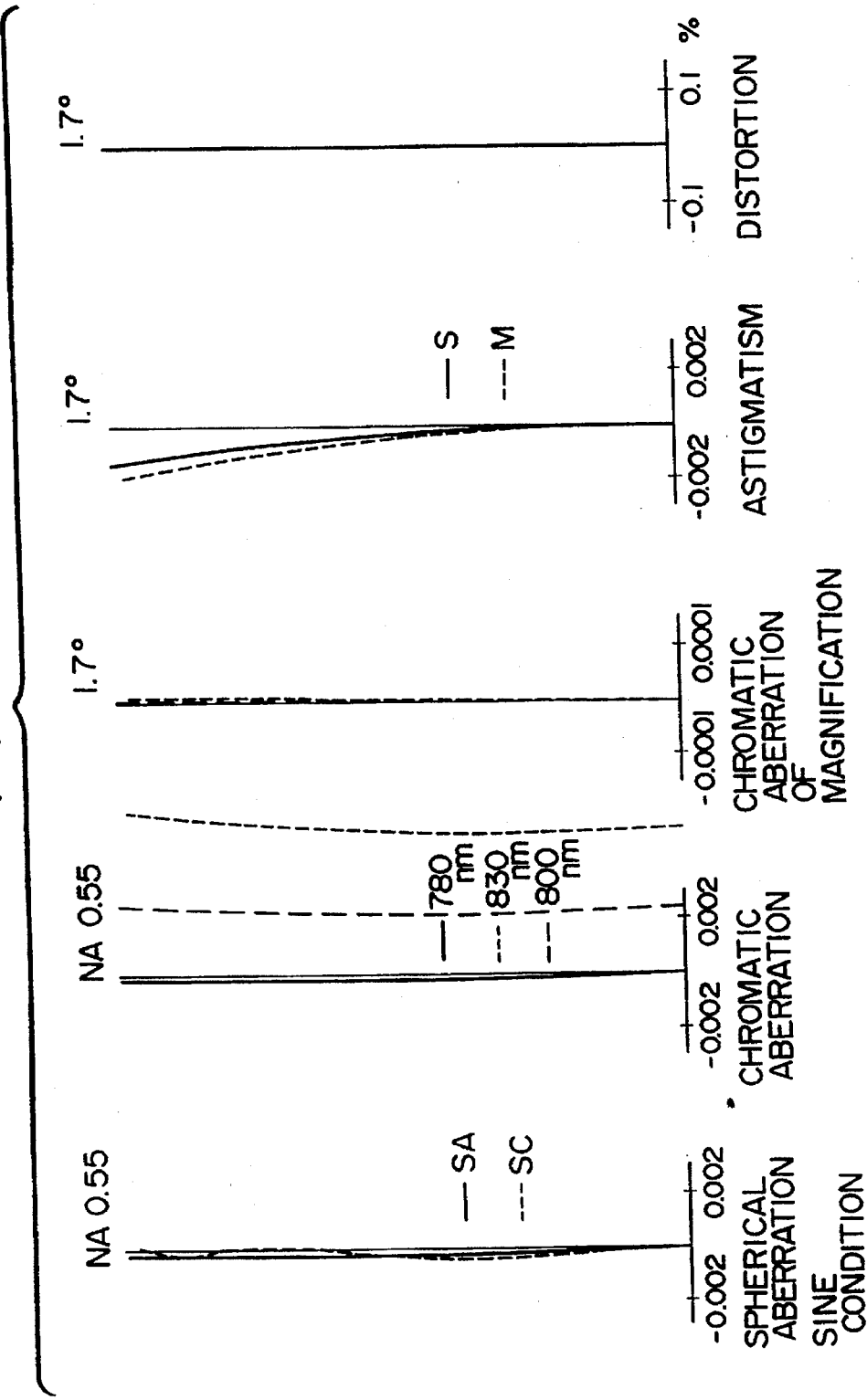
FIG. 6 are aberration diagrams of the objective lens shown in FIG. 5.
Figure 7:
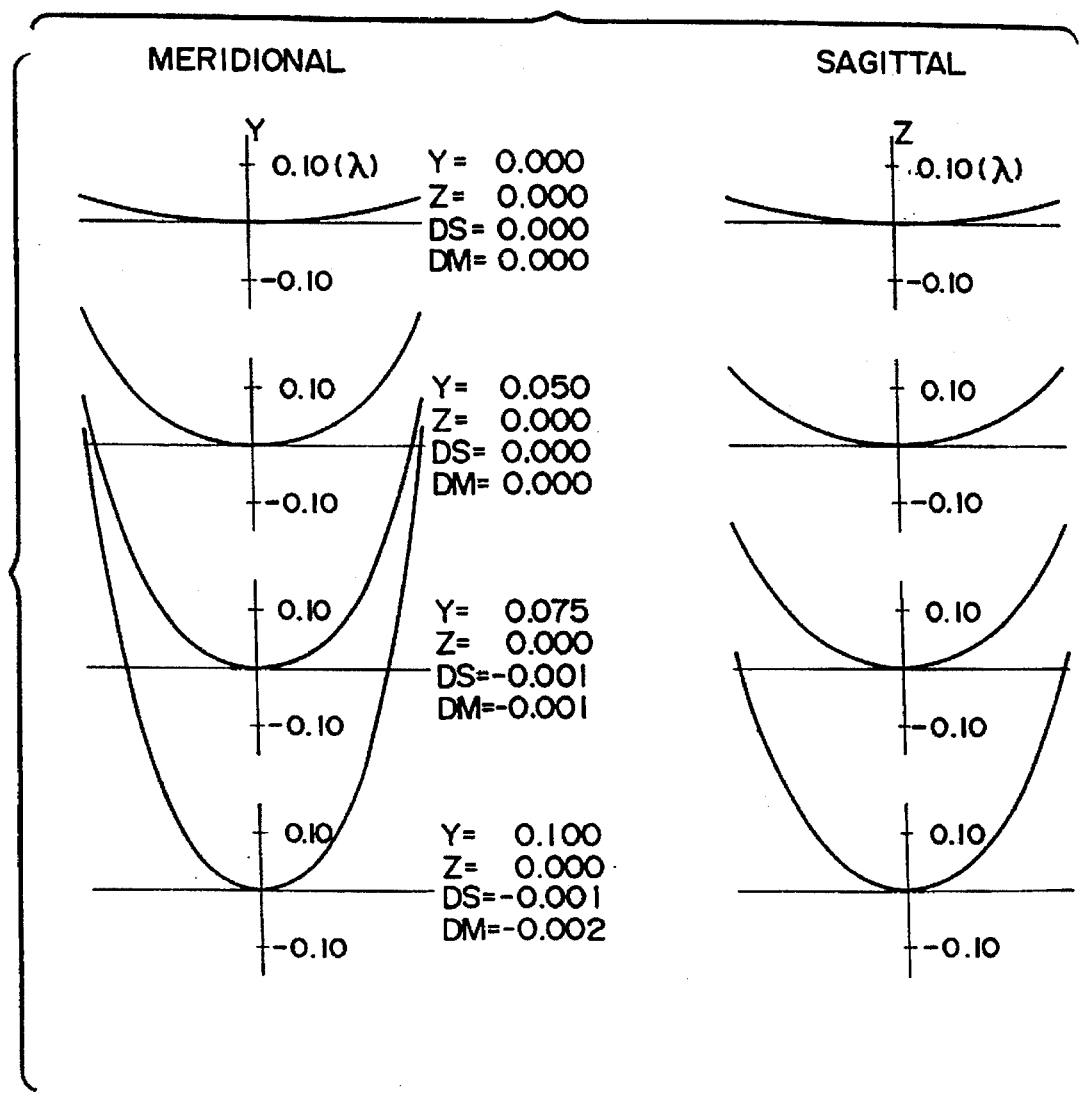
FIG. 7 are wave aberration diagrams of the objective lens shown in FIG. 5.

FIG. 5 shows the above-mentioned objective lens, and FIGS. 6 and 7 show the aberration of the single unit of the objective lens. The reference character OD in FIG. 5 denotes a cover glass for covering the recording surface of the disk.

The objective lens of the optical disk apparatus must have a convex surface in order to exhibit a strong converging force for converging the luminous flux onto the recording surface of the disk. Further, in order to maintain the converging efficiency high, it is necessary to fully correct the spherical aberration and the coma aberration.

In order to restrain the coma aberration, it is necessary to satisfy the sine condition. To this end, it is necessary to provide a strong convex converging surface on the light source side. This strong converging surface is preferably disposed near the disk in order to obtain an appropriate working distance.

The objective lens is formed as an aspherical lens having a larger radius of curvature toward the peripheral portion thereof, in order to correct the spherical aberration and the coma aberration by a single lens and also in order to obtain a sufficient edge thickness necessary for processing (i.e., manufacturing) while restraining the central thickness thereof.

Concrete numerical constructions are as shown in Table 1 and Table 2. In the Tables, the reference character $r_1$ represents the radius of curvature of a surface, d represents a lens thickness or a spatial distance, $n_{780}$ represents a refractive index at a wavelength of 780 nm of a lens, $n_d$ represents a refractive index at a d-line (wavelength of 588 nm) of a lens, and $v_d$ represents an Abbe number. Surfaces 1 and 2 denote the objective lens and surfaces 3 and 4 denote the cover glass of the optical disk. Regarding the glass material, the objective lens is a polymethylmethacrylate and the cover glass OD of the optical desk is BK7.

The aspherical first and second surfaces are expressed as follows:

$$X = \frac{CY^2}{1 + \sqrt{1-(1+K)C^2Y^2}} + A_4Y^4 + A_6Y^6 + A_8Y^8 + A_{10}Y^{10} + A_{12}Y^{12}$$

wherein X is a distance from a tangential plane of the vertex of an aspherical surface on the aspherical surface at a height Y from the optical axis, C is the radius of curvature (l/r) of the vertex of the aspherical surface, K is the coefficient of a circular cone, and the $A_4$~$A_{10}$ are aspherical surfaces coefficients. These coefficients are as shown in Table 2.

TABLE 1

| surface NO. | r | d | $n_{780}$ | $n_d$ | $v_d$ |
| --- | --- | --- | --- | --- | --- |
| 1 | 2.005 | 2.080 | 1.48479 | 1.49186 | 57.4 |
| 2 | −5.231 | 1.390 | | | |
| 3 | ∞ | 1.200 | 1.51072 | 1.51633 | 64.1 |
| 4 | ∞ | | | | |

TABLE 2

| first surface | second surface |
| --- | --- |
| K = −0.5223E+00 | K = −0.3168E+01 |
| $A_4$ = −0.1400E−03 | $A_4$ = 0.1740E−01 |
| $A_6$ = 0.4966E−04 | $A_6$ = −0.4011E−02 |
| $A_8$ = 0.1654E−04 | $A_8$ = 0.5593E−03 |
| $A_{10}$ = −0.1292E−04 | $A_{10}$ = −0.3494E−04 |
| $A_{12}$ = 0.0000E+00 | $A_{12}$ = 0.0000E+00 |

(3) Concrete example of objective optical system

Figure 8:
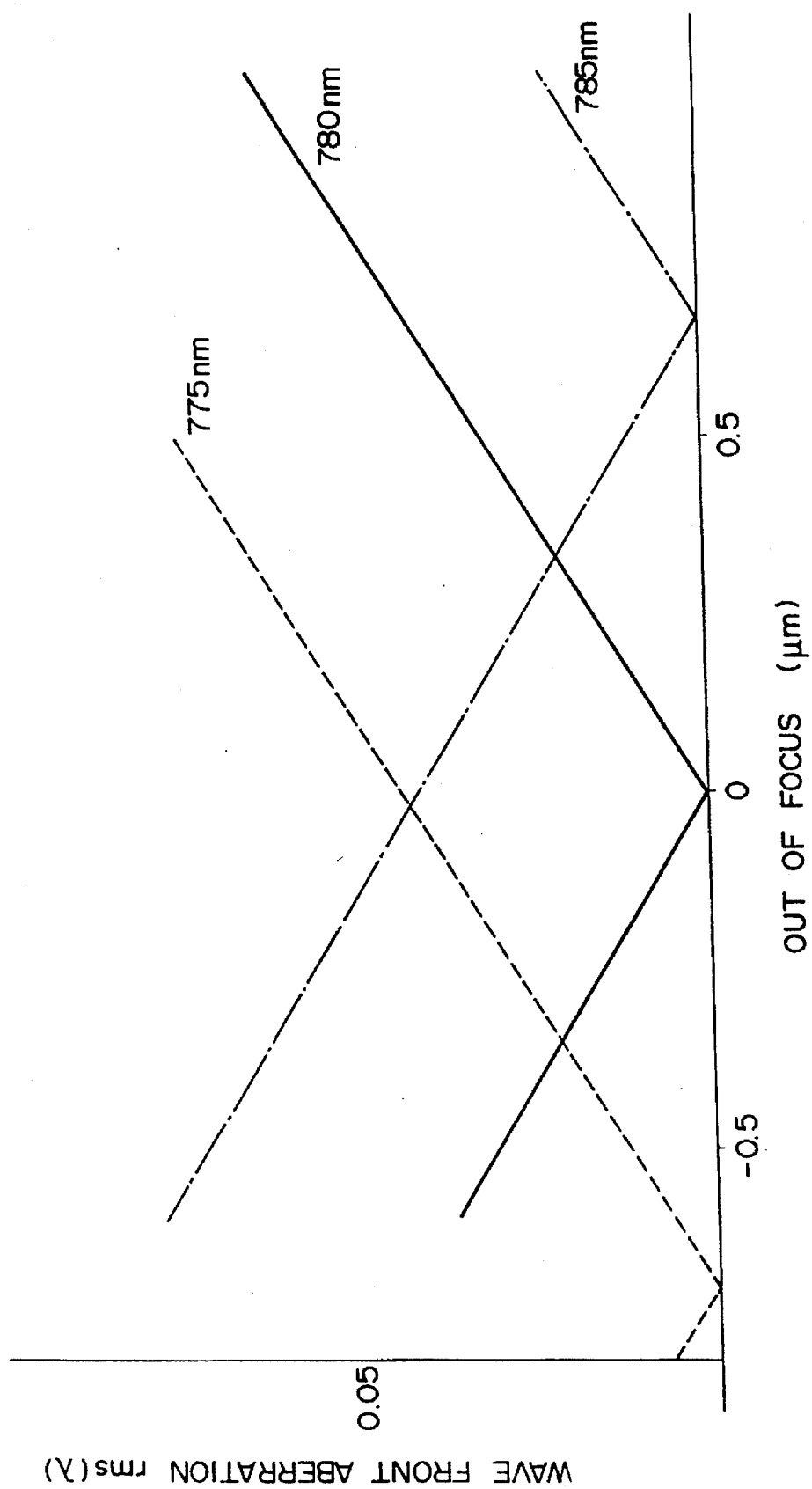
FIG. 8 is a graph showing the movement of a light converged position caused by wavelength fluctuation of the lens shown in FIG. 5.

Deterioration of wave aberration based on the out-of-focus of the single body of the objective lens is as shown in FIG. 8. It will be understood from FIG. 8 that when the wavelength is shifted by 5 nm, a wave aberration of about 0.04λ is generated. In order to maintain the efficiency as an objective lens, the limit of the wave aberration is about 0.05λ. Actually, however, since out-of-focus based on factors other than the chromatic aberration also occur, there is a possibility that the above limit is exceeded by shift of the wavelength of about 5 nm.

The chromatic aberration correcting element corrects the out-of-focus of the objective lens caused by such wavelength fluctuation as mentioned above.

It is necessary for the chromatic aberration correcting element to change in power with respect to a change in wavelength in a direction for offsetting the change of power caused by the wavelength fluctuation of the objective lens.

In general, a lens using refraction which is not corrected in chromatic aberration takes a negative value in power change ratio Δϕ/Δλ (Δϕ represents change of power, Δλ represents shift of wavelength). Accordingly, in the chromatic aberration correcting element is necessary that Δϕ/Δλ has a positive value.

The chromatic aberration correcting element is required to have almost no power so that the aberration would not be changed due to change in relative position between the chromatic aberration correcting element and the objective lens, in the optical axis direction.

Also, in order to eliminate the fluctuation in aberration due to displacement away from the optical axis of the chromatic aberration correcting element and the objective lens, the chromatic aberration correcting element is required to have almost no spherical aberration. The displacement occurs due to, for example, positional error when mounting, horizontal displacement when focusing, tracking, etc.

When these conditions are satisfied, an objective optical system having no chromatic aberration can be constructed, even if the chromatic aberration correcting element is disposed at any position between the objective lens and the beam splitter.

In order to satisfy the above requirements, the chromatic aberration correcting elements shown in the following embodiments satisfy the following conditions:

$|n_p - n_n| \times 10^5 < 300$      (1)

$(n_{780}-1)(1-v_{n780}/v_{p780}) > 0.2$      (2)

$(\Delta n_p/\Delta\lambda - \Delta n_n/\Delta\lambda) \times \lambda^2 > 9.0$ nm      (3)

$|f_p/f_c| < 0.01$      (4)

$|r_a/r_m| > 5$      (5)

$|r_1/f| > 7$      (6)

$|r_3/f| > 7$      (8)

The symbolic characters used in the above conditions have the following meanings.

$n_p$ represents refractive index of a positive lens in center use wavelength λ;

$n_n$ represents refractive index of a negative lens in center use wavelength λ;

$n_{n780}$, $n_{n830}$ represents refractive indexes in wavelengths 780 nm, 830 nm;

$n_{p780}$, $n_{p830}$ represents refractive indexes in wavelengths 780 nm, 830 nm;

$v_{n780}$ represents dispersion of a negative lens in the vicinity of wavelength 780 nm wherein; $v_{n780}=n_{n780}/(n_{n780}-n_{n830})$;

$vn_{p780}$ represents dispersion of a positive lens in the vicinity of wavelength 780 nm wherein; $v_{p780}=n_{p780}/(n_{p780}-n_{p830})$;

$\Delta n_p/\Delta\lambda$ represents gradient with respect to wavelength, of a refractive index of a positive lens;

$\Delta n_n/\Delta\lambda$ represents gradient with respect to wavelength, of a refractive index of a negative lens;

$f_p$ represents focal length of a positive lens;

$f_c$ represents focal length of a complete lens system;

$r_m$ represents radius of curvature of cemented surfaces;

$r_a$ represents radius of curvature of noncemented surfaces of a positive lens;

$r_1$ represents radius of curvature of incident surface;

$r_3$ represents radius of curvature of outgoing surface; and f represents focal length of whole objective optical system.

Regarding the chromatic aberration correcting element, the smaller the radius of curvature of the cemented surfaces and the larger the difference in positive and negative refractive indexes, the more significant the generation of the aberration becomes. As the element itself does not have power, when the aberration is generated at the cemented surface, it is difficult to correct the aberration within the element. Accordingly, it becomes necessary to restrict the generation of aberration at the cemented surfaces as much as possible.

In order to generate the aberration, there are means for making the radius of curvature large and means for making the difference in refractive indexes small. However, when the cemented surfaces are brought very close to a surface, the original function, to correct the chromatic aberration, cannot be performed. Accordingly, there is a limit in reduction of the aberration caused by the former means. On the contrary, when the refractive indexes are made almost equal, the generation of the spherical aberration and the coma aberration can be restrained even when the radius of curvature becomes considerably larger. By differentiating the dispersion, it becomes possible to achieve a change in chromatic aberration.

The relation (1) defines the condition for restraining the difference of refractive index of positive and negative lenses of the chromatic aberration correcting element and reducing the generation of aberrations other than the chromatic aberration, as much as possible.

However, even when the condition of relation (1) is satisfied, it is desirable that the radius of curvature of the cemented surfaces is as large as possible. The reason is that when the radius of curvature of the cemented surfaces is small, the thickness of the whole chromatic aberration correcting element becomes large in order to obtain the edge thickness of the positive lens. However, when a lens having a large numerical aperture (NA) is used, a spherical aberration of a higher order is generated. Therefore, the chromatic aberration correcting element must be formed of a combination of materials capable of increasing the radius of curvature of the cemented surfaces as much as possible but within a limit able to exhibit a chromatic aberration correcting effect.

The relation (2) defines the condition for regulating the dispersion quality of a chromatic aberration correcting element in order to satisfy the chromatic aberration correcting effect. In case this condition is not satisfied, even if an objective lens having the smallest dispersion CaFK95 (Merchandise Name: Sumida Kogaku) among materials for an aspherical lens obtainable at present, the chromatic aberration correcting element becomes too thick to be able to sufficiently correct the chromatic aberration, thus resulting in a problem in respect to weight or space.

In general, if the border surface of a medium having a different refractive index is a curved surface, this border surface has power. Also, in case the chromatic aberration is not corrected, the power of the border surface is changed in accordance with the variation of the wavelength. The variation $\Delta\phi/\Delta\lambda$ of the power of the cemented surfaces caused by the fluctuation of the wavelength is given by the following relation:

$$\Delta\phi/\Delta\lambda=(1/r_m)\{(\Delta n_p/\Delta\lambda)-(\Delta n_n/\Delta\lambda)\}$$

As the chromatic aberration amount CA of the objective lens which is not corrected in chromatic aberration is proportional to about $\lambda^{-2}$, $\Delta\phi/\Delta\lambda$ of the chromatic aberration correcting element should also preferably be proportional to $\lambda^{-2}$.

Accordingly, $(\Delta n_p/\Delta\lambda - \Delta n_n/\Delta\lambda)\times\lambda^2$ becomes a value showing the chromatic aberration correcting effect of the chromatic aberration correcting element.

The relation (3) stipulates a combination of materials of the chromatic aberration correcting element for satisfying the above-mentioned chromatic aberration correcting effect. In case the condition of the relation (3) is not satisfied, even if the chromatic aberration is corrected by somehow strengthening the curvature of the cemented surfaces, compatibility of the sufficient chromatic aberration correction of the objective lens and the prevention of deterioration of other aberration becomes impossible because the convergence on the cemented surfaces occurs when the wavelength change is generated or the change of dispersing degree becomes too large.

For example utilizing optical glass of Kabushiki Kaisha Ohara, the following combinations of glasses satisfy the conditions of the relations (1) and (3) at the wavelength of, for example, 780 nm.

| positive lens | negative lens | relation (1) | relation (3) |
|---|---|---|---|
| LaSK01 | SFS5 | 85.0 | 13.7 |
| LaK09 | SF13 | 16.6 | 12.5 |
| LaK13 | SF15 | 24.8 | 10.2 |
| LaK08 | SF15 | −0.6 | 10.1 |

The relation (4) defines a ratio between the focal length $f_c$ of the chromatic aberration correcting element and the focal length $f_p$ of a positive lens of the chromatic aberration correcting element. When this condition is not satisfied, if a sufficient chromatic aberration correcting amount is provided, an apparent light source position, when observed from the objective lens, is greatly changed depending on whether the chromatic aberration correcting element is provided. Therefore, it is necessary to separately design the objective lens depending on whether or not the chromatic aberration correcting element is provided. In the case the chromatic aberration correcting element and the objective lens are not arranged in proximity with each other, the working distance becomes difficult to obtain when the ratio exceeds 0.01, while a large size of the objective lens is indicated when the ratio is smaller than −0.01.

It is desirous that the incident surface and the outgoing surface of the chromatic aberration correcting element have almost no power. However, the incident and outgoing surfaces are not necessarily formed into a perfect plane respectively. In the case that these surfaces have a curvature, the surface reflected light of the chromatic aberration correcting element does not become a return light to the semiconductor laser. This is effective in preventing the signal from being adversely affected.

The relation (5) stipulates the radius of curvature of the cemented surface and the non-cemented surface of the positive lens in view of the above. The relations (6) and (7) stipulate the ratio between the radius of curvature of both surfaces of the chromatic aberration correcting element and the focal length. When these conditions are not satisfied, the power of the incident and outgoing surfaces becomes large. As a result, an aberration easily occurs due to failing when arranged. Even if the total power is 0, there is an angular magnification. As a result, increase in the diameter of the lens and reduction of the working distance are indicated.

Next, examples of concrete numerical constructions of the objective optical system including a chromatic aberration correcting element will be described. In the drawing, an objective optical system formed of a combination of the chromatic aberration correcting element with the objective lens is shown. The aberration is for the whole objective optical system.

EXAMPLE 1

Figure 9:
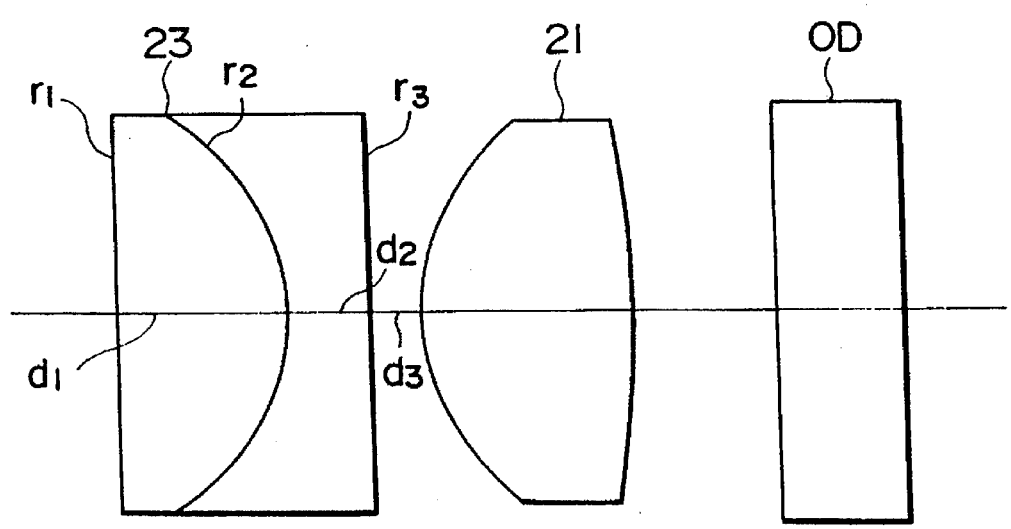
FIG. 9 is a lens diagram showing Example 1 of an objective optical system.

FIG. 9 shows EXAMPLE 1 of an objective optical system. The numerical construction of the chromatic aberration correcting element is shown in Table 3. In the table, the reference character NA denotes the numerical aperture, f denotes a focal length of the objective optical system in a wavelength of 780 nm, ω denotes a half field angle. As the numerical value constructions for the objective lens and the cover glass of the optical disk is the same as that of EXAMPLE 1, description will be omitted in the following Table.

TABLE 3

| | NA 0.55 | f = 3.30 | ω = 1.7° | | |
|---|---|---|---|---|---|
| surface NO. | r | d | $n_{780}$ | $n_d$ | $v_{780}$ glass material name |
| 1 | ∞ | 1.600 | 1.72437 | 1.73400 | 1071 LaK09 |
| 2 | −2.200 | 0.800 | 1.72421 | 1.74077 | 684 SF13 |
| 3 | ∞ | 0.500 | | | |

Figure 10:
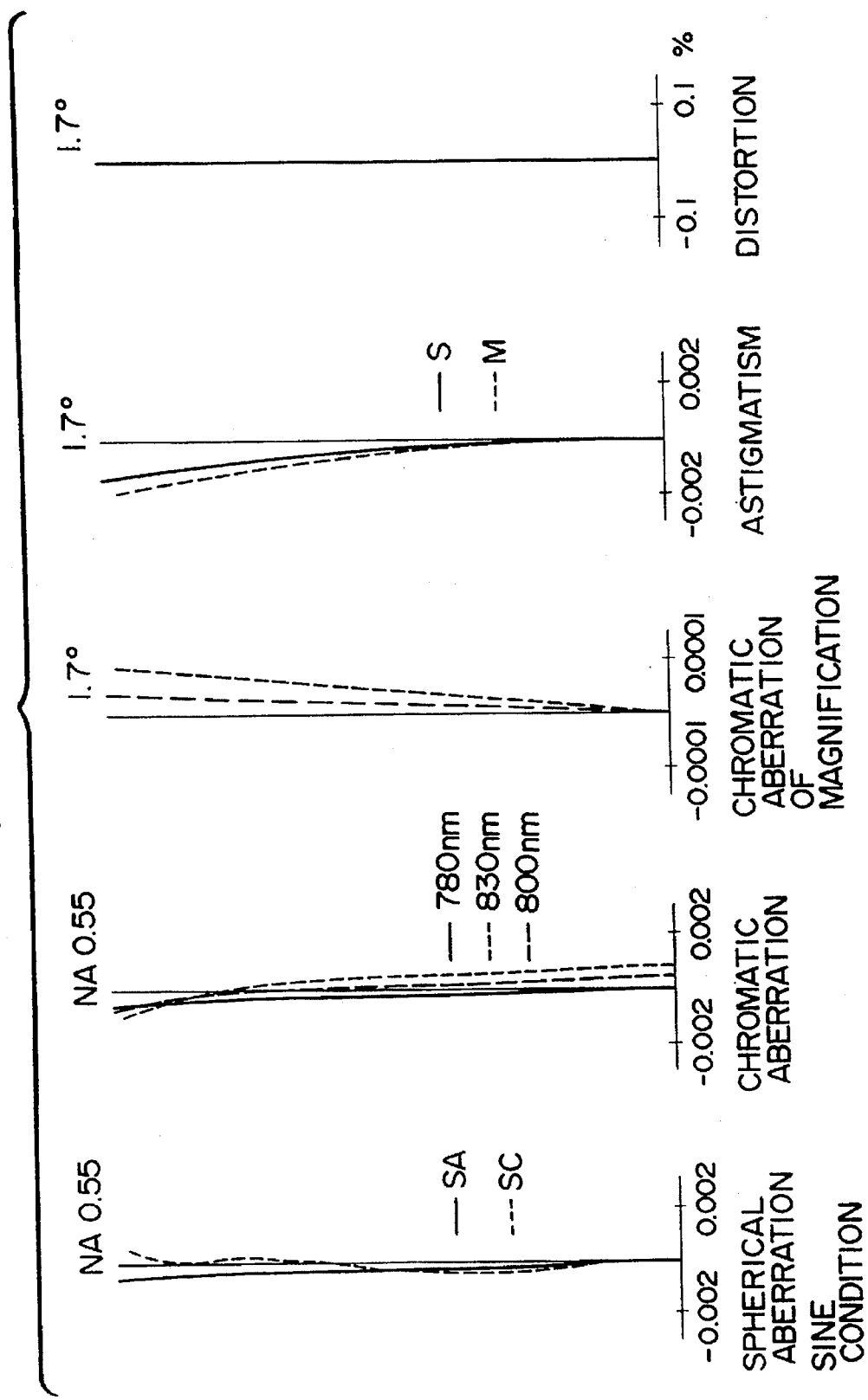
FIG. 10 are aberration diagrams of the objective optical system shown in FIG. 9.
Figure 11:
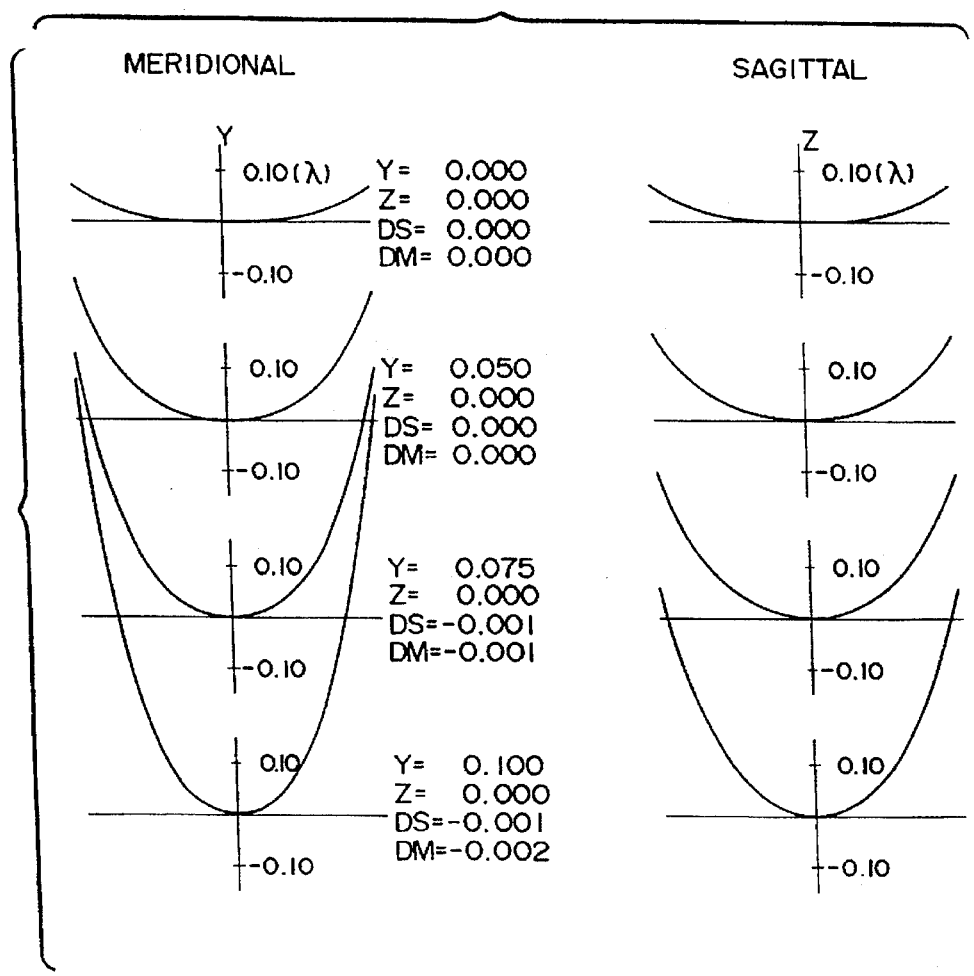
FIG. 11 are wave aberration diagrams of the objective optical system shown in FIG. 9.

Various aberrations of this objective optical system are shown in FIG. 10 and the wave aberrations are shown in FIG. 11.

In TABLE 3, almost the same efficiency can be obtained when $r_1 = r_3 = 500$.

EXAMPLE 2

Figure 12:
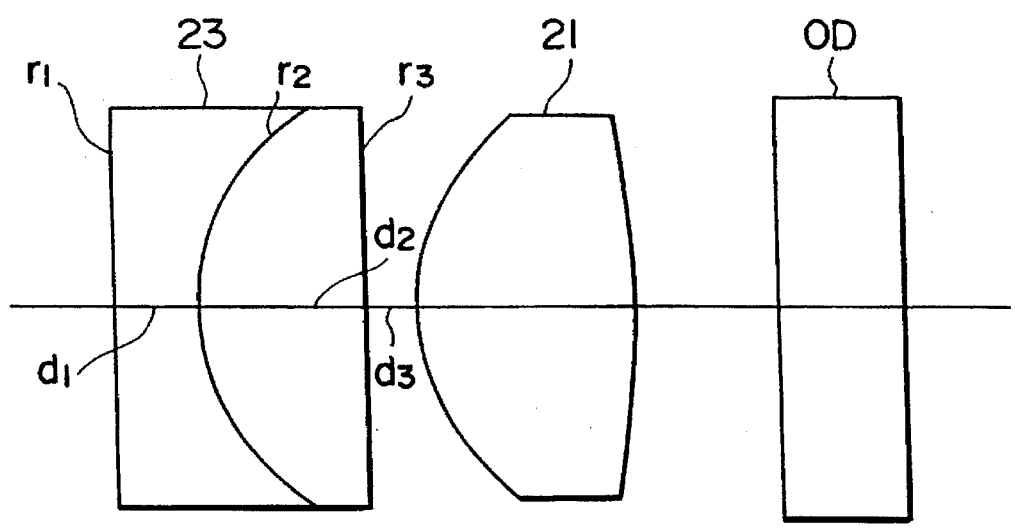
FIG. 12 is a lens diagram showing Example 2 of an Objective optical system.

FIG. 12 shows EXAMPLE 2 of the objective optical system. The numerical value construction of the chromatic aberration correcting element is shown in Table 4. The objective lens and the cover glass of the optical disk is the same to that of EXAMPLE 1.

Figure 13:
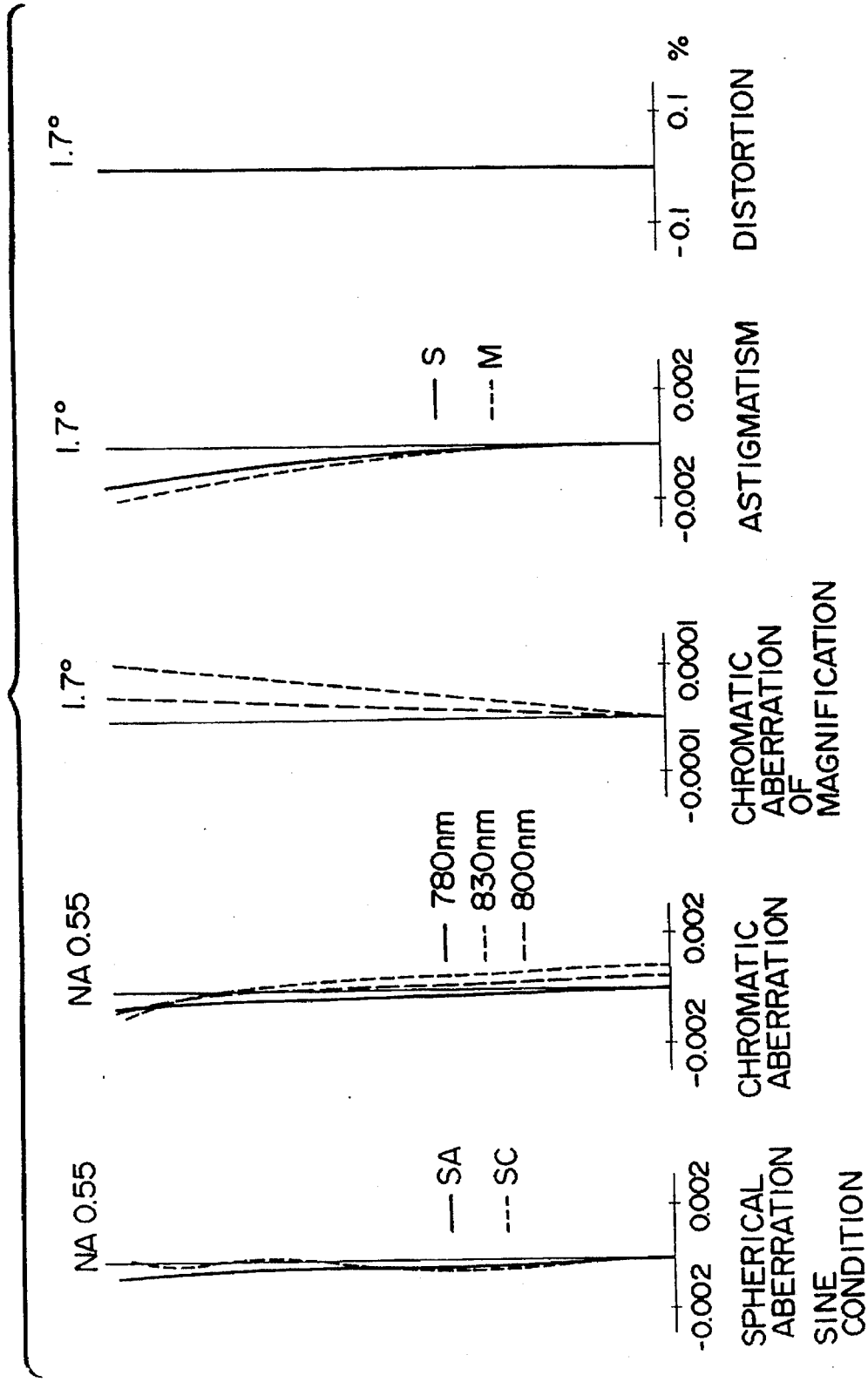
FIG. 13 are aberration diagrams of the objective optical system shown in FIG. 12.
Figure 14:
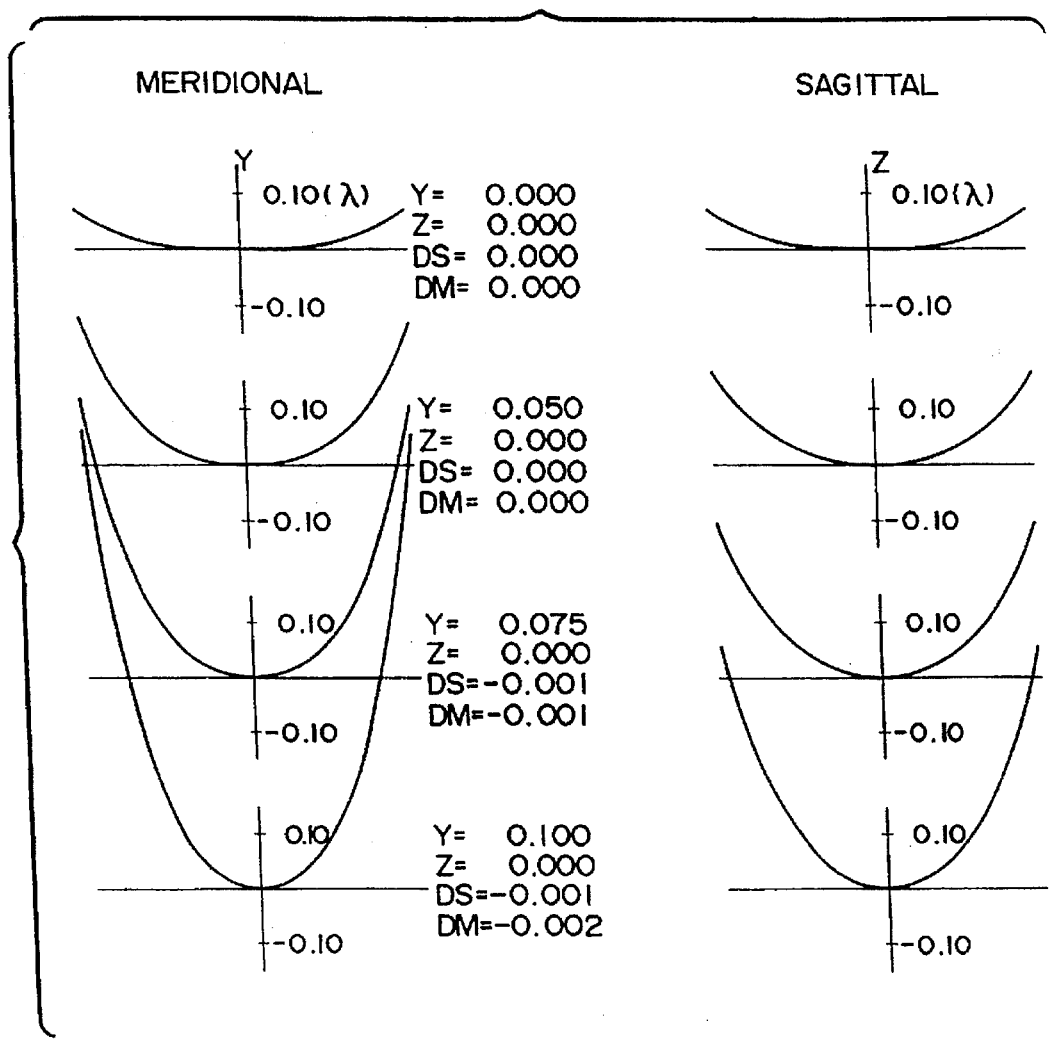
FIG. 14 are wave aberration diagrams of the objective optical system shown in FIG. 12.

Various aberrations of this objective optical system are shown in FIG. 13 and the wave aberrations are shown in FIG. 14.

TABLE 4

| | NA 0.55 | f = 3.30 | ω = 1.7° | | |
|---|---|---|---|---|---|
| surface NO. | r | d | $n_{780}$ | $n_d$ | $v_{780}$ glass material name |
| 1 | ∞ | 0.080 | 1.72421 | 1.74077 | 684 SF13 |
| 2 | 2.200 | 1.600 | 1.72437 | 1.73400 | 1071 LaK09 |
| 3 | ∞ | 0.500 | | | |

EXAMPLE 3

Figure 15:
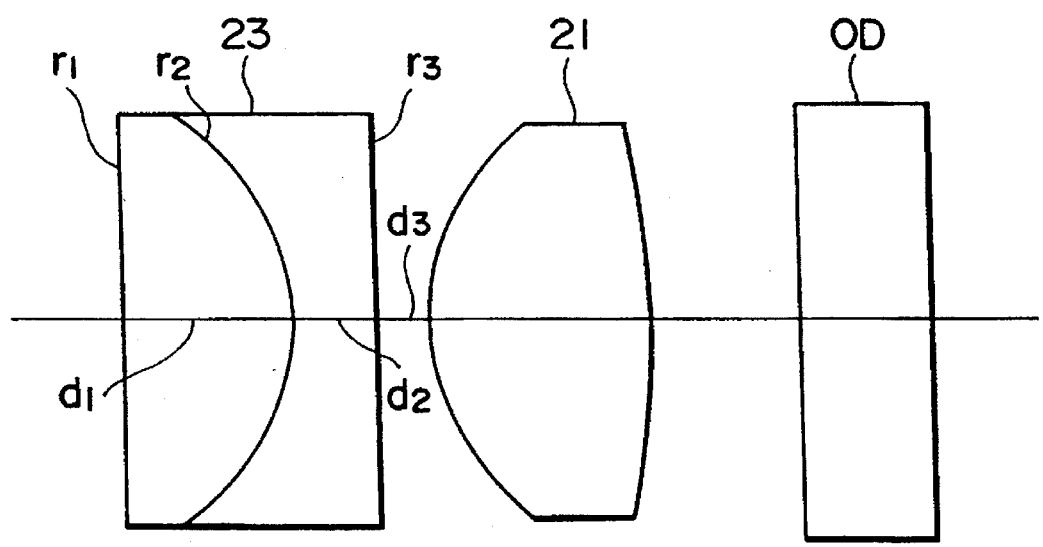
FIG. 15 is a lens diagram showing Example 3 of an objective optical system.

FIG. 15 shows EXAMPLE 3 of the objective optical system. The numerical value construction of the chromatic aberration correcting element is shown in Table 5. The objective lens and the cover glass of the optical disk is the same as that of EXAMPLE 1.

TABLE 5

| | NA 0.55 | f = 3.30 | ω = 1.7° | | |
|---|---|---|---|---|---|
| surface NO. | r | d | $n_{780}$ | $n_d$ | $v_{780}$ glass material name |
| 1 | ∞ | 1.600 | 1.68442 | 1.69350 | 1136 LaK08 |
| 2 | −2.200 | 0.800 | 1.68443 | 1.69895 | 755 |
| 3 | ∞ | 0.500 | | | |

Figure 16:
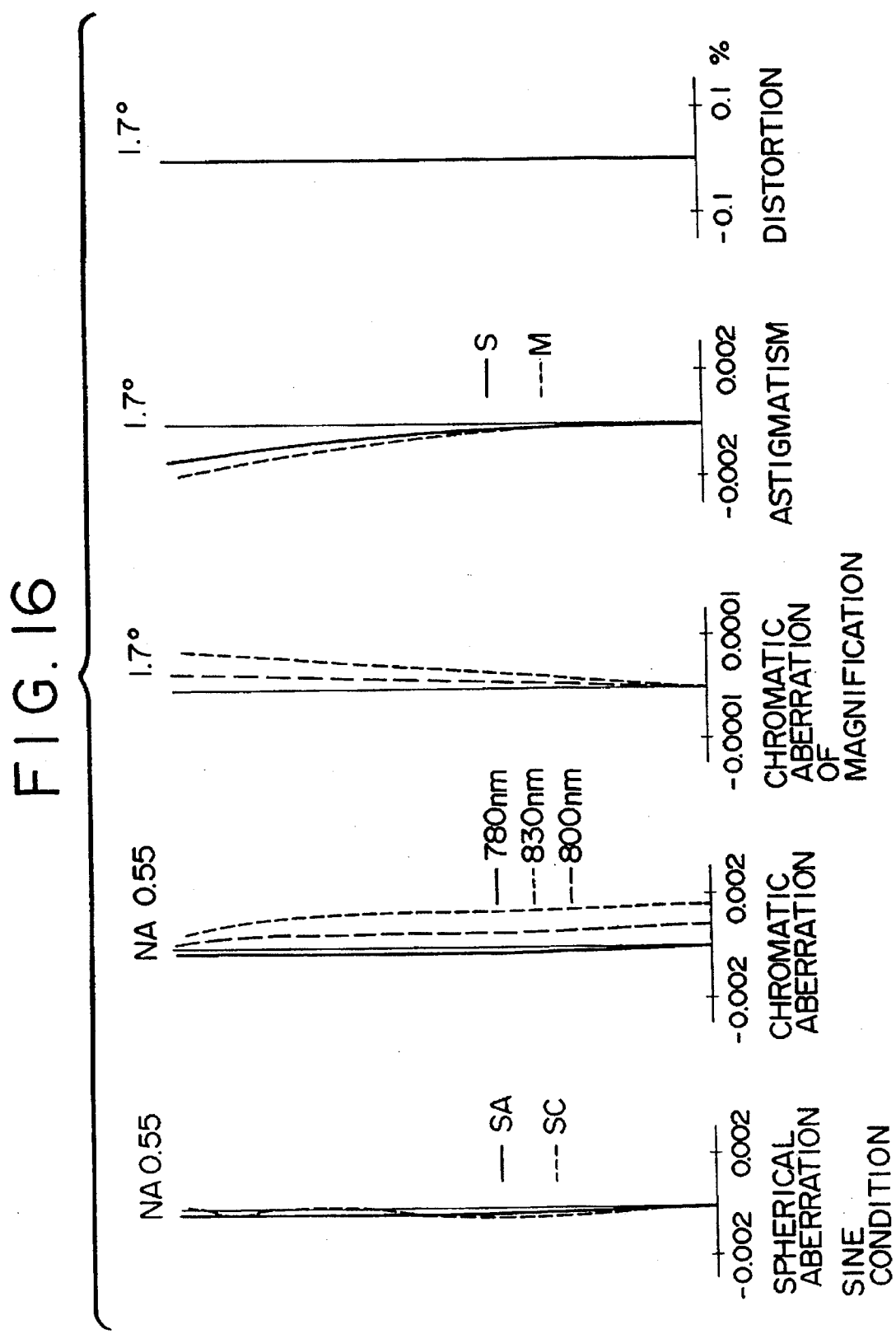
FIG. 16 are aberration diagrams of the objective optical system shown in FIG. 15.
Figure 17:
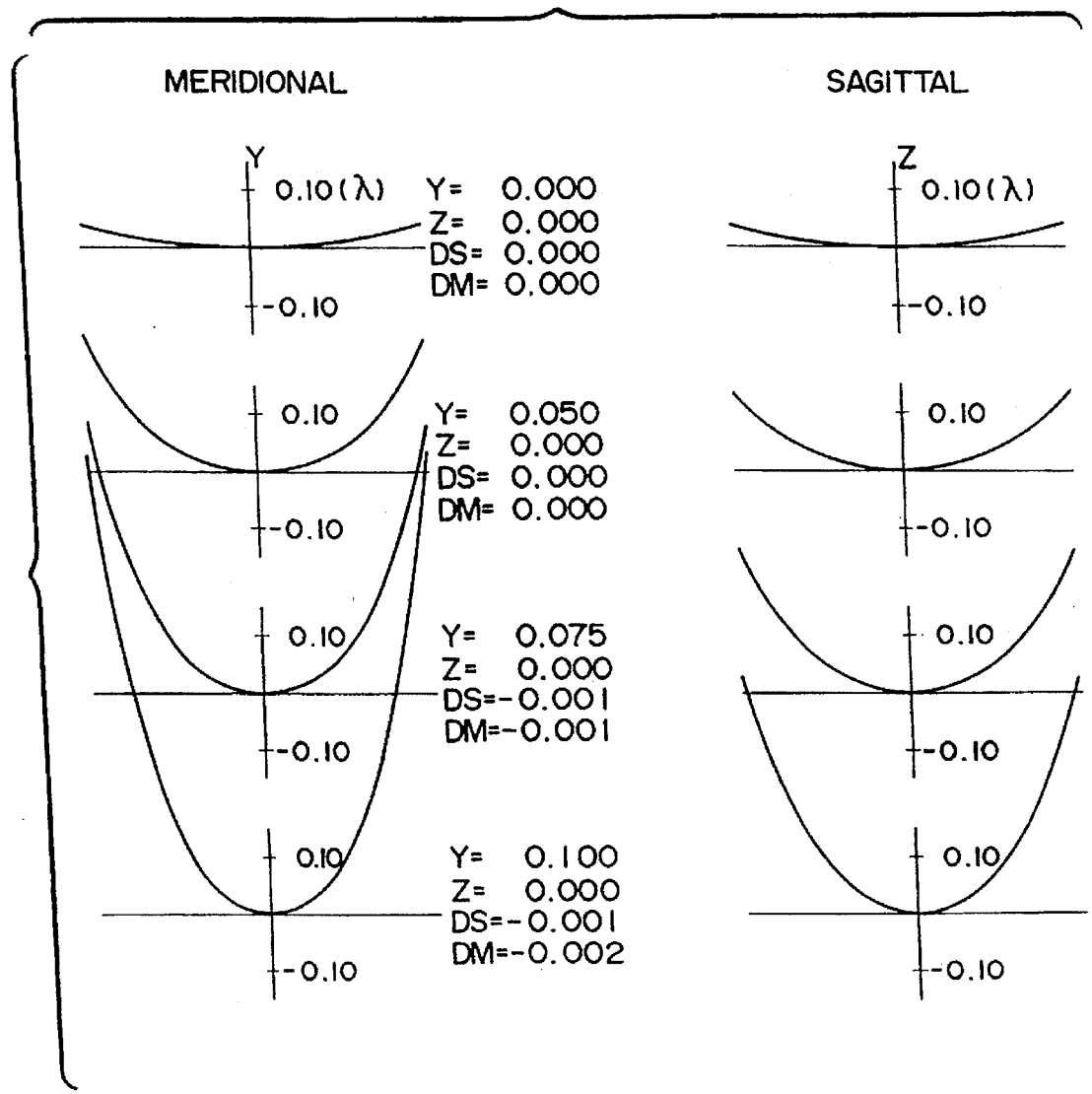
FIG. 17 are wave aberration diagrams of the objective optical system shown in FIG. 15.

Various aberrations of this objective optical system are shown in FIG. 16 and the wave aberrations are shown in FIG. 17.

EXAMPLE 4

Figure 18:
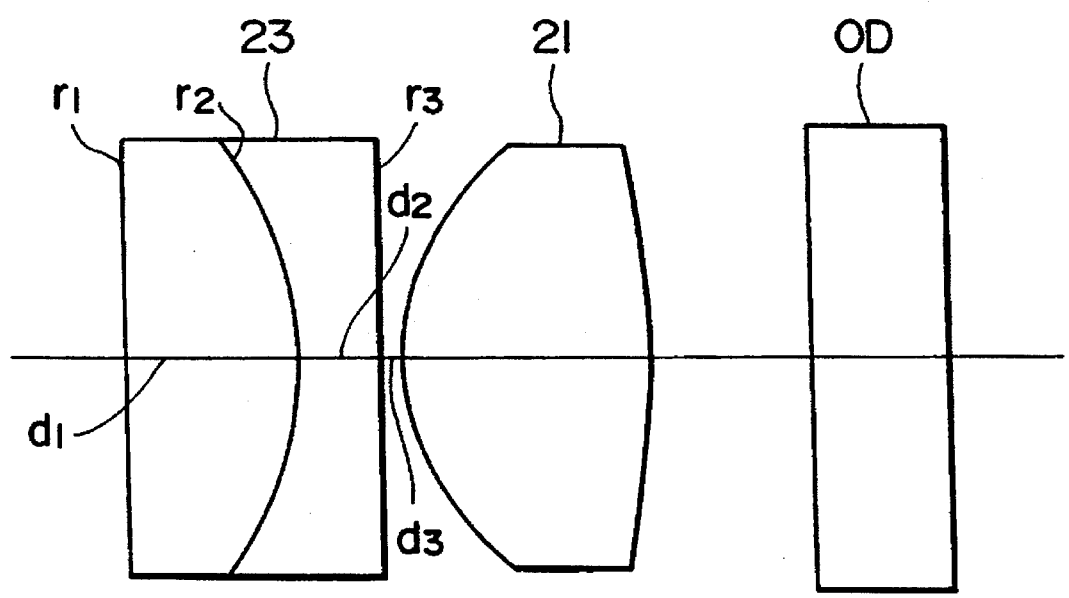
FIG. 18 is a lens diagram showing Example 4 of an objective optical system.

FIG. 18 shows EXAMPLE 4 of the objective optical system. The numerical value construction of the chromatic aberration correcting element is shown in Table 6. The objective lens and the cover glass of the optical disk is the same to that of EXAMPLE 1.

Figure 19:
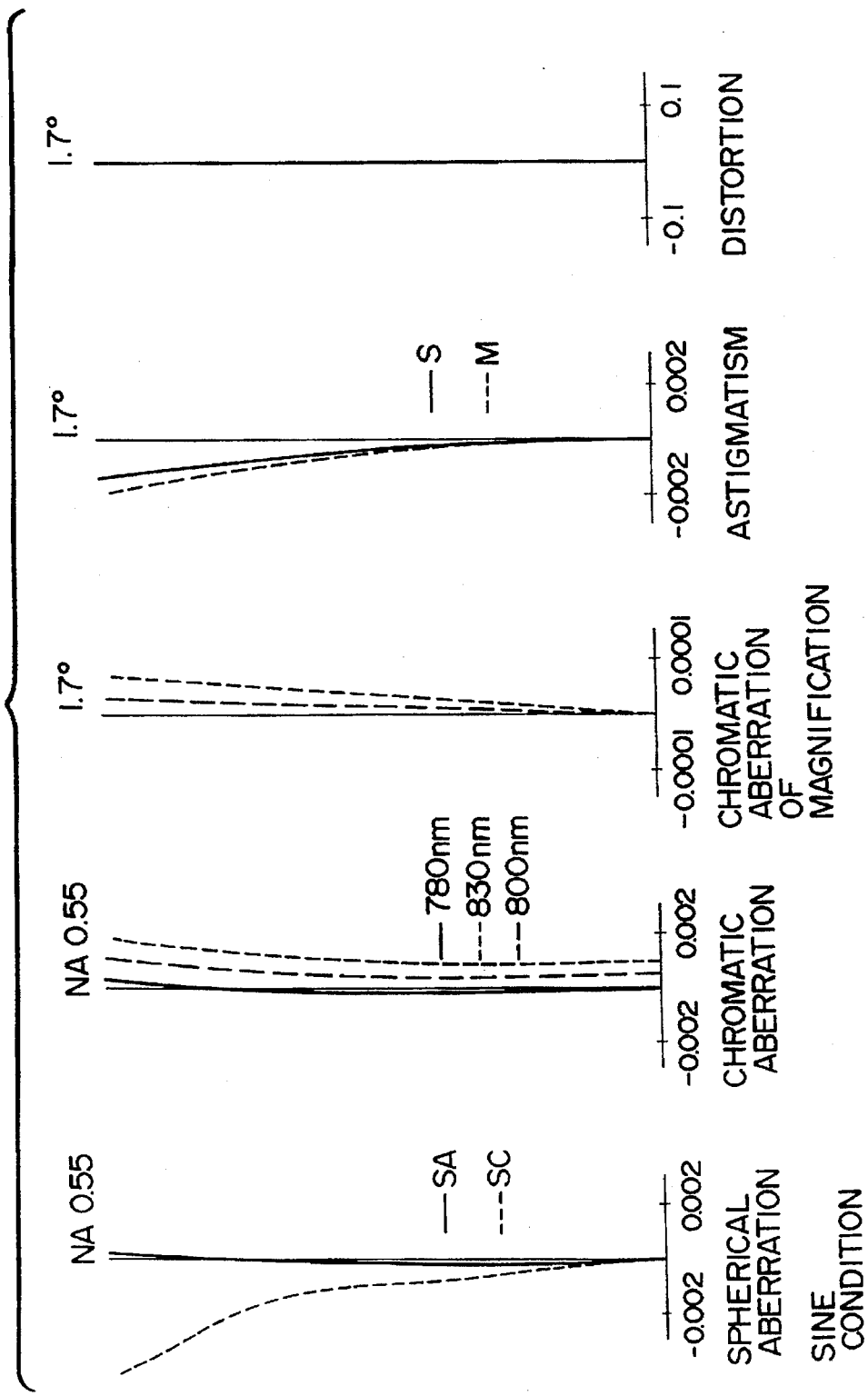
FIG. 19 are aberration diagrams of the objective optical system shown in FIG. 18.
Figure 20:
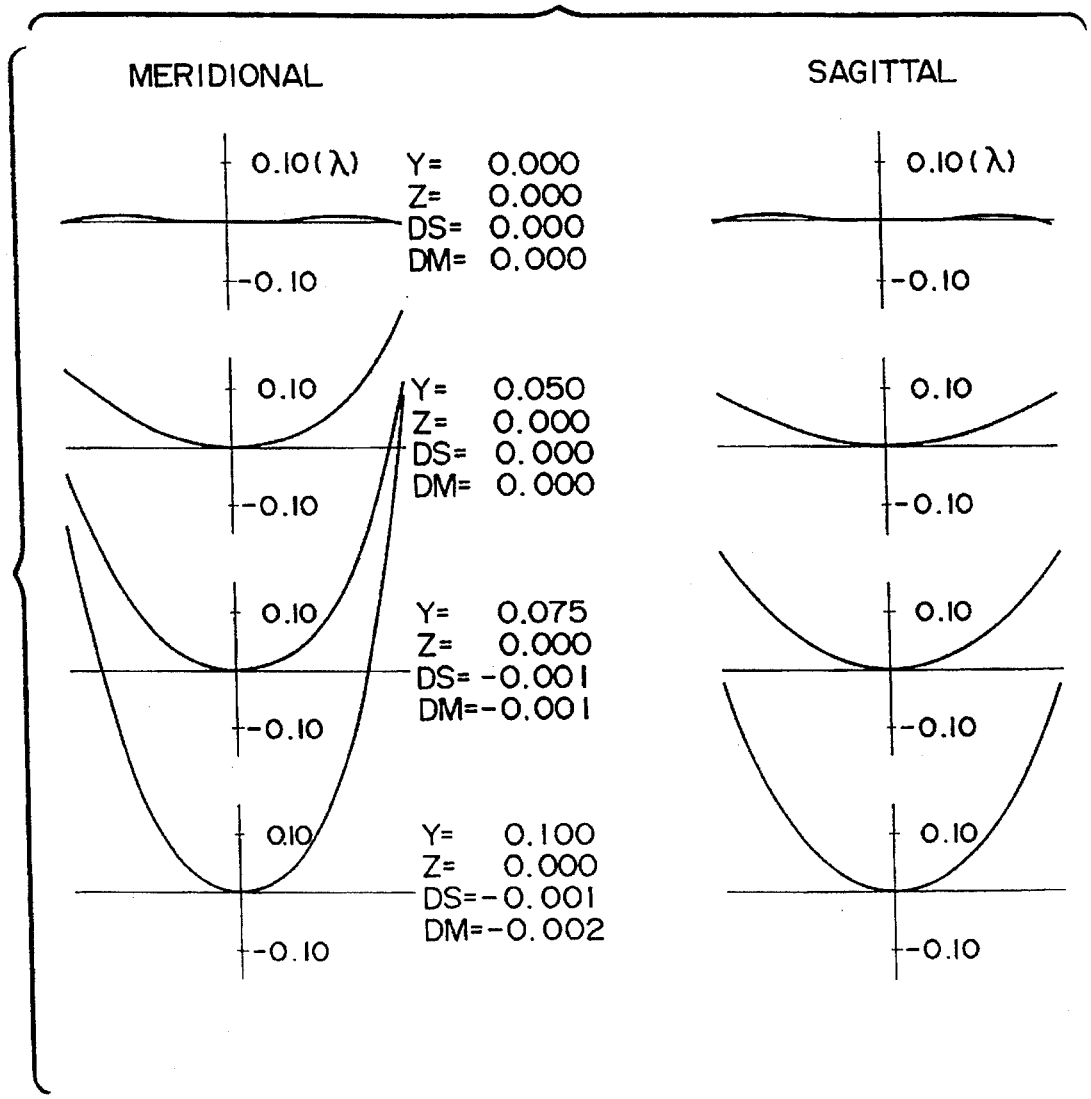
FIG. 20 are wave aberration diagrams of the objective optical system shown in FIG. 18.

Various aberrations of this objective optical system are shown in FIG. 19 and the wave aberrations are shown in FIG. 20.

TABLE 6

| | NA = 0.55 | f = 3.31 | ω = 1.7° | |
|---|---|---|---|---|
| surface NO. | r | d | $n_{780}$ | $v_{780}$ glass material name |
| 1 | ∞ | 1.50 | 1.82195 | 875 LaSF05 |
| 2 | −3.000 | 0.70 | 1.82484 | 553 SFL03 |
| 3 | ∞ | 0.20 | | |

EXAMPLE 5

Figure 21:
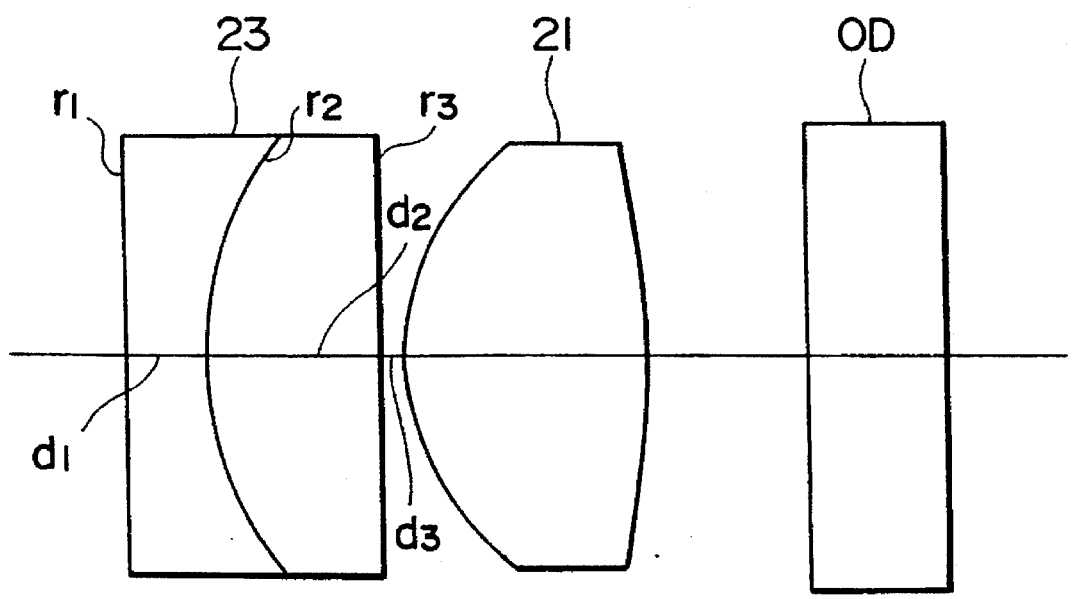
FIG. 21 is a lens diagram showing Example 5 of an objective optical system.

FIG. 21 shows EXAMPLE 5 of the objective optical system. The numerical value construction of the chromatic aberration correcting element is shown in Table 7. The objective lens and the cover glass of the optical disk is the same to that of EXAMPLE 1.

Figure 22:
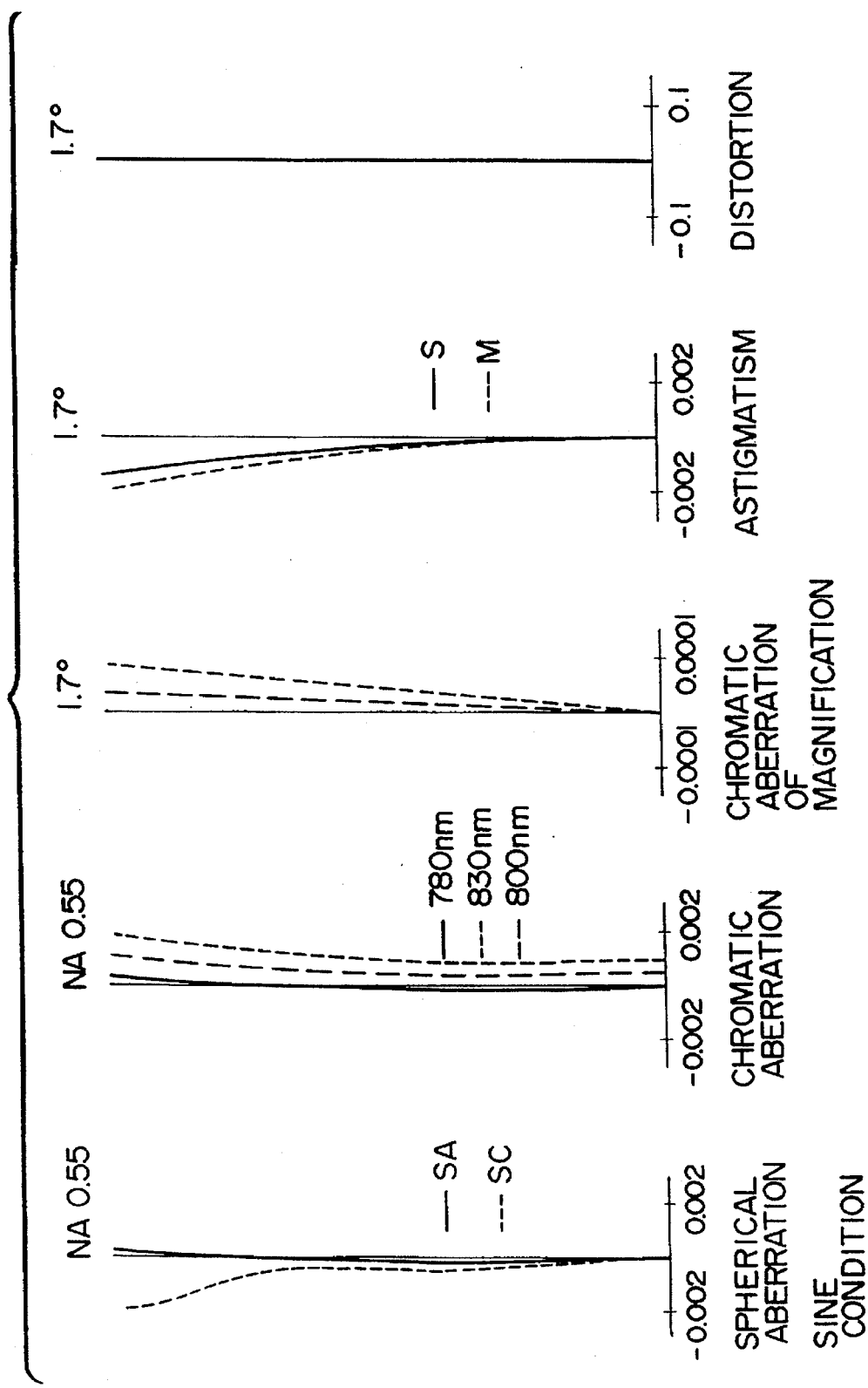
FIG. 22 are aberration diagrams of the objective optical system shown in FIG. 21.
Figure 23:
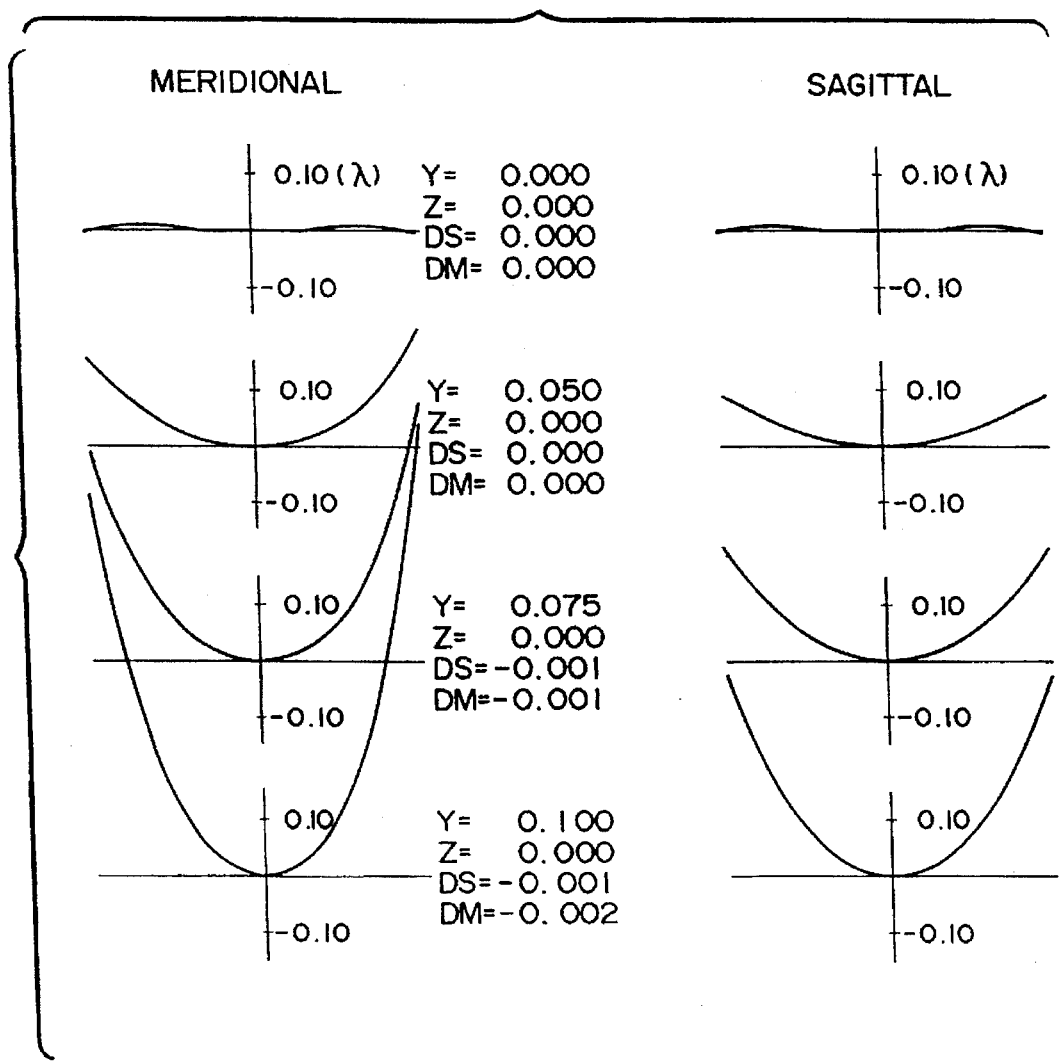
FIG. 23 are wave aberration diagrams of the objective optical system shown in FIG. 21.

Various aberrations of this objective optical system are shown in FIG. 22 and the wave aberrations are shown in FIG. 23.

TABLE 7

| | NA = 0.55 | f = 3.31 | ω = 1.7° | |
|---|---|---|---|---|
| surface NO. | r | d | $n_{780}$ | $v_{780}$ glass material name |
| 1 | ∞ | 0.70 | 1.82484 | 553 SFL03 |
| 2 | 3.000 | 1.50 | 1.82195 | 875 LaSF05 |
| 3 | ∞ | 0.20 | | |

EXAMPLE 6

Figure 24:
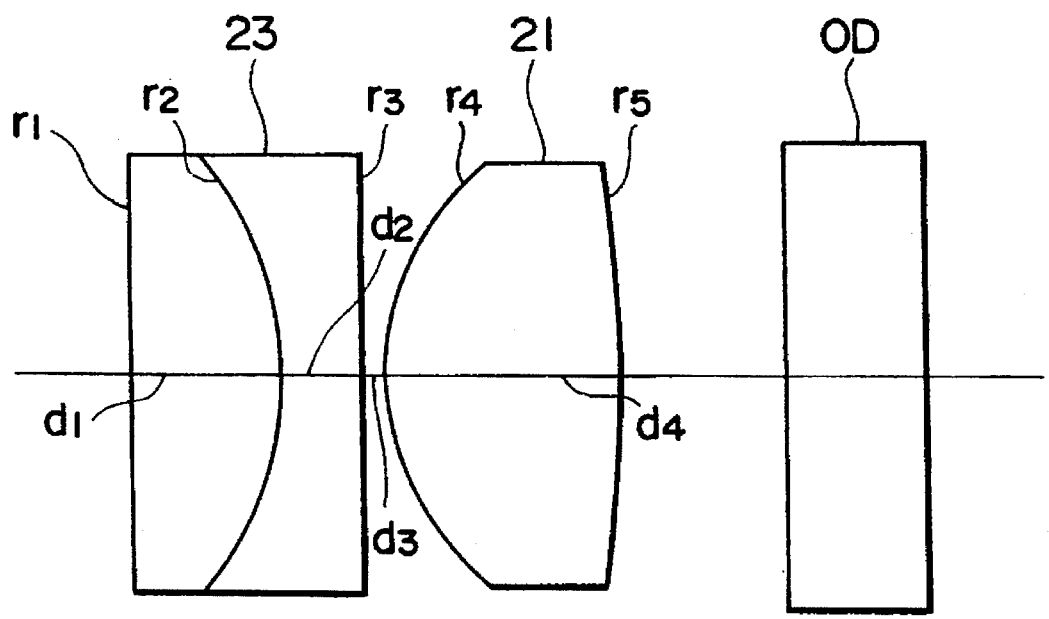
FIG. 24 is a lens diagram showing Example 6 of an objective optical system.
Figure 25:
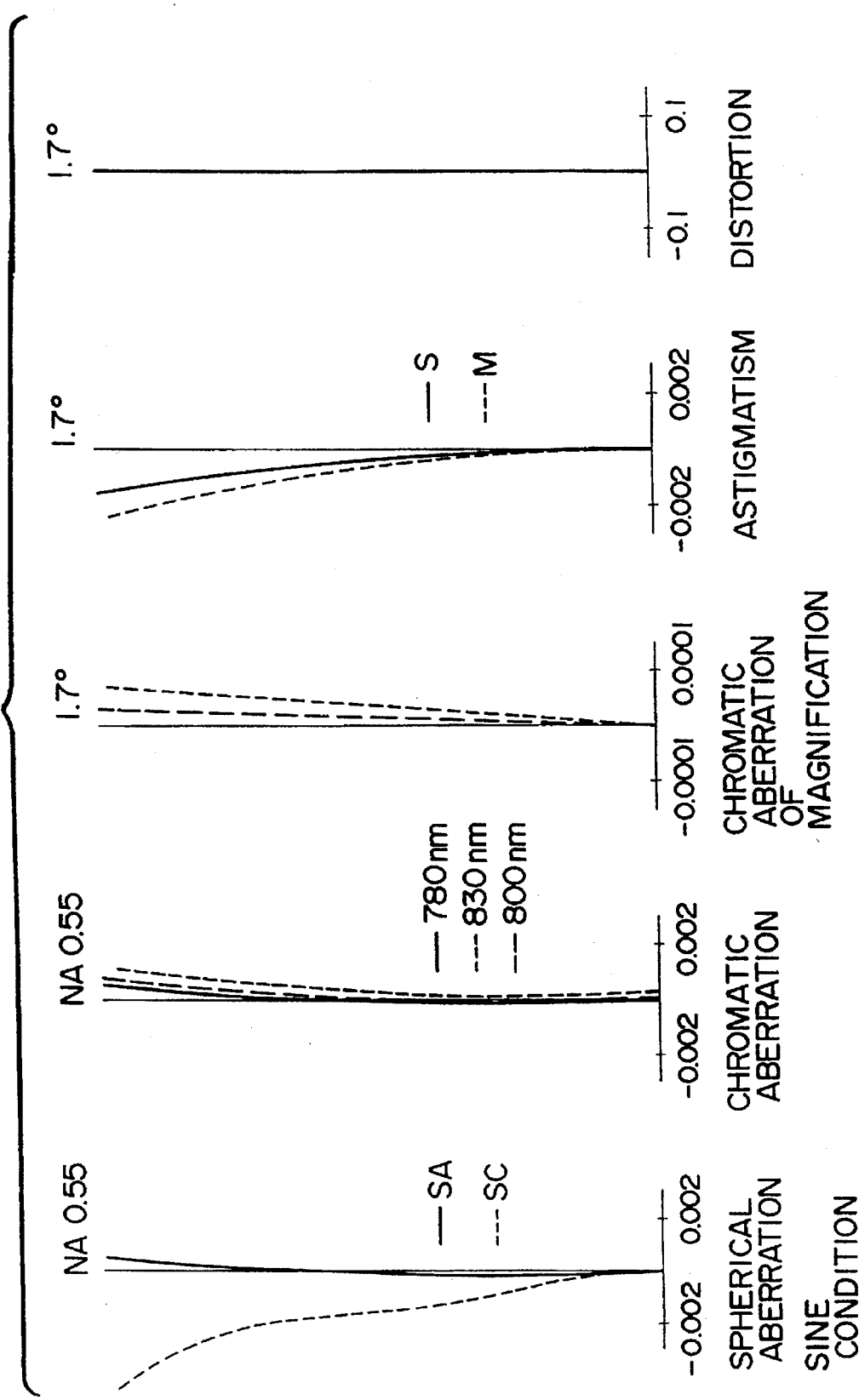
FIG. 25 are aberration diagrams of the objective optical system shown in FIG. 24.
Figure 26:
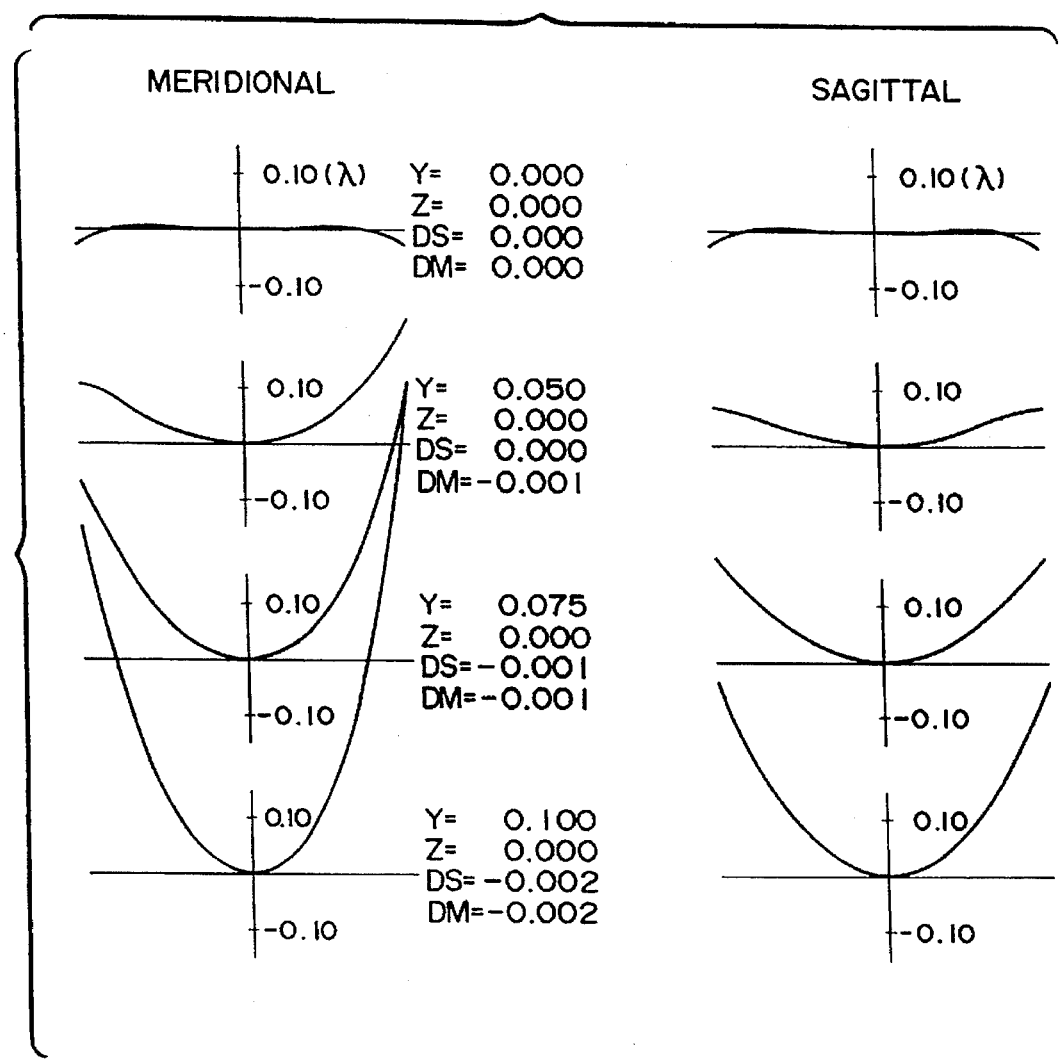
FIG. 26 are wave aberration diagrams of the objective optical system shown in FIG. 24.

FIG. 24 shows EXAMPLE 6 of the objective optical system and concrete numerical value construction is shown in TABLE 8. The aspherical coefficients of the objective lens are shown in TABLE 9. Various aberrations of this objective optical system are shown in FIG. 22 and the wave aberrations are shown in FIG. 23.

Figure 27:
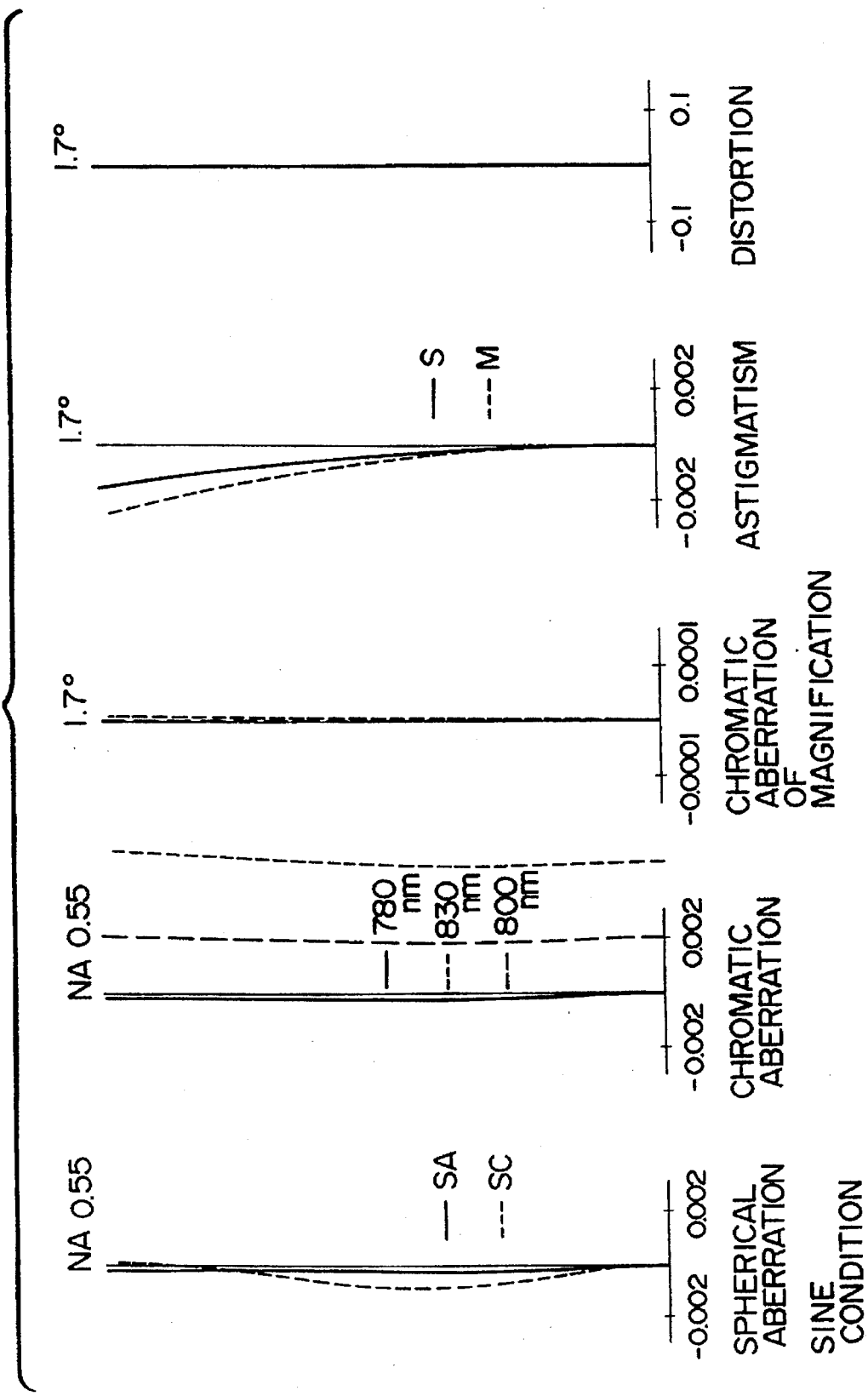
FIG. 27 are wave aberration diagrams of a single unit of the objective lens shown in FIG. 24.

Also, in order to determine the effect of the chromatic aberration correcting element, various aberrations and the wave aberrations by a single unit of the objective lens are shown in FIGS. 27 and 28.

TABLE 8

NA = 0.55   f = 3.31   ω = 1.7°

| surface NO. | r | d | $n_{780}$ | $v_{780}$ | glass material name |
|---|---|---|---|---|---|
| 1 | ∞ | 1.30 | 1.82195 | 875 | LaSF05 |
| 2 | −2.900 | 0.70 | 1.82484 | 553 | SFL03 |
| 3 | ∞ | 0.20 | | | |
| 4 | 2.116 | 2.00 | 1.53670 | 1507 | |
| 5 | −7.278 | | | | |

TABLE 9

| | 4th surface | 5th surface |
|---|---|---|
| K | −0.5086E+00 | −0.9722E+00 |
| $A_4$ | 0.5580E−04 | 0.1344E−01 |
| $A_6$ | −0.1938E−04 | −0.2130E−02 |
| $A_8$ | 0.3046E−04 | 0.1502E−03 |
| $A_{10}$ | −0.1039E−04 | 0.2659E−05 |
| $A_{12}$ | 0.0000E+00 | 0.0000E+00 |

EXAMPLE 7

Figure 29:
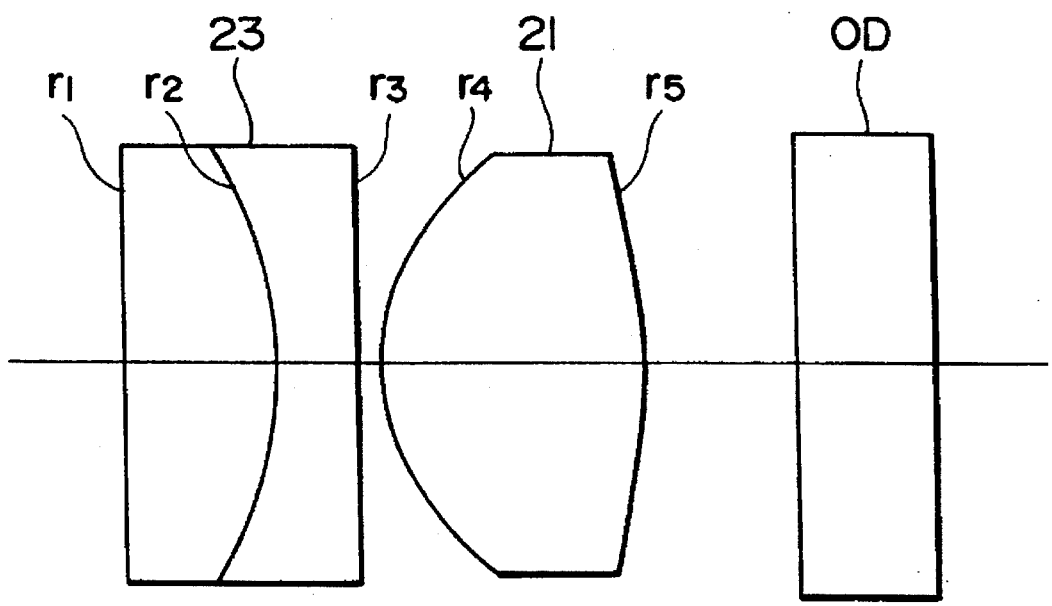
FIG. 29 is a lens diagram showing Example 7 of an objective optical system.
Figure 30:
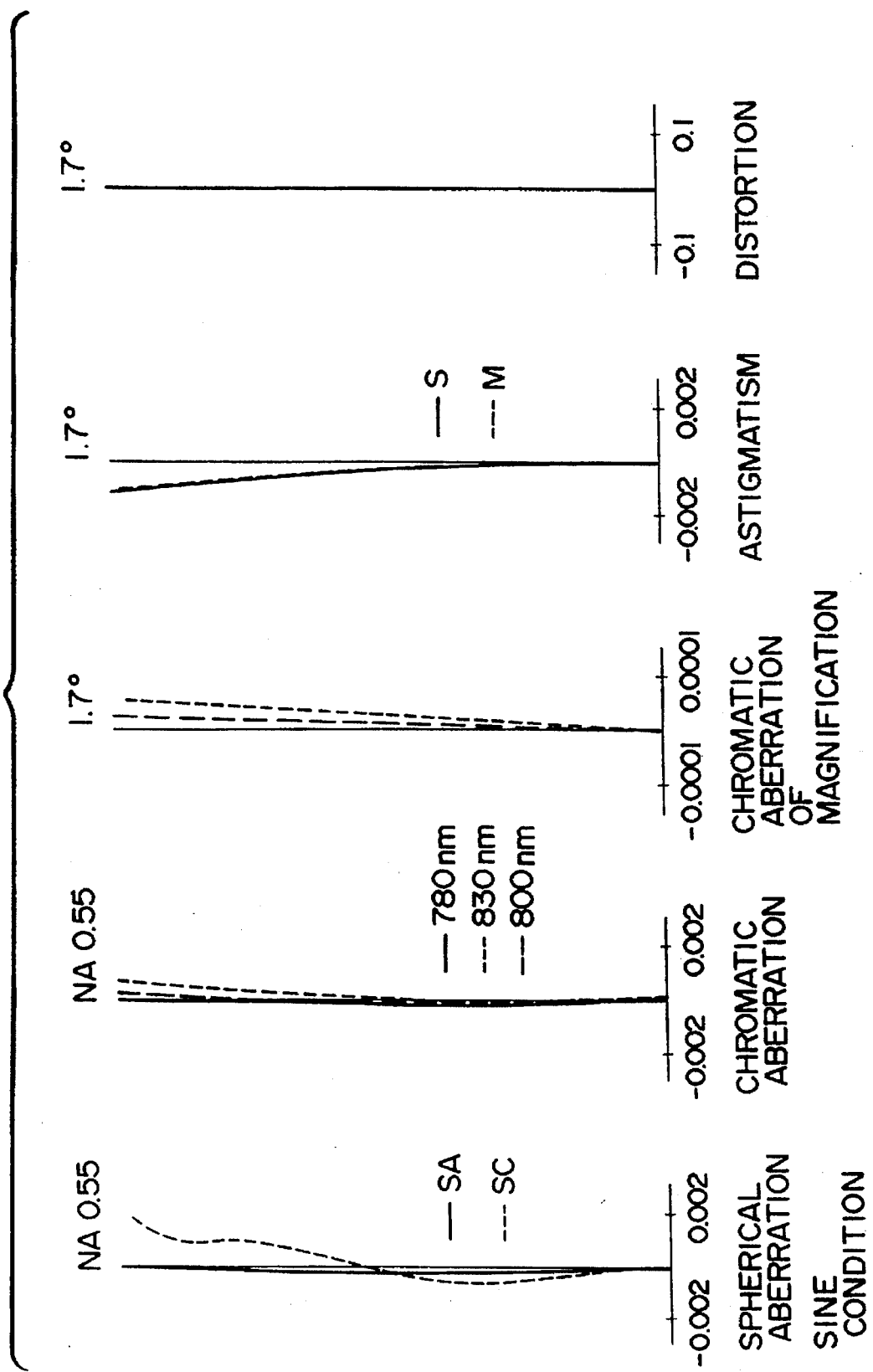
FIG. 30 are aberration diagrams of the objective optical systems shown in FIG. 29.
Figure 31:
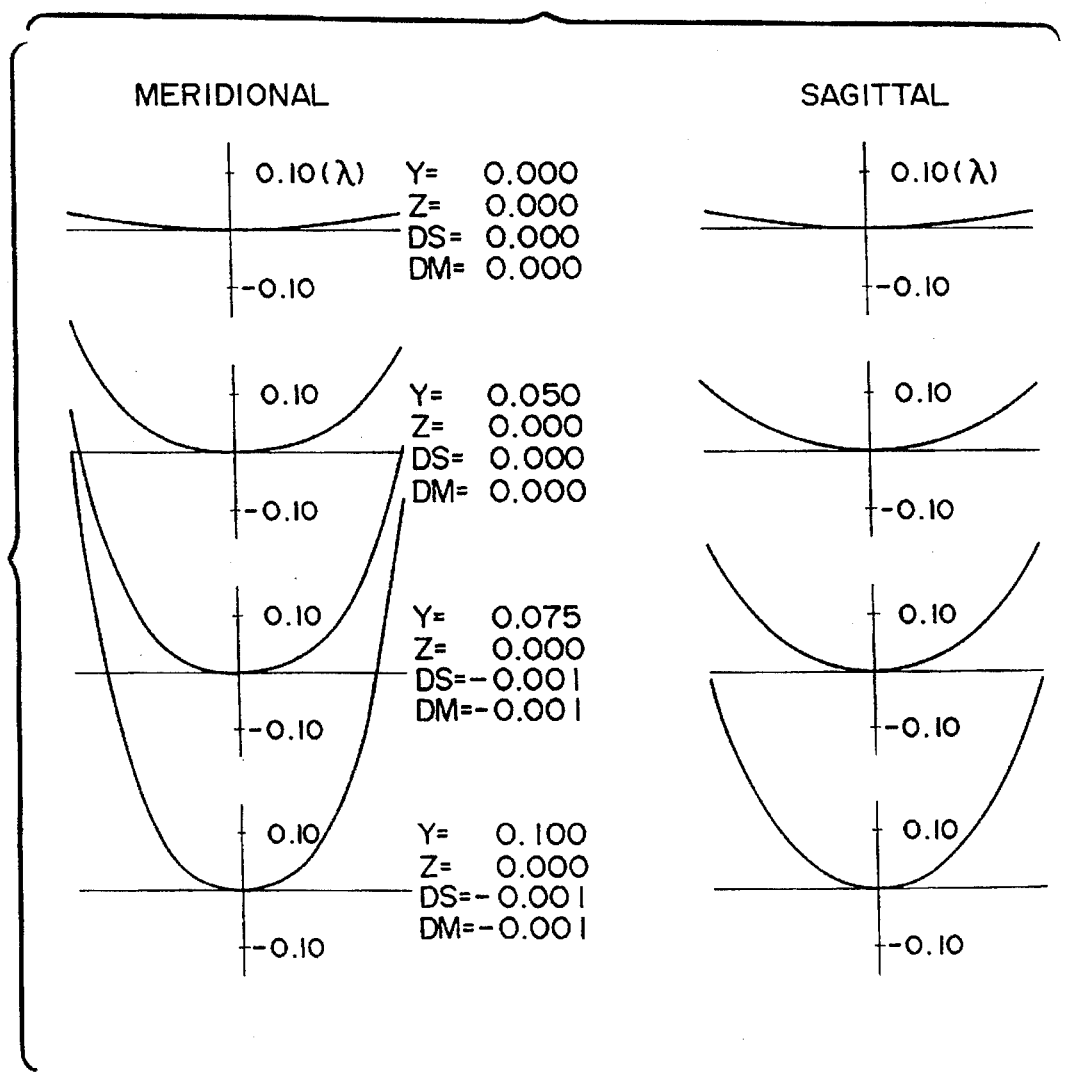
FIG. 31 are wave aberration diagrams of the objective optical system shown in FIG. 29.
Figure 32:
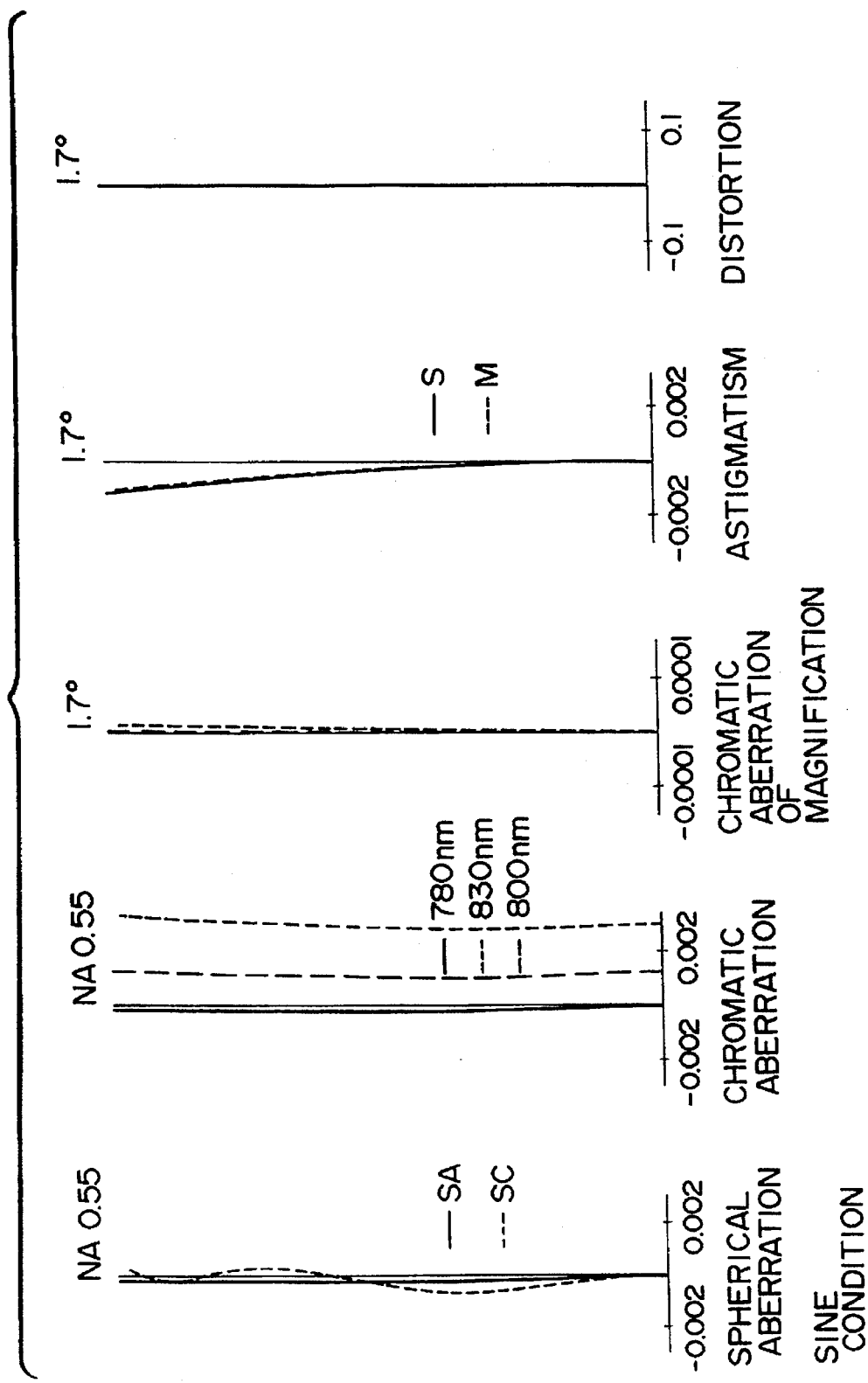
FIG. 32 are aberration diagrams of a single unit of the objective lens shown in FIG. 29.
Figure 33:
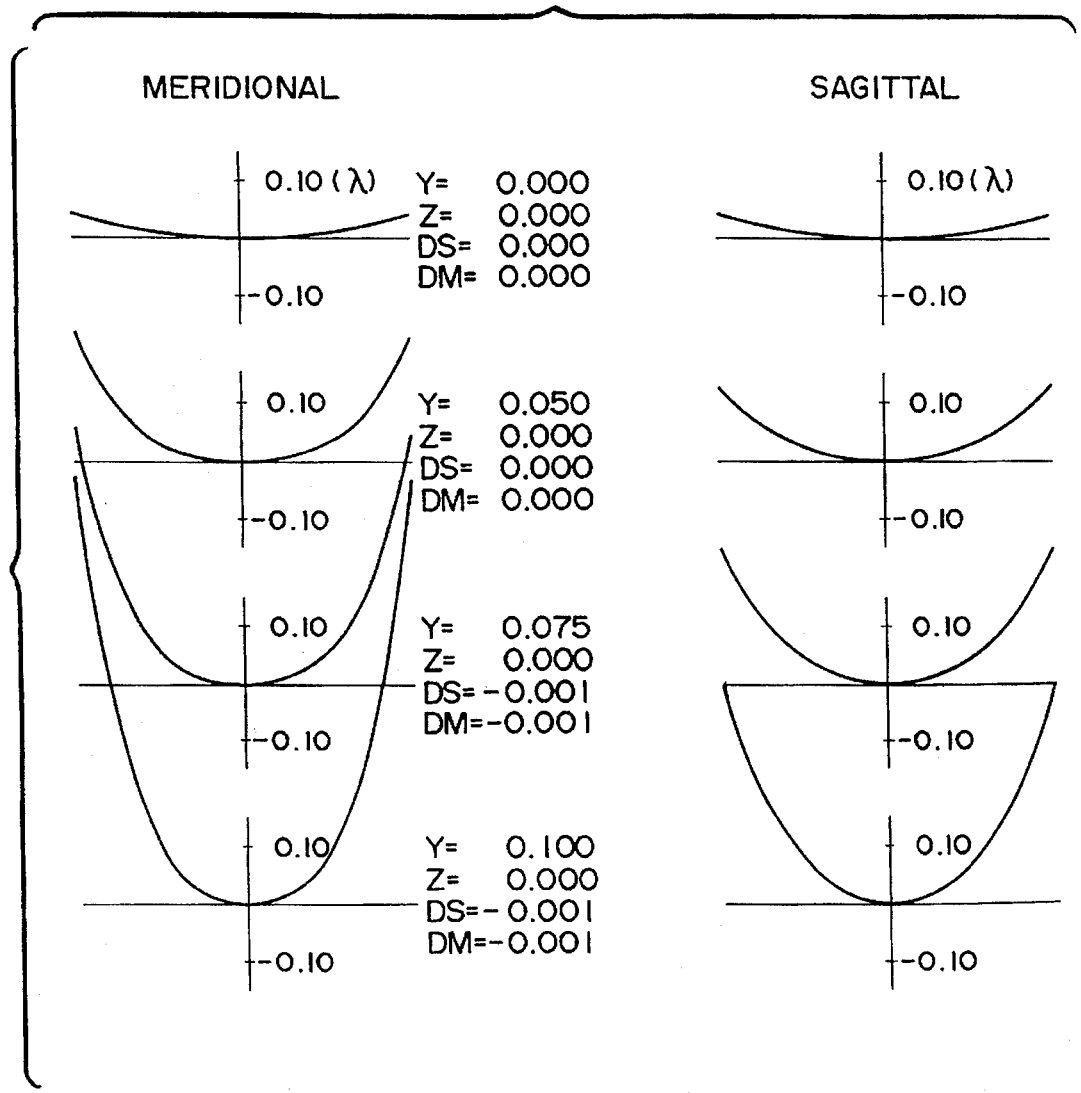
FIG. 33 are wave aberration diagrams of a single unit of the objective lens shown in FIG. 29.

FIG. 29 shows EXAMPLE 7 of the objective optical system, concrete numerical value construction is shown in TABLE 10 and the coefficients of the aspherical surfaces of the objective lens are shown in TABLE 11. Various aberrations of this objective optical system are shown in FIG. 30 and the wave aberrations are shown in FIG. 31. Also, in order to determine the effect of the chromatic aberration correcting element, various aberrations and the wave aberrations by a single unit of the objective lens are shown in FIGS. 32 and 33.

TABLE 10

NA = 0.55   f = 3.30   ω = 1.7°

| surface NO. | r | d | $n_{780}$ | $v_{780}$ | glass material name |
|---|---|---|---|---|---|
| 1 | ∞ | 1.30 | 1.78705 | 880 | LaSF02 |
| 2 | −3.600 | 0.70 | 1.78565 | 601 | SFL6 |
| 3 | ∞ | 0.20 | | | |
| 4 | 1.883 | 2.24 | 1.43107 | 1461 | |
| 5 | −3.732 | | | | |

TABLE 11

| | 4th surface | 5th surface |
|---|---|---|
| K | −0.5627E+00 | −0.4708E+01 |
| $A_4$ | −0.1402E−03 | 0.2011E−01 |
| $A_6$ | −0.6290E−04 | −0.5946E−02 |
| $A_8$ | 0.4537E−04 | 0.9448E−03 |
| $A_{10}$ | −0.2548E−04 | −0.6470E−04 |
| $A_{12}$ | 0.0000E+00 | 0.0000E+00 |

EXAMPLE 8

Figure 34:
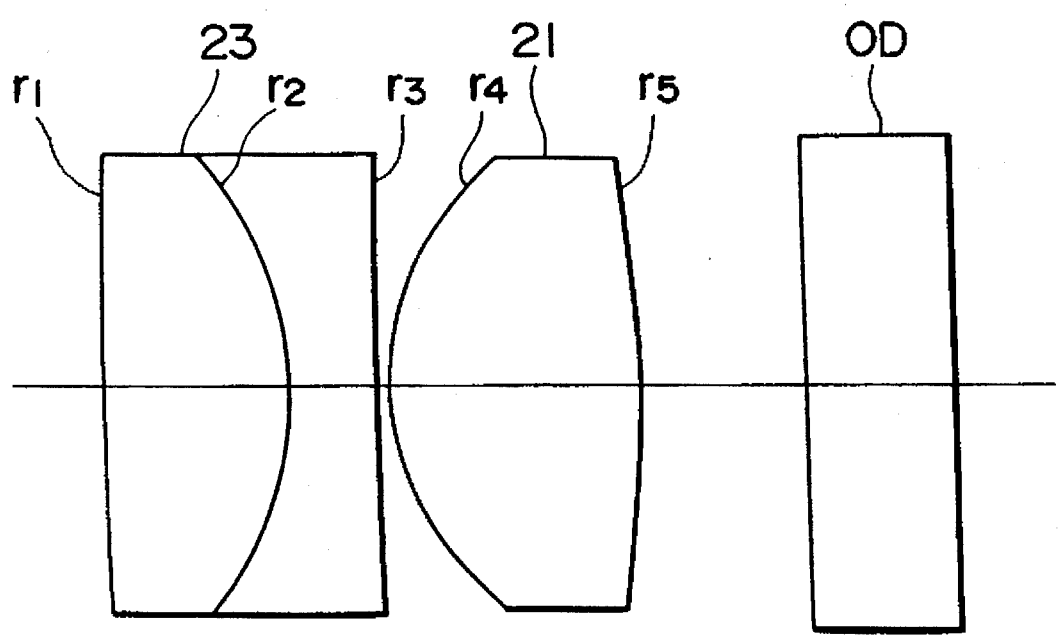
FIG. 34 is a lens diagram showing example 8 of the objective optical system.

FIG. 34 shows EXAMPLE 8 of the objective optical system, concrete numerical value construction is shown in TABLE 12 and the coefficients of the aspherical surfaces of the objective lens are shown in TABLE 13. In this example, first and third surfaces are not planar.

TABLE 12

NA = 0.55   f = 3.30   ω = 1.7°

| surface NO. | r | d | $n_{780}$ | $v_{780}$ | glass material name |
|---|---|---|---|---|---|
| 1 | 50.000 | 1.50 | 1.82195 | 875 | LaSF05 |
| 2 | −2.822 | 0.70 | 1.82484 | 553 | SFL03 |
| 3 | 50.000 | 0.10 | | | |
| 4 | 2.089 | 2.00 | 1.53670 | 1507 | |
| 5 | −6.770 | | | | |

TABLE 13

| | 4th surface | 5th surface |
|---|---|---|
| K | −0.4168E+00 | −0.5220E+00 |
| $A_4$ | −0.9556E−03 | 0.1663E−01 |
| $A_6$ | −0.1979E−03 | −0.3824E−02 |
| $A_8$ | 0.3396E−05 | 0.5343E−03 |
| $A_{10}$ | −0.1894E−04 | −0.3071E−04 |
| $A_{12}$ | 0.0000E+00 | 0.0000E+00 |

Figure 35:
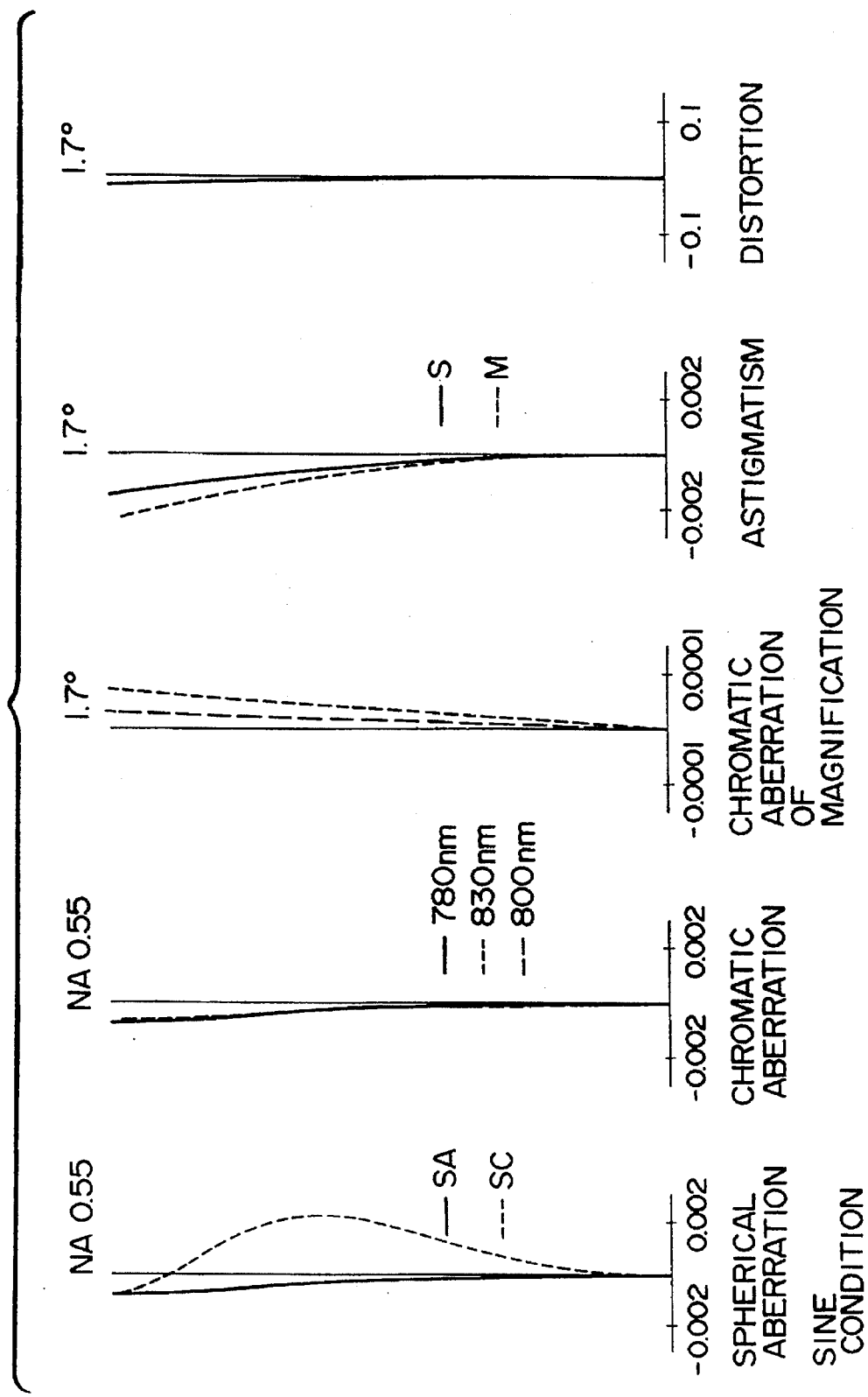
FIG. 35 are aberration diagrams of the objective optical system shown in FIG. 34.
Figure 36:
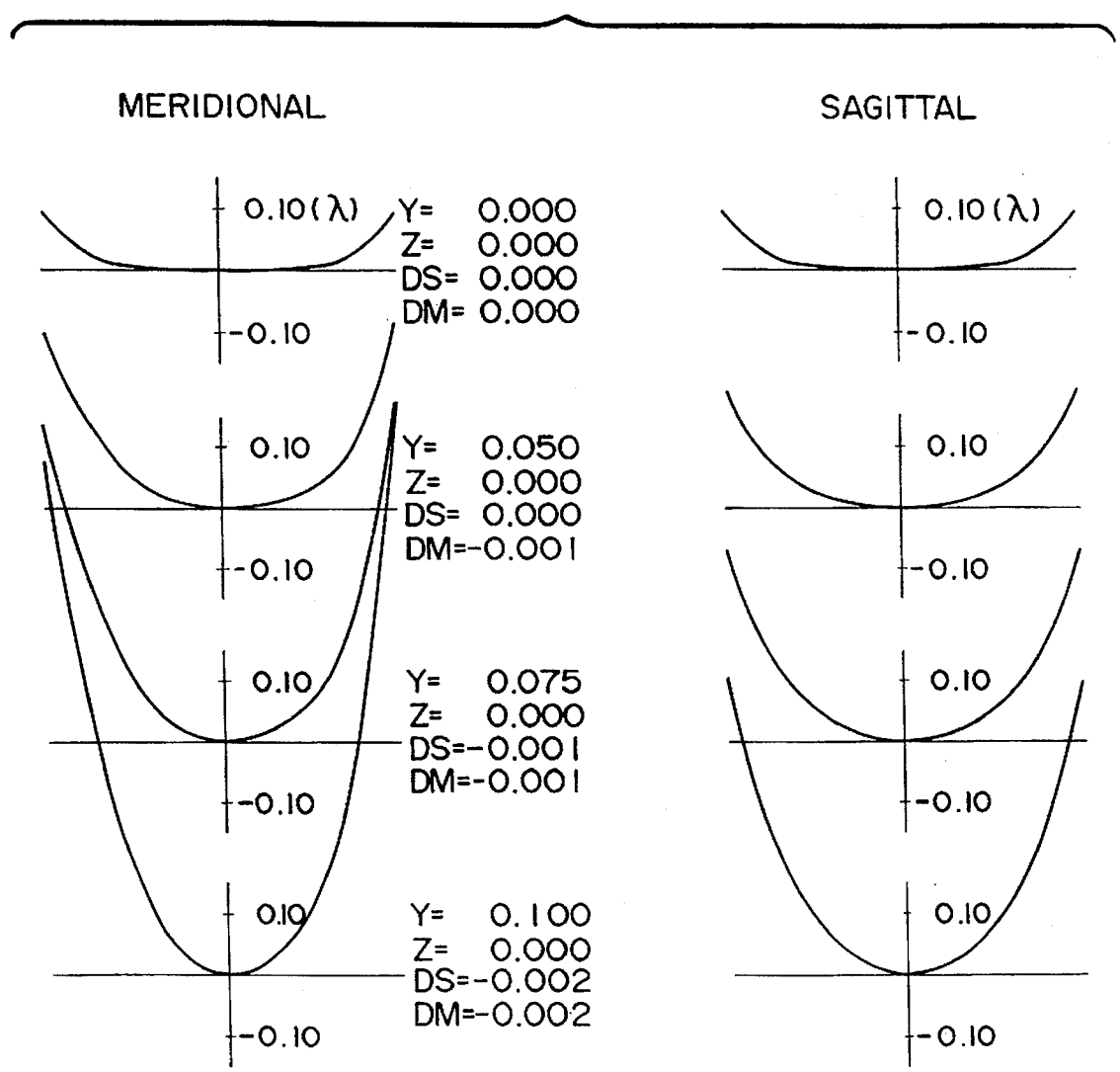
FIG. 36 are wave aberration diagrams of the objective optical system shown in FIG. 34.

Various aberrations of this objective optical system are shown in FIG. 35 and the wave aberrations are shown in FIG. 36.

EXAMPLE 9

Figure 37:
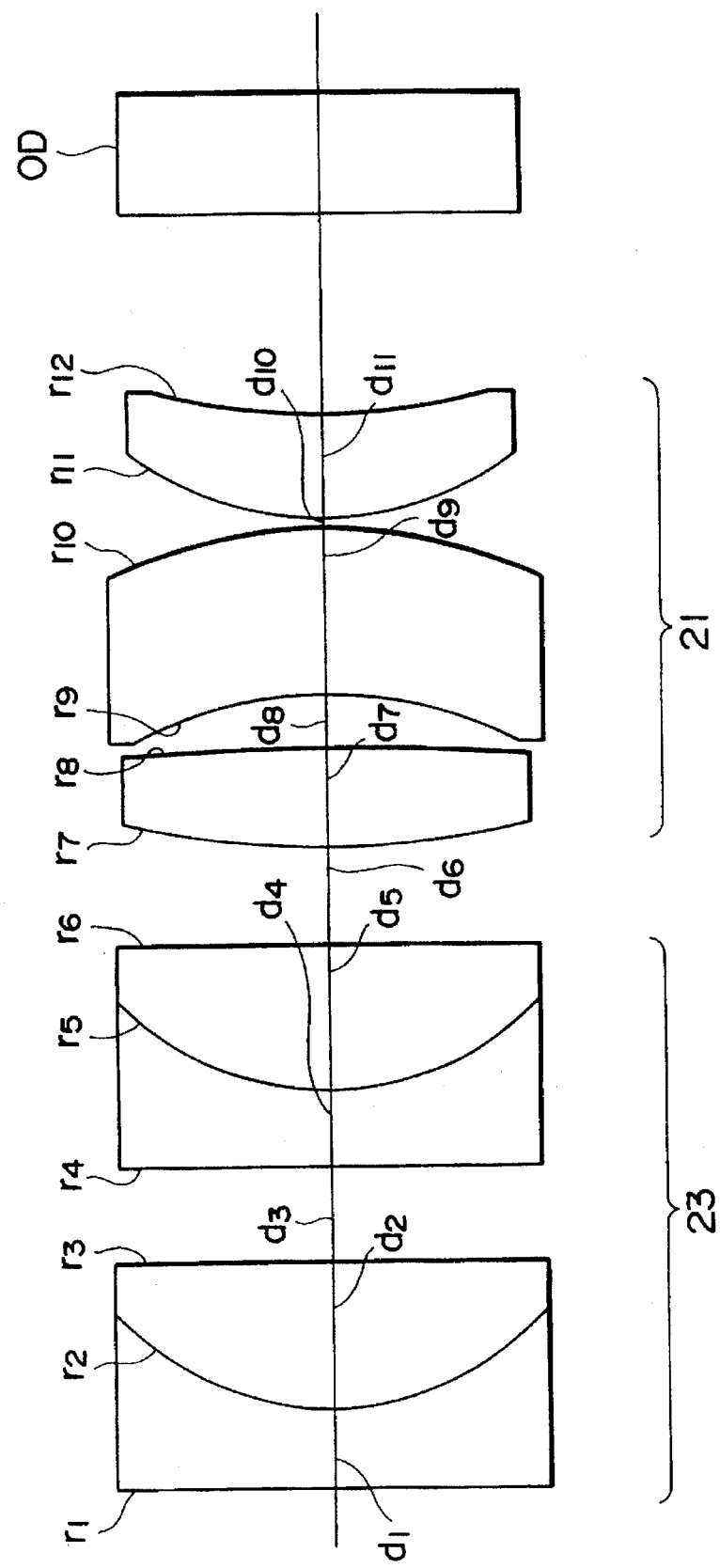
FIG. 37 is a lens diagram showing Example 9 of the objective optical system.

FIG. 37 shows EXAMPLE 9 of the objective optical system, and concrete numerical value construction is shown in TABLE 14. In this example, a glass lens of 3 piece structure is used as the objective lens, and the optical system has two chromatic aberration correcting elements.

TABLE 14

NA = 0.55   f = 3.72   ω = = 1.5°

| surface NO. | r | d | $n_{780}$ | $n_d$ | $v_{780}$ |
|---|---|---|---|---|---|
| 1 | ∞ | 0.80 | 1.68443 | 1.69895 | 755 |
| 2 | 2.850 | 1.50 | 1.68442 | 1.69350 | 1136 |
| 3 | ∞ | 1.00 | | | |
| 4 | ∞ | 0.80 | 1.68443 | 1.69895 | 755 |
| 5 | 2.850 | 1.50 | 1.68442 | 1.69350 | 1136 |
| 6 | ∞ | 1.00 | | | |
| 7 | 9.066 | 1.00 | 1.79250 | 1.80400 | |
| 8 | −29.920 | 0.55 | | | |
| 9 | −4.080 | 1.74 | 1.78565 | 1.80518 | |
| 10 | −4.768 | 0.08 | | | |
| 11 | 3.120 | 1.07 | 1.86890 | 1.88300 | |
| 12 | 7.118 | 1.96 | | | |

Figure 38:
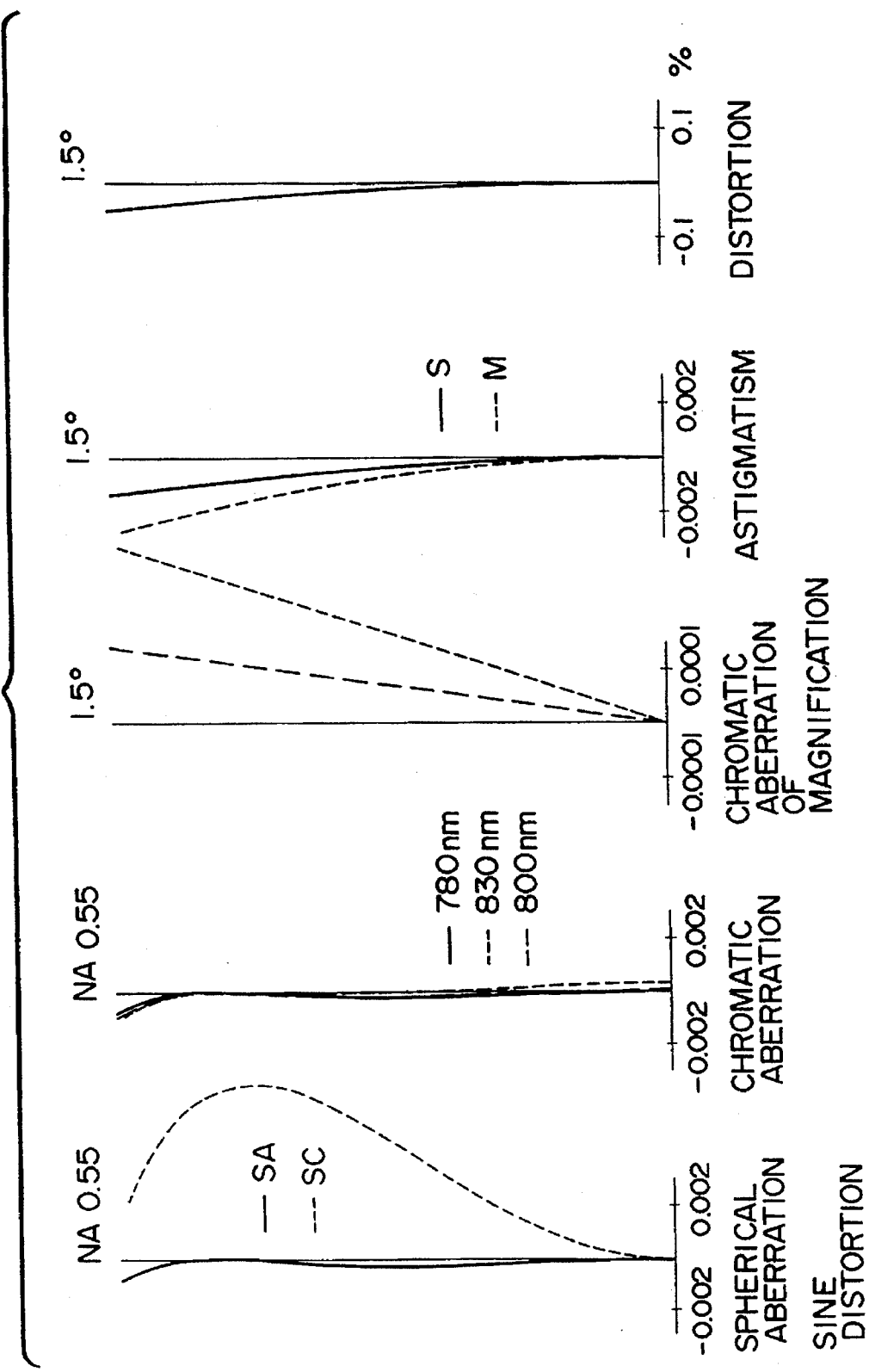
FIG. 38 are aberration diagrams of the objective optical system shown in FIG. 37.
Figure 39:
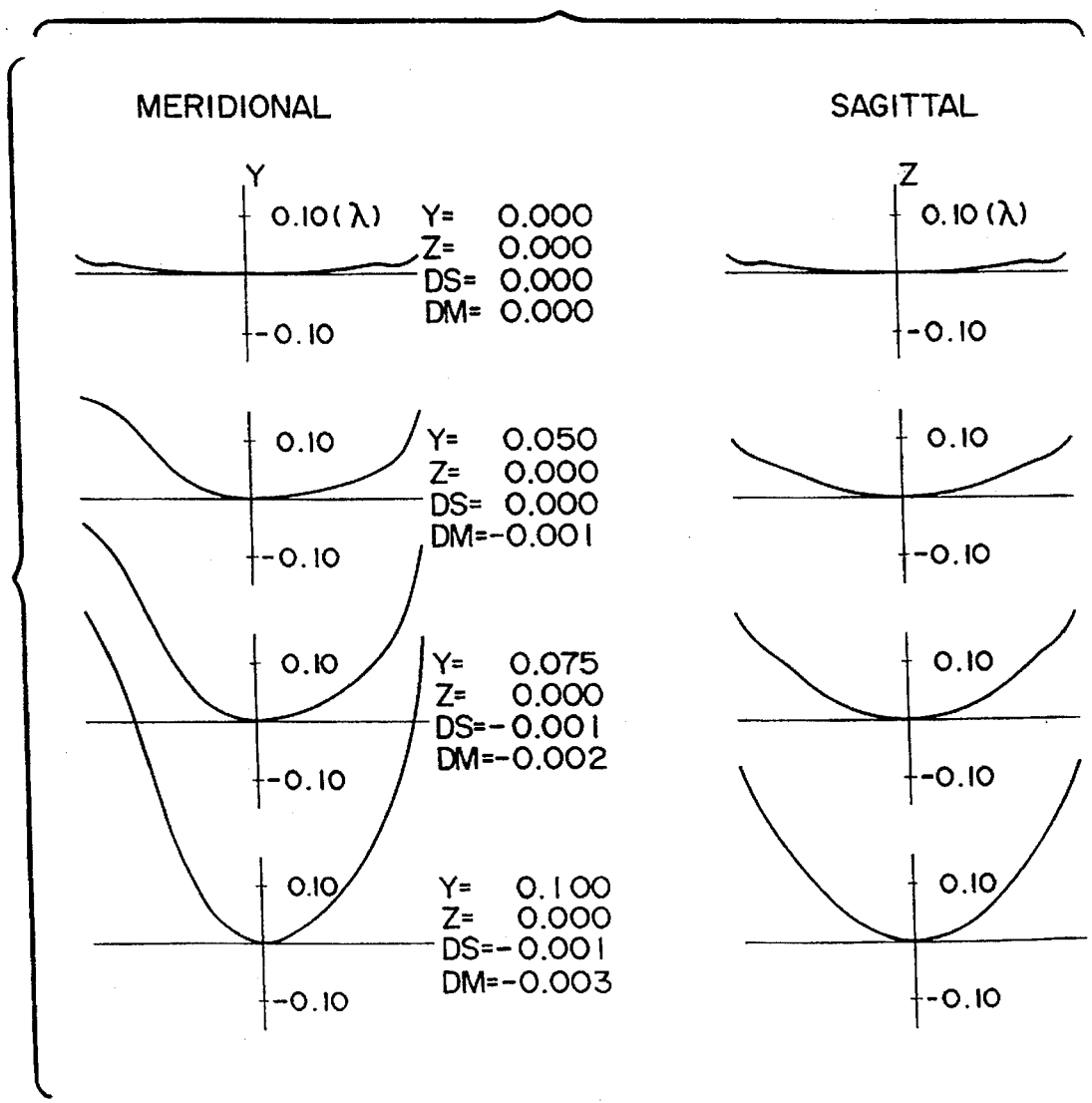
FIG. 39 are wave aberration diagrams of a single unit of the objective lens shown in FIG. 37.
Figure 40:
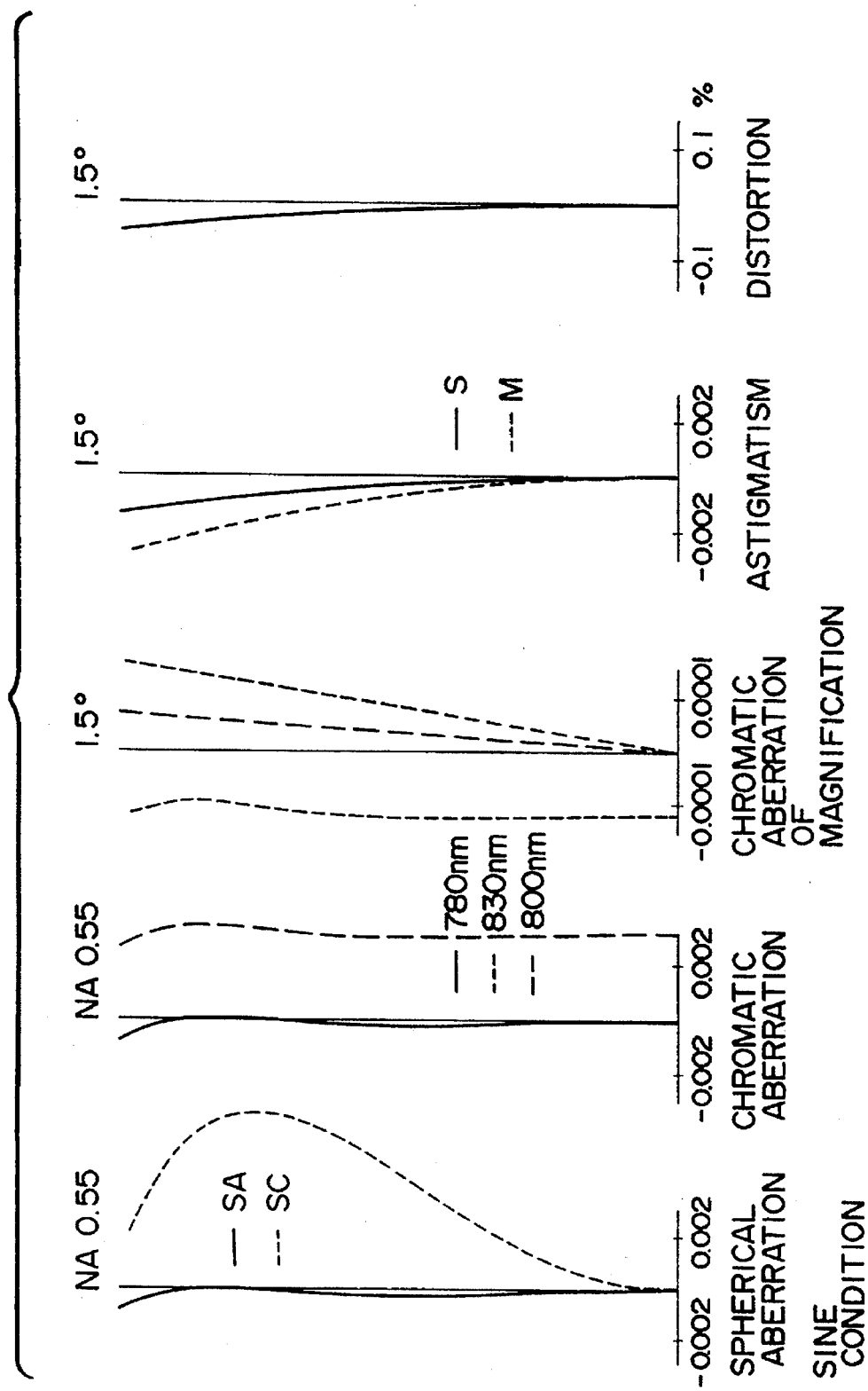
FIG. 40 are aberration diagrams of a single unit of the objective lens shown in FIG. 37.
Figure 41:
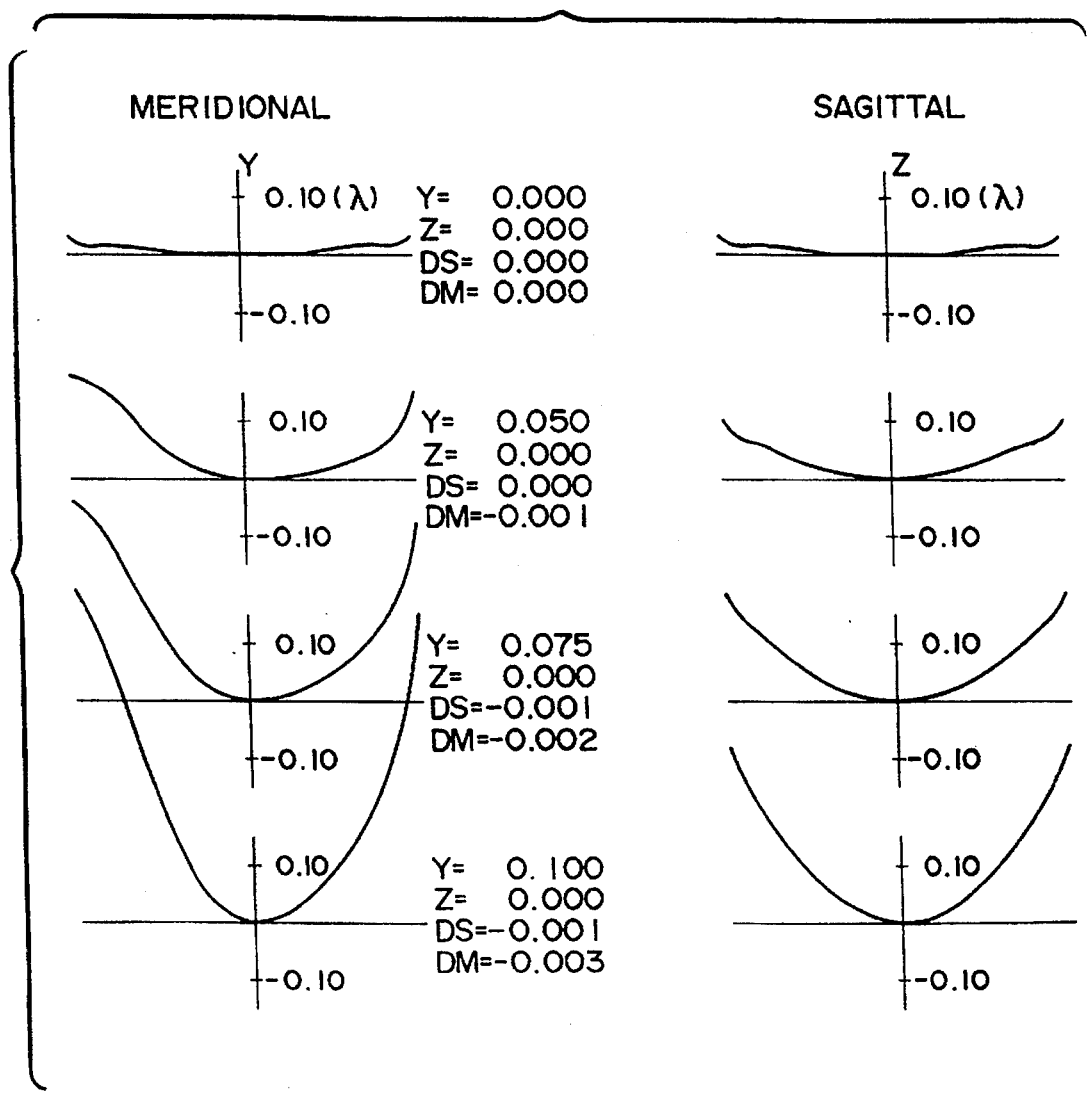
FIG. 41 are wave aberration diagrams by a single unit of the objective lens shown in FIG. 37.

Various aberrations of this objective optical system are shown in FIG. 38 and the wave aberrations are shown in FIG. 39. Also, in order to determine the effect of the chromatic aberration correcting element, various aberrations and the wave aberrations by a single unit of the objective lens are shown in FIGS. 40 and 41.

Figure 42:
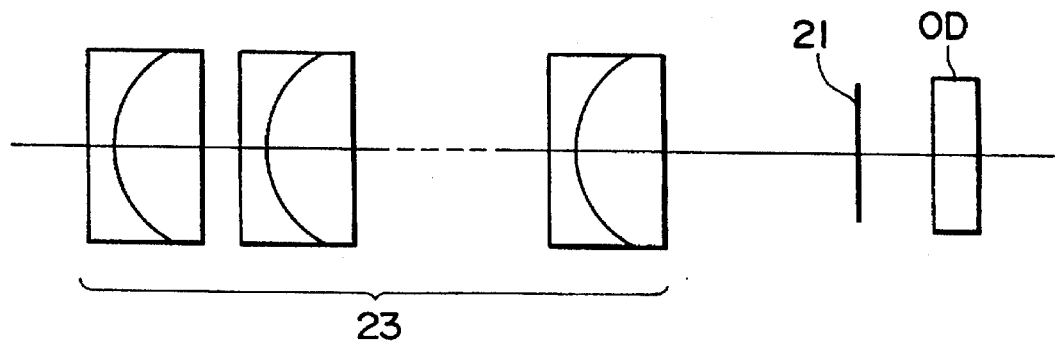
FIG. 42 is a lens diagram showing a first example of an objective optical system in which a hologram lens is used as an objective lens.
Figure 43:
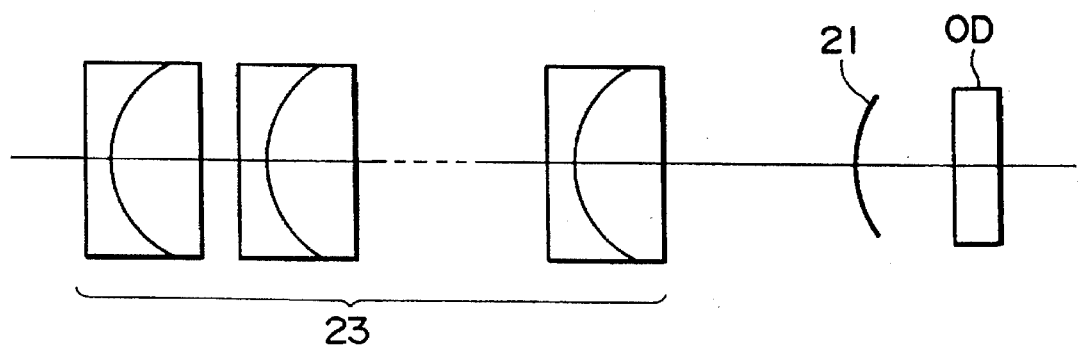
FIG. 43 is a lens diagram showing a second example of an objective optical system in which a hologram lens is used as an objective lens.

FIGS. 42 and 43 show examples wherein a hologram lens is used as the objective lens. As the hologram lens is a lens utilizing diffraction, a moving amount (chromatic aberration on the axis) CA of the light converged position with respect to the wavelength fluctuation can be expressed as follows:

$$CA = -f \cdot (\Delta\lambda/\lambda)$$

wherein the focal length is represented by f, the central wavelength used by λ, and the wavelength fluctuation by Δλ.

That is, the movement of the converged position with respect to the wavelength fluctuation of 1 nm at the wavelength of 780 nm becomes $-f \cdot (1/780)$nm.

On the contrary, in the case of an ordinary lens utilizing refraction, chromatic aberration on the axis becomes $CA=-f \cdot \{\Delta n/(-1+n)\}$, its value becomes $f \cdot (1/1000) \sim f \cdot (1/25000)$.

Therefore, the amount of chromatic aberration generated by the hologram lens is about 30 times that of the lens utilizing refraction and the character(plus or minus) becomes inverted. Owing to the foregoing, in order to use the chromatic aberration correcting element in the above-mentioned respective embodiments with a hologram lens, it is necessary to arrange about 30 pieces of chromatic aberration correcting element.

FIG. 42 shows a case where a plane hologram lens is used, while FIG. 43 shows a case where a curved hologram lens is used.

By the way, as the chromatic aberration correcting element of the above-mentioned EX.1 to EX.9 is formed of a positive lens and a negative lens cemented together and both surfaces thereof are formed as a surface having no power. In this case, as the chromatic aberration correcting effect is exhibited only at the cemented surfaces, it is necessary that a difference of $\Delta n/\Delta \lambda$ between the positive and negative lenses is made large and the radius of curvature of the cemented surfaces is made small.

However, when the difference of $\Delta n/\Delta \lambda$ between the positive lens and the negative lens is large, the aberration at the peripheral portion becomes large, and when the radius of curvature of the cemented surfaces becomes small, the effective aperture becomes small in order to obtain the edge thickness and the diameter of the effective luminous flux becomes large. As a result, a large effective aperture of the luminous flux becomes difficult to obtain.

When the generating amount of the aberration at the cemented surfaces is reviewed based on the S1 which is a coefficient of the ternary spherical aberration, it can be expressed as follows:

$$S1 = \Sigma \left\{ n_p^2 h \phi^2 \left( \frac{\beta_n}{n_n} - \frac{\beta_p}{n_p} \right) \right\}$$

wherein the refractive index of the lens on the light incident side is represented by $n_p$, the refractive index of the lens on the outgoing side by $n_n$, the radius of curvature of the cemented surfaces by $r_m$, the incident height of the paraxial ray of light by h, the inclination of the paraxial light of the lens on the light incident side by $\beta_p$, and the inclination of the paraxial light of the lens on the outgoing side by $\beta_n$. However, from the following relations:

$$\phi = \frac{h}{r_m} - \beta_p,$$

$$\beta_n = \frac{1}{n_n} \cdot \left( \frac{n_n - n_p}{r_m} \cdot h + n_p \beta_p \right)$$

if $(\Delta n)^2 \rightarrow 0$ is given, the following relation is obtained:

$$S1 = \Sigma \left\{ n_p^2 h \left( \frac{h}{r_m} - \beta_p \right)^2 \left( \frac{\Delta n_p h}{r_m n_n^2} - \frac{2\Delta n_p}{n_p^2} \beta_p \right) \right\}$$

and provided $\beta p \rightarrow 0$, $h \rightarrow 1$, the following relation is further obtained:

$$S1 = \Sigma n_p^2 \cdot \left( \frac{1}{r_m} \right)^2 \left( \frac{\Delta n_p}{r_m n_n^2} \right)$$

$$= \Sigma \frac{\Delta n_p}{r_m^3}$$

From the above-mentioned relation, it can be understood that the spherical aberration amount is proportional to the third power of the curvature and is proportional to $\Delta n$.

On the other hand, as the chromatic aberration correcting effect depends on the number of surfaces having the curvature and the curvature, the chromatic aberration correcting surfaces are separated into two portions, and the radius of curvature of each surface is made twice in order to compare with the case where the chromatic aberration correcting surface is not separated. As a result, presuming that the chromatic aberration correcting amount is the same, the generating amount of the spherical aberration can be restrained to ¼.

Therefore, in the following EXAMPLES 10–12, the chromatic aberration correcting element is formed of three lenses cemented together and the chromatic aberration correcting surfaces are separated and disposed in two places.

Each end face of the chromatic aberration correcting element is formed as a surface having almost no power and constructed to generate only the chromatic aberration without having power.

According to such construction, when compared with a chromatic aberration correcting element which has only one cementing surface, the same amount of chromatic aberration correction can be achieved by ¼ spherical aberration generating amount. Therefore, when compared with the case where only one cemented surface is utilized, the allowable width of the value $\Delta n$ is widened and therefore the width of selection of a combination of glass materials can be widened.

Furthermore, as the radius of curvature of the cemented surface is large, the edge thickness of the positive lens can be obtained even when the effective aperture is large. If the effective aperture is large, even when the optical axis of the objective lens is brought out of the optical axis of the chromatic aberration correcting element, the possibility for eclipse of the luminous flux occurring is small.

Although the above explanation is based on the ternary aberration and the change of aberration of the ray of light near the optical axis, it has been found that the objective optical system having only one cemented surface, when taking into consideration the effect of the high order aberration, generates ten times or more aberration with respect to the ray of light passing the peripheral portion of the chromatic aberration correcting element, when compared with a system having the cemented surface split into two portions.

By the way, at the time when the optical characteristic of the objective lens system is evaluated, it is necessary to take into consideration the effect of the adhesive used for cementing. An adhesive which is used for attaching optical parts such as an ordinary lens, etc. has a refractive index of about 1.5~1.6. When the refractive index of a glass material to be cemented is different from the refractive index of the adhesive, a light refraction occurs on that surface and an aberration is generated. As the aberration amount is proportional to the amount of the aberration generated on the front and rear surfaces of the adhesive layer, it is inversely proportional to the radius of curvature of the cemented surface and is proportional to the difference of the refractive index between the glass material and the adhesive.

The difference of the refractive index between the adhesive and the glass material becomes 0.1 or more because no adhesive of a high refractive index is available at present and no combination of glass materials having a large difference of $\Delta n/\Delta\lambda$ at a low refractive index.

Figure 44:
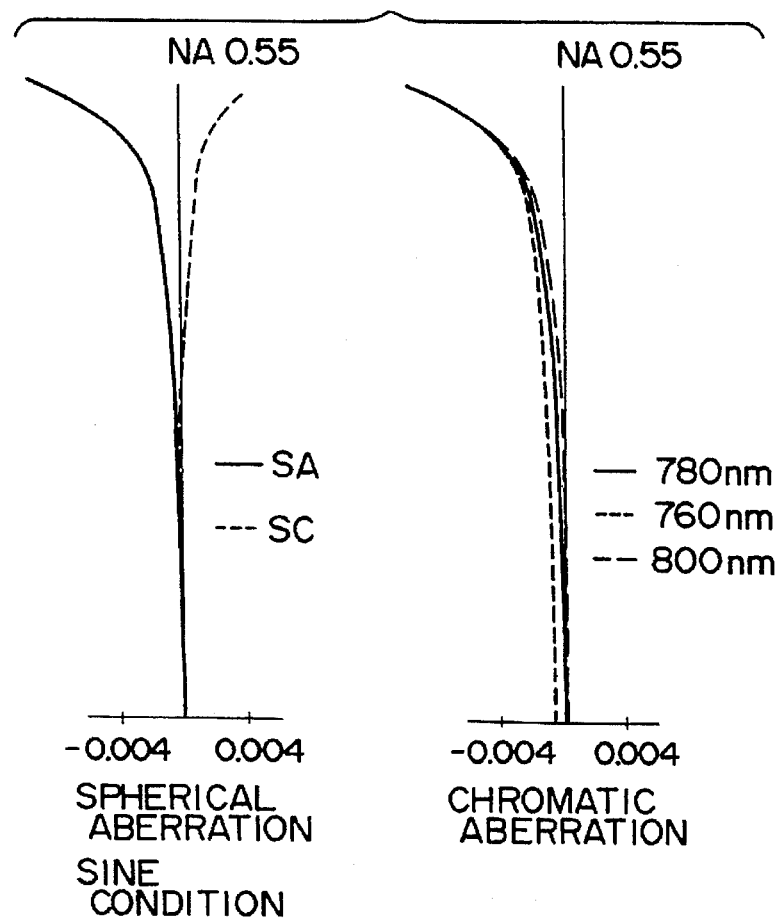
FIG. 44 are aberration diagrams in a case where an effect of an adhesive of the objective optical system of Example 1 is taken into consideration.

For example, when an adhesive layer having a refractive index of 1.54000 and a thickness of 0.01 mm is used on the cementing surface of the chromatic aberration correcting element of EXAMPLE 1, each aberration is varied as shown in FIG. 44. When the thickness of the adhesive layer is 0, the aberrations generated on the front and rear surfaces of the adhesive layer are offset. However, when the adhesive layer is thick, the incident height of light between the front and rear surfaces is varied and the aberrations on the front and rear surfaces of the adhesive are not completely offset. As a result, the aberration is generated and a problem arises.

As the chromatic aberration correcting element of EXAMPLE 1 has only one cemented surface, it is required to make the radius of curvature of the cemented surface small in order to correct the chromatic aberration. Therefore, when there is a difference between the refractive index of the adhesive and the refractive index of the glass material, the degree for generating the aberration with respect to the change of thickness of the adhesive layer is large. By comparison with FIG. 10, in which the effect of the adhesive is not taken into consideration, deterioration of efficiency on the peripheral portion can be recognized.

When the cemented surface is split into two portions, as here, the chromatic aberration can be adequately corrected without making the radius of curvature small, and the aberration fluctuation on each cemented surface with respect to the change of thickness of the adhesive layer is small. Also, by making the two cemented surfaces into generally symmetrical shapes, the deterioration of efficiency can be restrained even when the thickness of the adhesive layer is irregular.

When the chromatic aberration correcting element is formed of three or more lenses cemented together, it is desirous to satisfy the conditions of the following relations (8) and (9).

$$\left| \left\{ \left( \frac{\Delta n_1}{\Delta\lambda} + \frac{\Delta n_3}{\Delta\lambda} \right)/2 - \frac{\Delta n_2}{\Delta\lambda} \right\} \right| \cdot \lambda^2 > 9.0 \text{ nm} \quad (8)$$

$$-1.25 < r_3/r_2 < -0.8 \quad (9)$$

In the above relations, the symbolic characters have the following meanings:

$\Delta n_i/\Delta\lambda$ represents gradient of change with respect to the wavelength of the ith lens $r_2$ represents radius of curvature of the cemented surfaces of the first and second lenses $r_3$ represents radius of curvature of the cemented surfaces of the second lens and the third lens.

The relation (8) shows a relation similar to the relation (3) applied to the lens formed of three lenses.

When outside the range of this relation, even if the curvature of the cemented surface is strengthened to correct the chromatic aberration, the change in degree of convergence or divergence on the cemented surface becomes excessively large when a change in wavelength is generated. As a consequence, since the spherical aberration of high order of the element itself becomes large, it becomes impossible for a sufficient correction of the chromatic aberration to be compatible with prevention of other aberration deterioration.

The relation (9) shows the conditions for making the two cementing surfaces into generally symmetrical shape.

As described previously, the aberration amount generated on the cemented surface is proportional to the generating amount of aberration on the front and rear surfaces of the adhesive layer. Therefore, it is desirous that the burden of the chromatic aberration is equalized and the curvature of both surfaces is made gradual (or gentle). When the conditions of the relation (9) are not satisfied, the effect of splitting the chromatic aberration correcting surface is small, and when the conditions are satisfied, the glass material generates a small amount of aberration on the interface with respect to the adhesive layer.

Therefore, even if there is a small amount of irregularity in thickness of the adhesive layer at the time when the surface is cemented, deterioration of efficiency can be restrained. When the condition of $r_2 = -r_3$ is satisfied, generation of the aberration becomes minimum.

EXAMPLE 10

Figure 45:
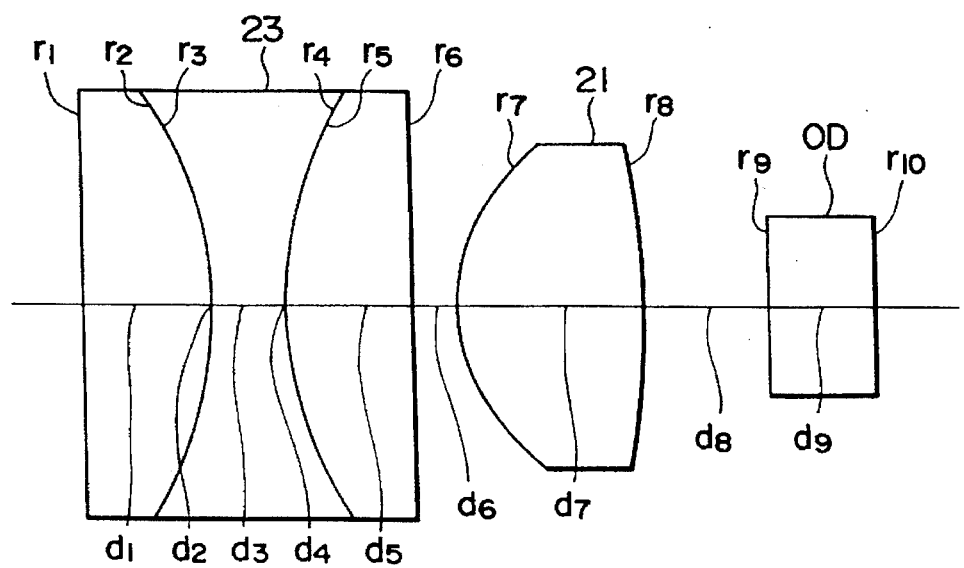
FIG. 45 is a lens diagram showing Example 10 of the objective optical system.
Figure 46:
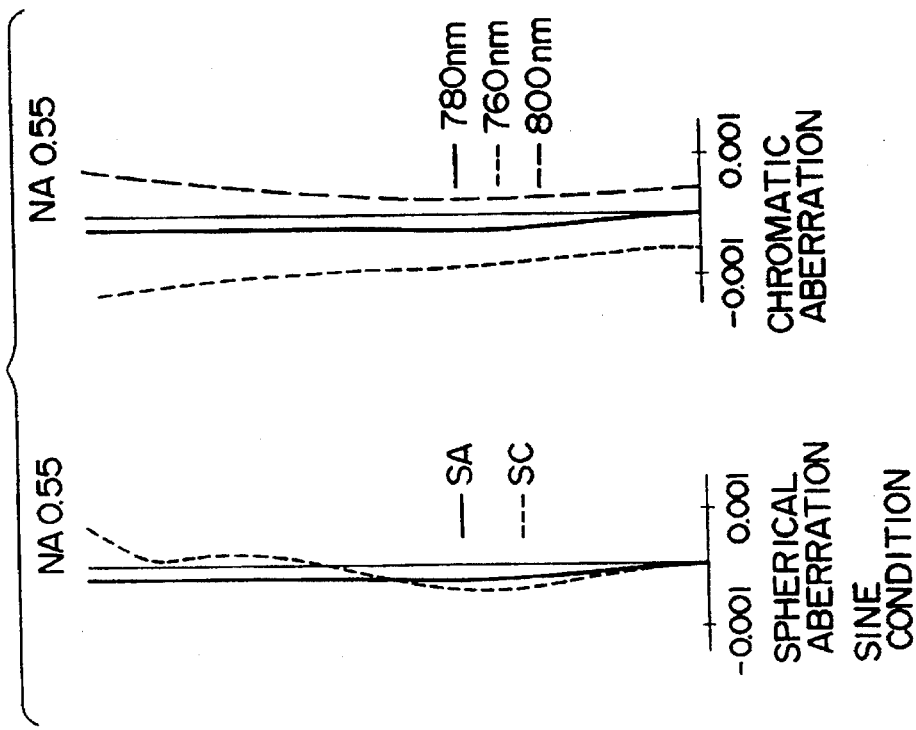
FIG. 46 are aberration diagrams in a case where an effect of an adhesive of the objective optical system shown in FIG. 45 is taken into consideration.

FIG. 45 shows EXAMPLE 10 of an objective optical system according to the present invention, and concrete numerical value construction is shown in TABLE 15. The aberration of this construction is shown in FIG. 46. In this EXAMPLE 10, as the thickness of the adhesive layer is also taken into consideration, a surface number is provided for each lens regarding the cemented surface. As the numerical value constructions for the objective lens and the cover glass of the optical disk is the same of that of EXAMPLE 1, description will be omitted in the following Table.

TABLE 15

| | NA = 0.55 | | f = 3.30 | | ω = 1.7° | |
|---|---|---|---|---|---|---|
| surface NO. | r | d | $n_{780}$ | $n_d$ | $v_{780}$ | glass material |
| 1 | ∞ | 1.400 | 1.72437 | 1.73400 | 1071 | LaK09 |
| 2 | −4.400 | 0.010 | 1.54000 | | | adhesive |
| 3 | −4.400 | 0.800 | 1.72421 | 1.74077 | 684 | SF13 |
| 4 | 4.400 | 0.010 | 1.54000 | | | adhesive |
| 5 | 4.400 | 1.400 | 1.72437 | 1.73400 | 1071 | LaK09 |
| 6 | ∞ | 0.500 | | | | |

Figure 47:
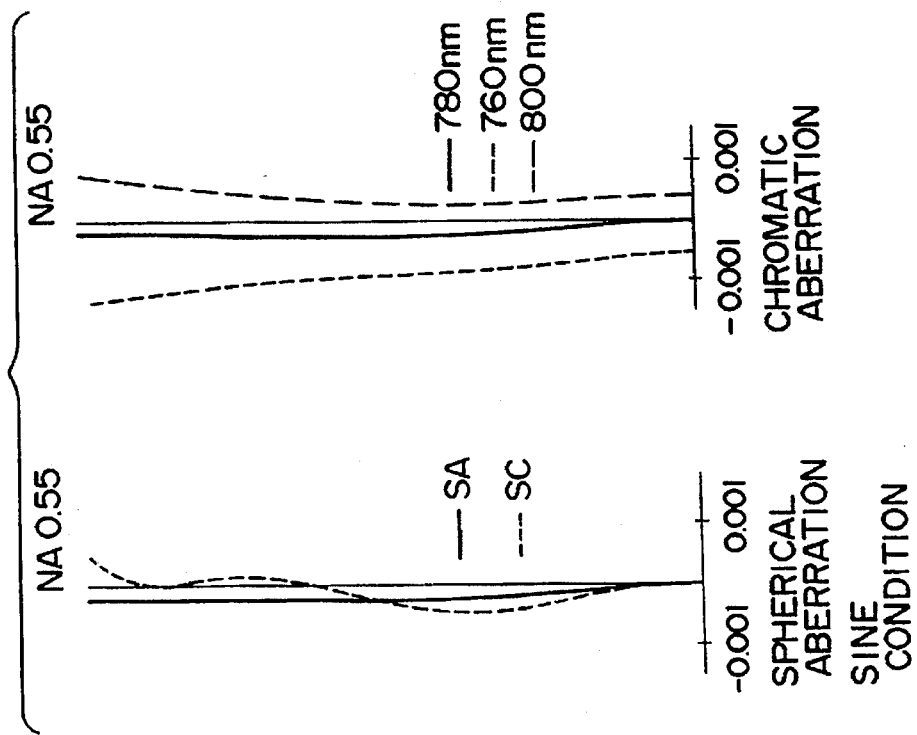
FIG. 47 are aberration diagrams wherein effects of an adhesive is not taken into consideration.

FIG. 47 shows the aberration in a case where the adhesive layer is not provided. From FIGS. 46 and 47, it will be understood that the various aberrations are hardly changed depending on whether or not the adhesive layer is provided.

EXAMPLE 11

Figure 48:
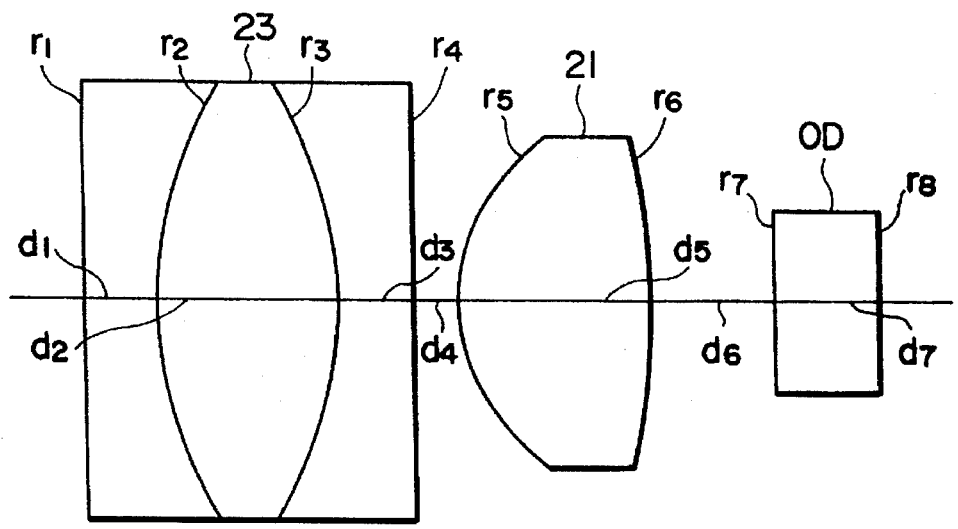
FIG. 48 is a lens diagram showing Example 11 of an objective optical system.
Figure 49:
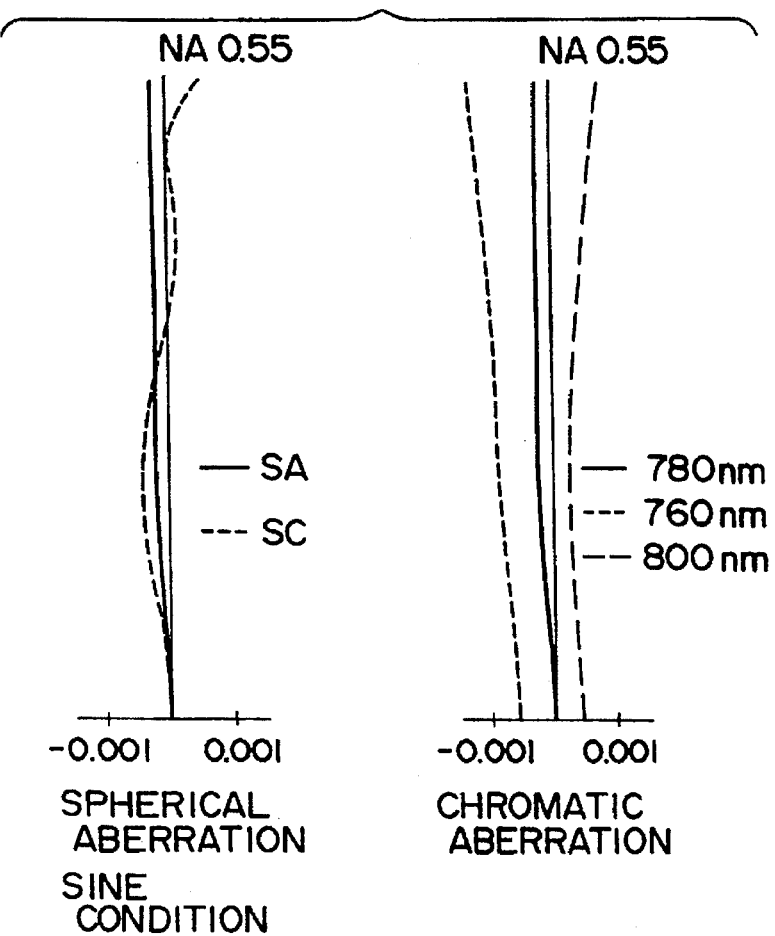
FIG. 49 are aberration diagrams showing various aberrations after taking into consideration the effect of adhesive in the objective optical system shown in FIG. 48.

FIG. 48 shows EXAMPLE 11 of an objective optical system and the concrete construction of numerical values thereof is as shown in TABLE 16. FIG. 49 shows the aberration when the effect of the adhesive according to this construction is taken into consideration.

TABLE 16

| | NA = 0.55 | | f = 3.30 | | ω = 1.7° | |
|---|---|---|---|---|---|---|
| surface NO. | r | d | $n_{780}$ | $n_d$ | $v_{780}$ | glass material |
| 1 | ∞ | 0.800 | 1.72421 | 1.74077 | 684 | SF13 |
| 2 | 4.400 | 2.000 | 1.72437 | 1.73400 | 1071 | LaK09 |
| 3 | −4.400 | 0.800 | 1.72421 | 1.74077 | 684 | SF13 |
| 4 | ∞ | 0.500 | | | | |

EXAMPLE 12

Figure 50:
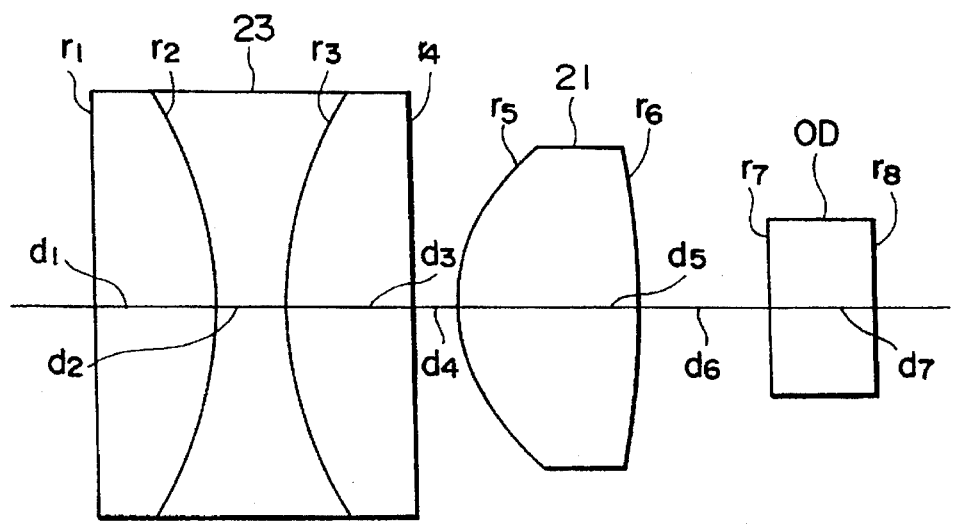
FIG. 50 is a lens diagram showing Example 12 of the objective optical system.
Figure 51:
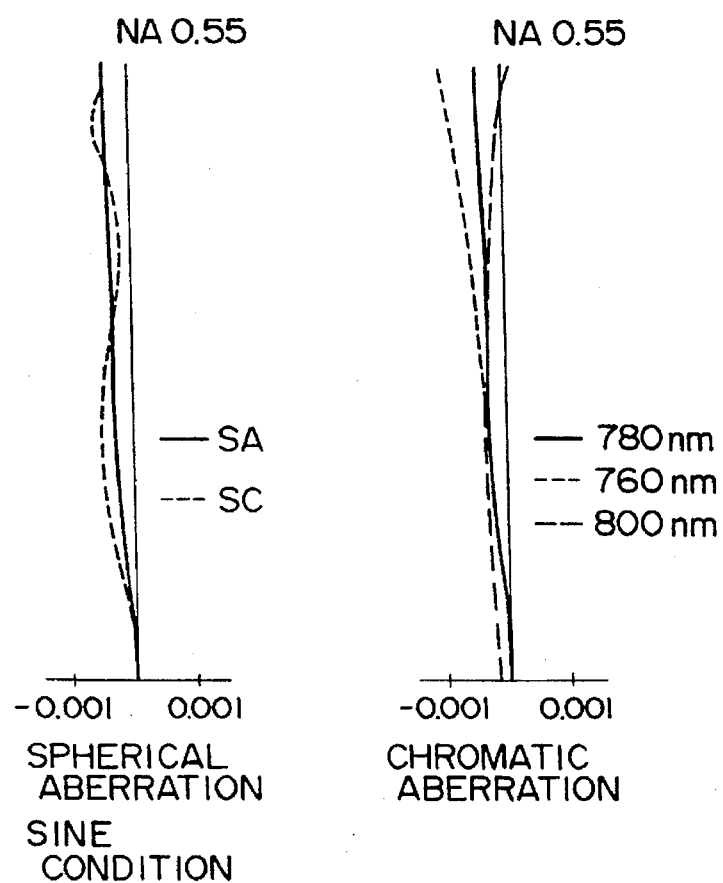
FIG. 51 are aberration diagrams, taking into consideration the effects of an adhesive, of the objective optical system shown in FIG. 50.
Figure 52:
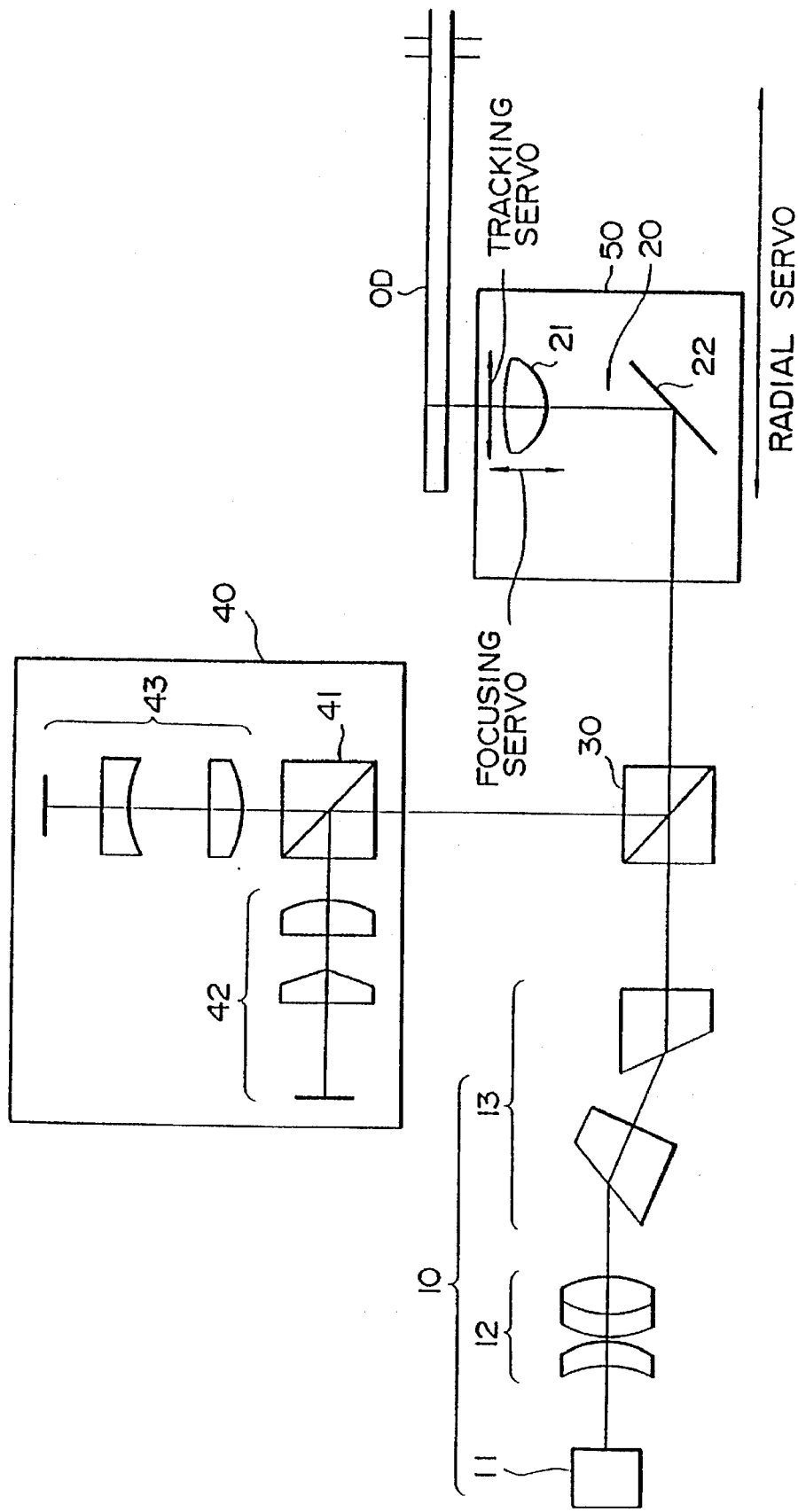
FIG. 52 is a light path diagram for an optical system of a conventional optical information recording/reproducing apparatus.

FIG. 50 shows EXAMPLE 12 of an objective optical system and the concrete construction of numerical values thereof is as shown in TABLE 17. FIG. 51 shows the aberration when the effect of the adhesive according to this construction is taken into consideration.

TABLE 17

| | NA = 0.55 | | f = 3.30 | | ω = 1.7° | |
|---|---|---|---|---|---|---|
| surface NO. | r | d | $n_{780}$ | $n_d$ | $v_{780}$ | glass material |
| 1 | ∞ | 1.400 | 1.73145 | 1.74100 | 1076 | LaK011 |
| 2 | −4.400 | 0.800 | 1.73166 | 1.75000 | 621 | SFS53 |
| 3 | 4.400 | 1.400 | 1.73145 | 1.74100 | 1076 | LaK011 |
| 4 | ∞ | 0.500 | | | | |

In the above-mentioned respective embodiments, assuming that the central wavelength in use is 780 nm, the construction has a satisfactory efficiency at this wavelength. However, the application of the present invention is not limited to the above-mentioned wavelength but it can also be applied to other wavelength ranges. Examples of a combination of glass materials satisfying the above-mentioned conditions of the present invention in wavelengths having a central wavelength in use of other than about 780 nm are as follows;

In the following relation, $n_p$ represents the refractive index of a positive lens, $n_n$ the refractive index of a negative lens, and $\Delta n/\Delta \lambda$ the gradient of a change with respect to the wavelength of the refractive index of each glass material.

wavelength of 830 nm
positive lens LaSK02 (Ohara)
$n_{830} = 1.77419$ $\Delta n/\Delta \lambda = -3.3 \times 10^{-5}$ nm$^{-1}$
$n_d = 1.78650$ $v_d = 50.0$
negative lens SFS54 (Minolta)
$n_{830} = 1.77419$ $\Delta n/\Delta \lambda = -3.3 \times 10^{-5}$ nm$^{-1}$
$n_d = 1.78650$ $v_d = 50.0$
$n_p - n_n = 47 \times 10^{-5}$
$(\Delta n_p/\Delta \lambda - \Delta n_n/\Delta \lambda) \times \lambda^2 = 18.8$ nm
$n_{830}$ represents refractive index in the wavelength of 830 nm wavelength of 670 nm
positive lens LaF04 (Ohara)
$n_{670} = 1.75145$ $\Delta n/\Delta \lambda = -5.6 \times 10^{-5}$ nm$^{-1}$
$n_d = 1.75700$ $v_d = 47.8$
negative lens SFL14 (Ohara)
$n_{670} = 1.75224$ $\Delta n/\Delta \lambda = -9.4 \times 10^{-5}$ nm$^{-1}$
$n_d = 1.76182$ $v_d = 26.5$
$n_p - n_n = 79 \times 10^{-5}$
$(\Delta n_p/\Delta \lambda) \times \lambda^2 = 17.0$ nm
$n_{670}$ represents refractive index in the wavelength of 670 nm wavelength of 532 nm
positive lens LaSK01 (Ohara)
$n_{532} = 1.75979$ $\Delta n/\Delta \lambda = -10.0 \times 10^{-5}$ nm$^{-1}$
$n_d = 1.75500$ $v_d = 52.3$
negative lens SFS53 (Minolta)
$n_{532} = 1.75986$ $\Delta n/\Delta \lambda = -21.1 \times 10^{-5}$ nm$^{-1}$
$n_d = 1.75000$ $v_d = 25.1$
$n_p - n_n = -7 \times 10^{-5}$
$(\Delta n_p/\Delta \lambda - \Delta n_n/\Delta \lambda) \times \lambda^2 = 31.3$ nm
$n_{532}$ represents the refractive index in the wavelength of 532 nm Next, the relation between each embodiment and each conditional relation will be shown in the following TABLE 18.

TABLE 18

| | (1) | (2) | (3) | (4) | (5) | (6) | (7) | (8) |
|---|---|---|---|---|---|---|---|---|
| EX. 1 | 16.6 | 0.262 | 12.5 | 0.00023 | ∞ | ∞ | ∞ | — |
| EX. 2 | 16.6 | 0.262 | 12.5 | 0.00023 | ∞ | ∞ | ∞ | — |
| EX. 3 | 0.6 | 0.230 | 10.1 | 0.00084 | ∞ | ∞ | ∞ | — |
| EX. 4 | 289 | 0.302 | 16.5 | 0.00352 | ∞ | ∞ | ∞ | — |
| EX. 5 | 289 | 0.302 | 16.5 | 0.00352 | ∞ | ∞ | ∞ | — |
| EX. 6 | 289 | 0.302 | 16.5 | 0.00352 | ∞ | ∞ | ∞ | — |
| EX. 7 | 140 | 0.250 | 12.8 | 0.00178 | ∞ | ∞ | ∞ | — |
| EX. 8 | 289 | 0.302 | 16.5 | 0.00246 | 17.7 | 15.2 | 15.2 | — |
| EX. 9 | 0.6 | 0.230 | 10.1 | 0.00084 | ∞ | ∞ | ∞ | — |
| EX.10 | 16.6 | 0.262 | 12.5 | 0.00044 | ∞ | ∞ | ∞ | −1.0 |
| EX.11 | 16.6 | 0.262 | 12.5 | 0.00024 | ∞ | ∞ | ∞ | −1.0 |
| EX.12 | 21.0 | 0.309 | 16.0 | 0.00057 | ∞ | ∞ | ∞ | −1.0 |

By the way, above-mentioned optical systems are designed for reducing effects of chromatic aberration. However, it is possible to design an objective optical system which uses the changing of the converging point due to the chromatic aberration positively. From this view point, the change of the converging point can be used for focusing servo instead of actuating an objective lens.

As change in the wavelength of light from light source occurs, the converging point is changed. Therefore, when the out of focus condition is detected, the light source driver controls the wavelength of light such that the amount of out of focus is offset by amount of change of converging point.

Particularly, when the objective optical system is designed such that a relation between the changing amount of the converging point and the shift of wavelength is linear, control of wavelength is facilitated.

What is claimed is:

1. An optical system of an optical information recording/reproducing apparatus, said system comprising:

a light source portion for emitting a generally parallel luminous flux;

an objective lens for converging the luminous flux emitted from said light source portion onto a medium;

a beam splitter for splitting the luminous flux reflected by said medium from a light path directed to the light source portion and guiding the luminous flux to a light receiving system;

a chromatic aberration correcting element having substantially no power disposed between said objective lens and said beam splitter for correcting a chromatic aberration of said objective lens, said chromatic aberration correcting element comprising a positive lens and a negative lens cemented together, each end face of said chromatic aberration correcting element formed as a generally plane surface and satisfying the following relation:

$$|n_p - n_n| \times 10^5 < 300$$

wherein a refractive index in a central wavelength in use of the positive lens is represented by $n_p$ and a refractive index of the negative lens is represented by $n_n$; and means for independently actuating said objective lens at least in an optical axis direction.

2. An optical system of an optical information recording/reproducing apparatus of claim 1, wherein said chromatic aberration correcting element satisfies the following relation;

$$(n_{p780}-1)(1-v_{n780}/v_{p780})>0.2$$

wherein;

$n_{n780}$, $n_{n830}$: refractive index of a negative lens in wavelengths of 780 nm and 830 nm $n_{p780}, n_{p830}$: refractive index of a positive lens in wavelengths of 780 nm and 830 nm $v_{n780}$: dispersion of a negative lens in the vicinity of a wavelength of 780 nm wherein; $v_{n780}=n_{n780}/(n_{n780}-n_{n830})$ $v_{p780}$: dispersion of a positive lens in the vicinity of a wavelength of 780 nm wherein; $v_{p780}=n_{p780}/(n_{p780}-n_{p830})$.

3. An optical system of an optical information recording/reproducing apparatus of claim 1, wherein said chromatic aberration correcting element satisfies the following relation;

$$((\Delta n_p/\Delta\lambda)-(\Delta n_n/\Delta\lambda))\times\lambda^2 > 9.0 \text{ nm}$$

wherein a gradient with respect to a wavelength of a refractive index of a positive lens is represented by $\Delta n_p/\Delta\lambda$ and a gradient with respect to a wavelength of a refractive index of a negative lens is represented by $\Delta n_n/\Delta\lambda$.

4. An optical system of an optical information recording/reproducing apparatus of claim 1, wherein said chromatic aberration correcting element satisfies the following relation:

$$|f_p/f_c| < 0.01$$

wherein a focal length of said positive lens is represented by $f_p$ and a focal length of said entire chromatic aberration correcting element is represented by $f_c$.

5. An optical system of an optical information recording/reproducing apparatus of claim 1, wherein said chromatic aberration correcting element satisfies the following relations;

$$|r_n/r_m| > 5$$

$$|r_1/f| > 7$$

$$|r_3/f| > 7$$

wherein;

$r_m$: radius of curvature of the cemented surface $r_n$: radius of curvature of the non-cemented surface of a positive lens $r_1$: radius of curvature of incident surface $r_3$: redius of curvature of outgoing surface f: focal length of whole objective optical system.

6. An objective optical system of an optical information recording/reproducing apparatus, said optical system comprising:

an objective lens for converging a generally parallel luminous flux;

a chromatic aberration correcting element for correcting a chromatic aberration of said objective lens, said chromatic aberration correcting element comprising a positive lens and a negative lens cemented together, each end face of said chromatic aberration correcting element formed as a generally plane surface and satisfying the following relation;

$$|n_p-n_n| < 300 \times 10^{-5}$$

wherein the refractive index in a central wavelength in use of said positive lens is represented by $n_p$ and the refractive index of said negative lens is represented by $n_n$; and means for independently actuating said objective lens at least in an optical axis direction.

7. An objective optical system of an optical information recording/reproducing apparatus of claim 6, wherein said chromatic aberration correcting element satisfies the following relation;

$$(n_{p780}-1)(1-v_{n780}/v_{p780}) > 0.2$$

wherein;

$n_{n780}, n_{n830}$: refractive index of a negative lens in wavelengths of 780 nm and 830 nm $n_{p780}, n_{p830}$: refractive index of a positive lens in wavelengths of 780 nm and 830 nm $v_{n780}$: dispersion of a negative lens in the vicinity of a wavelength of 780 nm wherein; $v_{n780}=n_{n780}/(n_{n780}-n_{n830})$ $v_{p780}$: dispersion of a positive lens in the vicinity of a wavelength of 780 nm wherein; $v_{p780}=n_{p780}/(n_{p780}-n_{p830})$.

8. An objective optical system of an optical information recording/reproducing apparatus of claim 6, wherein said chromatic aberration correcting element satisfies the following relation;

$$((\Delta n_p/\Delta\lambda)-(\Delta n_n/\Delta\lambda))\times\lambda^2 > 9.0 \text{ nm}$$

wherein a gradient with respect to a wavelength of a refractive index of a positive lens is represented by $\Delta n_p/\Delta\lambda$ and a gradient with respect to a wavelength of a refractive index of a negative lens is represented by $\Delta n_n/\Delta\lambda$.

9. An objective optical system of an optical information recording/reproducing apparatus of claim 6 wherein said chromatic aberration correcting element satisfies the following relation:

$$|f_p/f_c| < 0.01$$

wherein a focal length of said positive lens is represented by $f_p$ and a focal length of said entire chromatic aberration correction element is represented by $f_c$.

10. An objective optical system of an optical information recording/reproducing apparatus of claim 6, wherein said chromatic aberration correcting element satisfies the following relations;

$$|r_n/r_m| > 5$$

$$|r_1/f| > 7$$

$$|r_3/f| > 7$$

wherein;

$r_m$: radius of curvature of the cemented surface $r_n$: radius of curvature of the non-cemented surface of a positive lens $r_1, r_3$: radius of curvature of incident and outgoing surfaces f: focal length of the whole objective optical system.

* * * * *